US010864883B2

(12) United States Patent
Yanagisawa et al.

(10) Patent No.: US 10,864,883 B2
(45) Date of Patent: Dec. 15, 2020

(54) AIRBAG DEVICE

(71) Applicant: TOYODA GOSEI CO., LTD., Kiyosu (JP)

(72) Inventors: Toshihito Yanagisawa, Kiyosu (JP); Takanori Komatsu, Kiyosu (JP); Koji Kawamura, Kiyosu (JP); Hideo Higashi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 41 days.

(21) Appl. No.: 16/361,948

(22) Filed: Mar. 22, 2019

(65) Prior Publication Data

US 2019/0299914 A1    Oct. 3, 2019

(30) Foreign Application Priority Data

Mar. 28, 2018  (JP) ................................. 2018-062487
Mar. 30, 2018  (JP) ................................. 2018-066816

(51) Int. Cl.
*B60R 21/237* (2006.01)
*B60R 21/201* (2011.01)
*B60R 21/203* (2006.01)

(52) U.S. Cl.
CPC .......... *B60R 21/237* (2013.01); *B60R 21/201* (2013.01); *B60R 21/203* (2013.01)

(58) Field of Classification Search
CPC ... B60R 21/237; B60R 21/203; B60R 21/201; B60R 2021/2375
See application file for complete search history.

(56) References Cited

U.S. PATENT DOCUMENTS

| 4,235,453 | A | * | 11/1980 | Lawson | ................ | B60R 21/237 |
| | | | | | | 280/743.1 |
| 4,903,986 | A | * | 2/1990 | Cok | ................... | B60R 21/2035 |
| | | | | | | 280/728.2 |
| 5,795,284 | A | * | 8/1998 | Berti | .................... | B60R 21/237 |
| | | | | | | 493/405 |
| 6,070,904 | A | * | 6/2000 | Ozaki | .................... | B60R 21/16 |
| | | | | | | 280/728.1 |

(Continued)

FOREIGN PATENT DOCUMENTS

| JP | 2008-168673 A | 7/2008 |
| JP | 2013-244937 A | 12/2013 |

*Primary Examiner* — Frank B Vanaman
(74) *Attorney, Agent, or Firm* — Posz Law Group, PLC

(57) ABSTRACT

An airbag device includes: an airbag which inflates from a state of a folded body by receiving an inflation gas; and a wrapping material wraps the folded body. The folded body has a three-dimensional shape including a bottom surface portion, a ceiling portion, and a side surface portion. The wrapping material includes: a cover member having flexibility and a sheet shape which includes a ceiling cover portion covering the ceiling portion of the folded body, a side surface cover portion covering the side surface portion, and a bottom surface cover portion which covers the bottom surface portion and has a locking hole to be locked to a fastener, and an elongation regulating member which is provided on at least a part of the cover member so as to suppress elongation of the cover member in opposition to an acting direction of the restoring force of the folded body.

11 Claims, 35 Drawing Sheets

(56) References Cited

U.S. PATENT DOCUMENTS

| | | | | |
|---|---|---|---|---|
| 6,152,867 A | * | 11/2000 | Heudorfer | B60R 21/237 493/405 |
| 2002/0020995 A1 | * | 2/2002 | Abe | B60R 21/201 280/743.1 |
| 2003/0171200 A1 | * | 9/2003 | Nishijima | B60R 21/237 493/449 |
| 2006/0012157 A1 | * | 1/2006 | Ishiguro | B60R 21/2035 280/731 |
| 2007/0007757 A1 | * | 1/2007 | Bauer | B60R 21/20 280/743.2 |
| 2013/0320655 A1 | | 12/2013 | Takagi | |

* cited by examiner

CROSS-SECTIONAL VIEW TAKEN ALONG IV-IV

AIRBAG DEVICE

CROSS-REFERENCE TO RELATED APPLICATION(S)

This application is based upon and claims the benefit of priority from Japanese Patent Applications No. 2018-062487, filed on Mar. 28, 2018, and No. 2018-066816, filed on Mar. 30, 2018, the entire contents of which are incorporated herein by reference.

BACKGROUND

1. Field of the Invention

The present invention relates to an airbag device for a vehicle, and particularly to an airbag device which can be mounted on a vehicle in a state where a folded body which is a compactly folded airbag maintains a compact shape.

2. Description of the Related Art

In related arts, in this type of airbag device, a folded body which is formed by reforming and folding an airbag is formed so that the airbag can be compactly accommodated and the folded body is wrapped with a wrapping material so that a folded shape of the folded body can be maintained against a restoring force (spring back) trying to eliminate folding (see JP-A-2008-168673 and JP-A-2013-244937, for example). The folded body has a three-dimensional shape such as a columnar shape including a bottom surface portion, a ceiling portion which is disposed so as to face the bottom surface portion, and a side surface portion between the bottom surface portion and the ceiling portion. Further, the wrapping material covers at least a part of a surface side over the ceiling portion, the side surface portion, and the bottom surface portion of the folded body and is disposed so as to be locked to a fastener disposed on the bottom surface portion side of the folded body. The fastener is normally disposed in a retainer used for attaching the airbag (folded body) to an accommodation portion such as a bag holder for holding the folded airbag (folded body) or a case in the airbag device. That is, the retainer is accommodated in the airbag and constituted by including a bottom wall portion which presses the airbag against the accommodation portion such as the bag holder or the case and a bolt which is disposed on a lower surface side of the bottom wall portion, passes through the accommodation portion, and is fastened by a nut. The bolt of the retainer is configured to protrude outside the airbag and used as a fastener.

However, in an airbag device of the related art, a wrapping material is formed of an airbag base fabric similar to that of an airbag, so it is inevitable that elongation to the extent similar to that of a folded body occurs. Therefore, in a case of the wrapping material of the related art, it is not possible to cover the folded body so as to be able to properly resist a restoring force (spring back) trying to eliminate folding. As a result, there is room for improvement when the airbag device is mounted on a portion with a small space.

SUMMARY

The invention is made to solve the problem described above and an object thereof is to provide an airbag device which can be maintained in a compact state and can be easily mounted on a small space portion.

According to a first aspect of the invention, there is provided an airbag device including: an airbag which inflates from a state of a folded body by receiving an inflation gas; and a wrapping material having flexibility which wraps the folded body to maintain a folded shape of the folded body against a restoring force trying to eliminate folding in the folded body, wherein: the folded body has a three-dimensional shape including a bottom surface portion, a ceiling portion disposed to face the bottom surface portion, and a side surface portion between the bottom surface portion and the ceiling portion; the wrapping material is disposed to cover a surface side over the ceiling portion, the side surface portion, and the bottom surface portion of the folded body; the airbag device is locked to a fastener disposed on a bottom surface portion side of the folded body; and the wrapping material includes: a cover member having flexibility and a sheet shape which includes a ceiling cover portion covering the ceiling portion of the folded body, a side surface cover portion covering the side surface portion, and a bottom surface cover portion which covers the bottom surface portion and has a locking hole to be locked to the fastener; and an elongation regulating member which is provided on at least a part of the cover member so as to suppress elongation of the cover member in opposition to an acting direction of the restoring force of the folded body.

In the airbag device according to the invention, the folded body of the airbag is wrapped in the wrapping material and the wrapping material is configured such that the elongation regulating member which suppresses elongation of the cover member is provided in the cover member having a sheet shape which covers over the ceiling portion, the side surface portion, and the bottom surface portion of the folded body. Therefore, when the cover member wraps the folded body such that the cover member covers the ceiling portion of the folded body by the ceiling cover portion, covers the side surface portion of the folded body by the side surface cover portion, and covers the bottom surface portion of the folded body by the bottom surface cover portion and the bottom surface cover portion is locked to the fastener using the locking hole, the elongation regulating member can resist the restoring force of the folded body acting on the cover member, and thus the spring back of the folded body can be regulated. As a result, the compact folded shape can be maintained.

Therefore, in the airbag device according to the invention, the folded body can be maintained in a compact state, and thus the airbag device can be easily mounted on a portion with a small space.

In the first aspect of the invention, the elongation regulating member may be constituted by an elongation regulating coating agent applied to the cover member, and the elongation regulating member may be constituted by an elongation regulating sewn portion formed by sewing a sewing thread at a position where elongation of the cover member is suppressed.

The elongation regulating coating agent may be applied to the entire surface of the cover member or may be partially applied to elongation suppressing places in the cover member. As the elongation regulating coating agent, for example, a silicone coating agent for improving heat resistance to an airbag base fabric can be exemplified.

When the fasteners are disposed at a plurality of positions on an outer peripheral edge side of the bottom surface portion, the elongation regulating sewn portion is configured to be provided with a lateral-surface-side sewn portion which is disposed so as to extend from an edge of the side surface cover portion in a vicinity of the fastener which is the edge on a bottom surface cover portion side in the vicinity of the fastener to the ceiling cover portion and a ceiling-side sewn portion disposed so as to extend from an end portion on the ceiling cover portion side in the lateral-surface-side sewn portion to a center side of the ceiling cover portion and have at least a part which extends along an outer peripheral edge of the ceiling cover portion in a vicinity of the outer peripheral edge of the ceiling cover portion.

In such a configuration, it is configured such that the lateral-surface-side sewn portion which is provided in the side surface cover portion of the cover member as the elongation regulating sewn portion is disposed in the vicinity of the locking hole locked to the fastener and pulls the ceiling-side sewn portion provided on the outer peripheral edge of the ceiling cover portion of the cover member. Therefore, the cover member prevents the height near the center of the ceiling portion of the folded body from being increased by the ceiling-side sewn portion and the lateral-surface-side sewn portion in the elongation regulating sewn portion and only a part of the outer peripheral edge of the ceiling portion is pressed toward the bottom surface portion side along the side surface portion. As a result, the height from the bottom surface portion to the ceiling portion of the folded body can be suppressed, and thus the compact folded shape of the folded body can be maintained. By the way, when a wrapping material wraps a folded body so as to include not only the part of the outer peripheral edge of the ceiling portion of the folded body but also a part in a vicinity of the center of the ceiling portion and connect from the vicinity of the center to the bottom surface portion side through both intersection portions between the ceiling portion and the side surface portion and further through both side surface portions and the wrapping material presses the folded body, both intersection portions between the ceiling portion and the side surface portion hangs down to the bottom surface portion side and this causes a situation where the vicinity of the center of the ceiling portion is raised. Therefore, the height of the folded body is increased, which makes it difficult to maintain the compact folded shape of the folded body.

In the first aspect of the invention, in a peripheral edge of a locking hole to which the fastener is locked, the elongation regulating sewn portion may include at least a locking-hole-side sewn portion disposed on an edge side in a direction opposite to the acting direction of the restoring force of the folded body.

In such a configuration, even when the bottom surface cover portion of the cover member is about to be pulled and stretched, it is possible to suppress the elongation of a peripheral edge of the locking hole in the bottom surface cover portion of the cover member, the locking hole being locked to the fastener. Therefore, the cover member (wrapping material) can maintain the compact folded shape of the folded body.

According to a second aspect of the invention, there is provided an airbag device including: an airbag which inflates from a state of a folded body by receiving an inflation gas; and a shape maintaining member having flexibility which covers the folded body to maintain a folded shape of the folded body against a restoring force trying to eliminate folding in the folded body, wherein: the folded body has a three-dimensional shape including a bottom surface portion, a ceiling portion disposed to face the bottom surface portion, and a side surface portion between the bottom surface portion and the ceiling portion; a fastener for locking an end portion of the shape maintaining member protrudes from a vicinity of an outer peripheral edge of the bottom surface portion; the shape maintaining member is formed of a flexible sheet material including a ceiling cover portion which covers the ceiling portion of the folded body, a side surface cover portion which extends from an end portion of the ceiling cover portion and covers the side surface portion, and a bottom surface cover portion which extends from the side surface cover portion to cover the bottom surface portion and has a locking hole to be locked to the fastener; the ceiling cover portion is provided with a center portion covering a vicinity of a center of the ceiling portion and constituted to linearly extend from the center portion to both sides of the ceiling portion so as to traverse the ceiling portion and one end side of both sides of the ceiling cover portion is fixed as a terminal to an edge side of the ceiling portion and the other end side is connected to the side surface cover portion; and the shape maintaining member in a state of being flatly spread is configured to linearly arrange the bottom surface cover portion and the side surface cover portion which extend from the locking hole to a fixed portion of the ceiling cover portion which is the portion fixed to the edge side of the ceiling portion and the ceiling cover portion.

In the airbag device of the second aspect of the invention, in the shape maintaining member of a sheet shape having the flexibility, the end portion side of the ceiling cover portion which extends to an opposite side with respect to the center portion is connected to the side surface cover portion covering the side surface portion of the folded body and is connected to the bottom surface cover portion which covers the bottom surface portion of the folded body from the side surface cover portion and is locked to the fastener, in a state where the terminal of the ceiling cover portion which extends over the vicinity of the center of the ceiling portion of the folded body and extends from the center portion is fixed to the edge side of the ceiling portion. Therefore, the ceiling cover portion which is linearly extended from the bottom surface cover portion in a spread state effectively presses a vicinity of the center of the ceiling portion of the folded body toward the bottom surface portion side, so that the height of the ceiling portion of the folded body is prevented from being increased. In addition, the intersection portion between the ceiling cover portion and the side surface cover portion is pressed toward the bottom surface cover portion side, so that an increase in the height of a portion (an intersection portion between the ceiling portion and the side surface portion) of the folded body which is the portion in the vicinity of the intersection portion between the ceiling cover portion and the side surface cover portion can be suppressed. As a result, it is possible to maintain a compact folded shape of the folded body. Particularly, in the ceiling cover portion of the shape maintaining member, the ceiling cover portion extending over the vicinity of the center of the ceiling portion of the folded body, the terminal 96a side is fixed to the edge side of the ceiling portion without being provided with a portion extending to the side surface portion side of the folded body. Therefore, although, in a connection side between the ceiling cover portion and the side surface cover portion, the ceiling cover portion presses the intersection portion between the ceiling portion and the side surface portion of the folded body toward the bottom surface portion side, the intersection portion, on the terminal side, between the ceiling portion and the side surface portion of the folded body is not pressed toward a central side of the bottom surface portion so as to make the intersection portion hang down. As a result, it becomes in a pressed state where the height of the vicinity of the center of the ceiling portion is prevented from being increased, and thus the shape maintaining member can make the folded body 50 maintain the compact folded shape. By the way, when it is configured such that both parts of the ceiling cover portion extending over the vicinity of the center of the ceiling portion of the folded body which are the parts on both sides of the center portion are connected to the side surface cover portions covering the side surface portion of the folded body and the bottom surface cover portions connected to the respective side surface cover portions are locked to the fasteners, it causes a state where parts of the ceiling cover portion which are the parts on both sides of the center portion and both side surface cover portions diagonally press both intersection portions relative to the side surface portion in both edge sides of the ceiling portion of the folded body toward a center of the bottom surface portion. Therefore, both intersection portions hang down and the center of the ceiling portion are pushed up. As a result, it causes a situation where the height dimension of the folded body is increased.

Further, when a plurality of fasteners are provided in the vicinity of the outer peripheral edge of the bottom surface portion of the folded body so as to be disposed with a radial arrangement with reference to the center of the bottom surface portion, a plurality of shape maintaining members as described above may be disposed so as to intersect the mutual ceiling cover portions and lock the bottom surface cover portions to the fasteners in different positions.

In such a configuration, in a state where, in the folded body, the intersection portion between the ceiling portion and the side surface portion is prevented from being pressed toward a center side of the bottom surface portion, an increase in the height of the center of the folded body is securely prevented by the ceiling cover portions of the plurality of shape maintaining members and an increase in the height of intersection portions between a plurality of ceiling cover portions and the side surface cover portions is also securely prevented. As a result, the shape maintaining member can further maintain the compact folded shape of the folded body.

As the shape maintaining member, the ceiling cover portion may be directly fixed to the outer peripheral edge of the ceiling portion of the folded body. Alternatively, when a surface side over the ceiling portion, the side surface portion, and the bottom surface portion of the folded body is covered by a wrapping material provided to be locked to the fastener, the ceiling cover portion of the shape maintaining member may be fixed to a part of the wrapping material covering the ceiling portion of the folded body and may be fixed to the edge side of the ceiling portion of the folded body in a state where the wrapping material covering the ceiling portion is interposed therebetween.

The folded body may be formed by being compressed in a direction in which the ceiling portion and the bottom surface portion approach each other, and the ceiling portion of the folded body may be provided with a recess portion which is recessed further downward than an outer peripheral edge side in a portion in a vicinity of a center, and a raised portion which includes a ceiling surface substantially parallel to the bottom surface portion on the outer peripheral edge side and is raised from the recess portion so as to surround the recess portion.

According to such a folded body, the raised portion provided in the outer peripheral edge of the ceiling portion is compressed toward the bottom surface portion side. In addition, since the raised portion located in the intersection portion between the ceiling portion and the side surface portion is in a compressed state, it is difficult for the raised portion to hang down toward the center side of the bottom surface portion even when the wrapping material provided with the elongation regulating member on the cover member or the shape maintaining member wraps the folded body. As a result, the folded body can maintain the compact folded shape. Further, even when it is assumed that the folded body is wrapped in the wrapping material provided with the elongation regulating member on the cover member or the shape maintaining member and the intersection portion between the ceiling portion and the side surface portion hangs down and tries to raise the center of the ceiling portion, the recess portion is formed in the center of the ceiling portion in advance and the recess portion can absorb a protuberance which raises the ceiling portion. Therefore, the ceiling portion can be prevented from becoming higher. As a result, the folded body can maintain the compact folded shape.

According to a third aspect of the invention, there is provided a folding method of an airbag which inflates from a folded state by receiving a gas, the airbag including: an vehicle-body-side wall portion provided with an inflow opening to inflow the gas; and a driver-side wall portion which is arranged so as to oppose the vehicle-body-side wall portion in a state where an outer peripheral edge of the driver-side wall portion is continuous with an outer peripheral edge of the vehicle-body-side wall portion, the folding method including: providing a bag folding machine including: a bottom-side base plate; and a ceiling-side base plate disposed oppositely to the bottom-side base plate through an interval, the ceiling-side base plate including a projection portion being provided in a vicinity of the inflow opening and protruding to a side of the bottom-side base plate; spreading the airbag at a portion between the bottom-side base plate and the ceiling-side base plate so that the vehicle-body-side wall portion faces the bottom-side base plate in a state where the vehicle-body-side wall portion opposes the driver-side wall portion; and gathering an outer peripheral edge of the airbag above the inflow opening to fold the airbag so that the airbag is disposed around the projection portion and is interposed between the ceiling-side base plate and the bottom-side base plate.

In the folding method, a width of the projection portion may be reduced gradually toward the bottom-side base plate, when the outer peripheral edge of the airbag is gathered above the inflow opening to fold the airbag, a recess portion may be formed on a surface of the airbag opposing an inflow opening side surface of the airbag, and an opening width of the recess portion is reduced gradually toward the inflow opening side surface.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
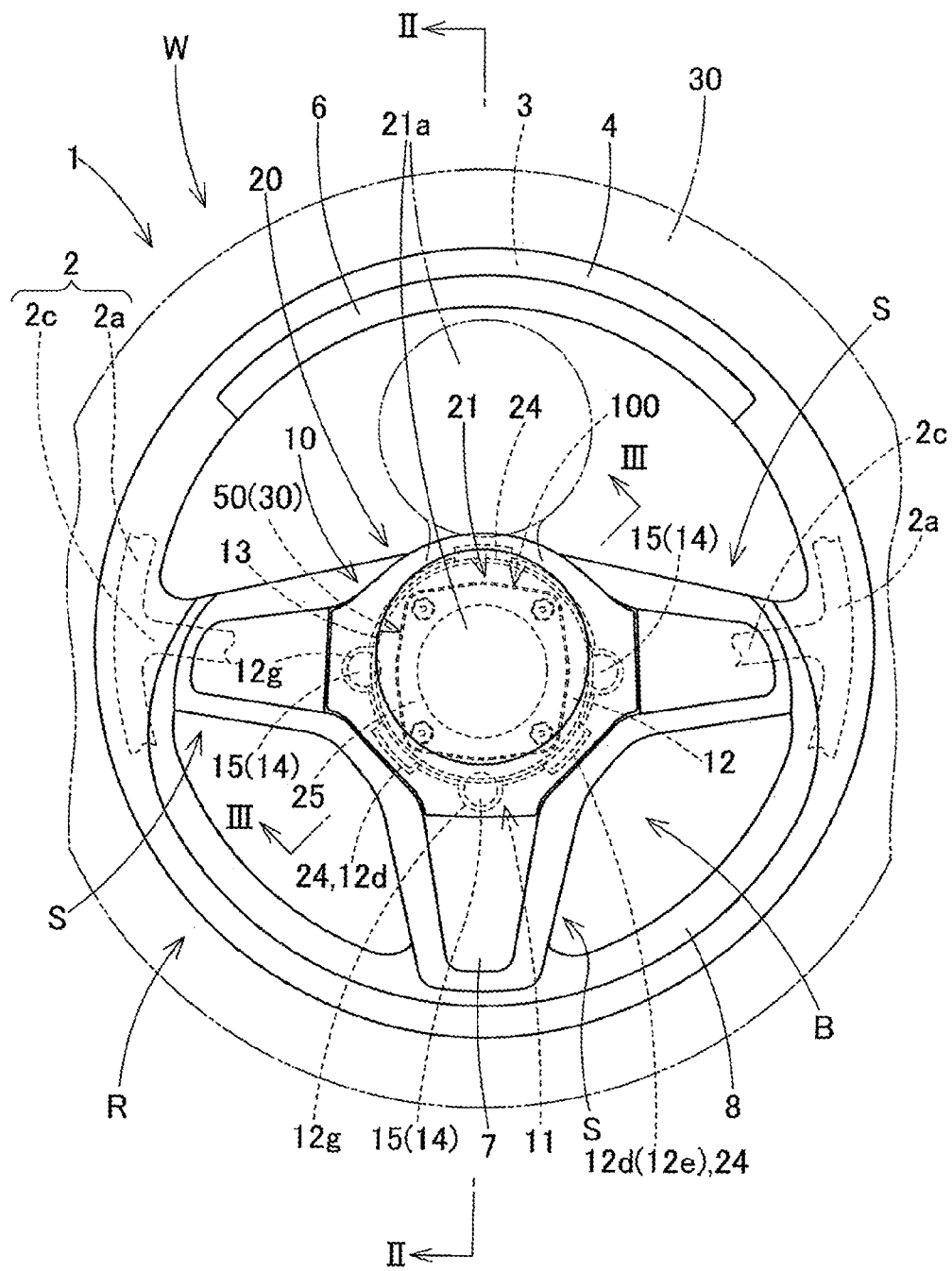
FIG. 1 is a schematic plan view of a steering wheel on which an airbag device according to a first embodiment of the invention is mounted.
Figure 2:
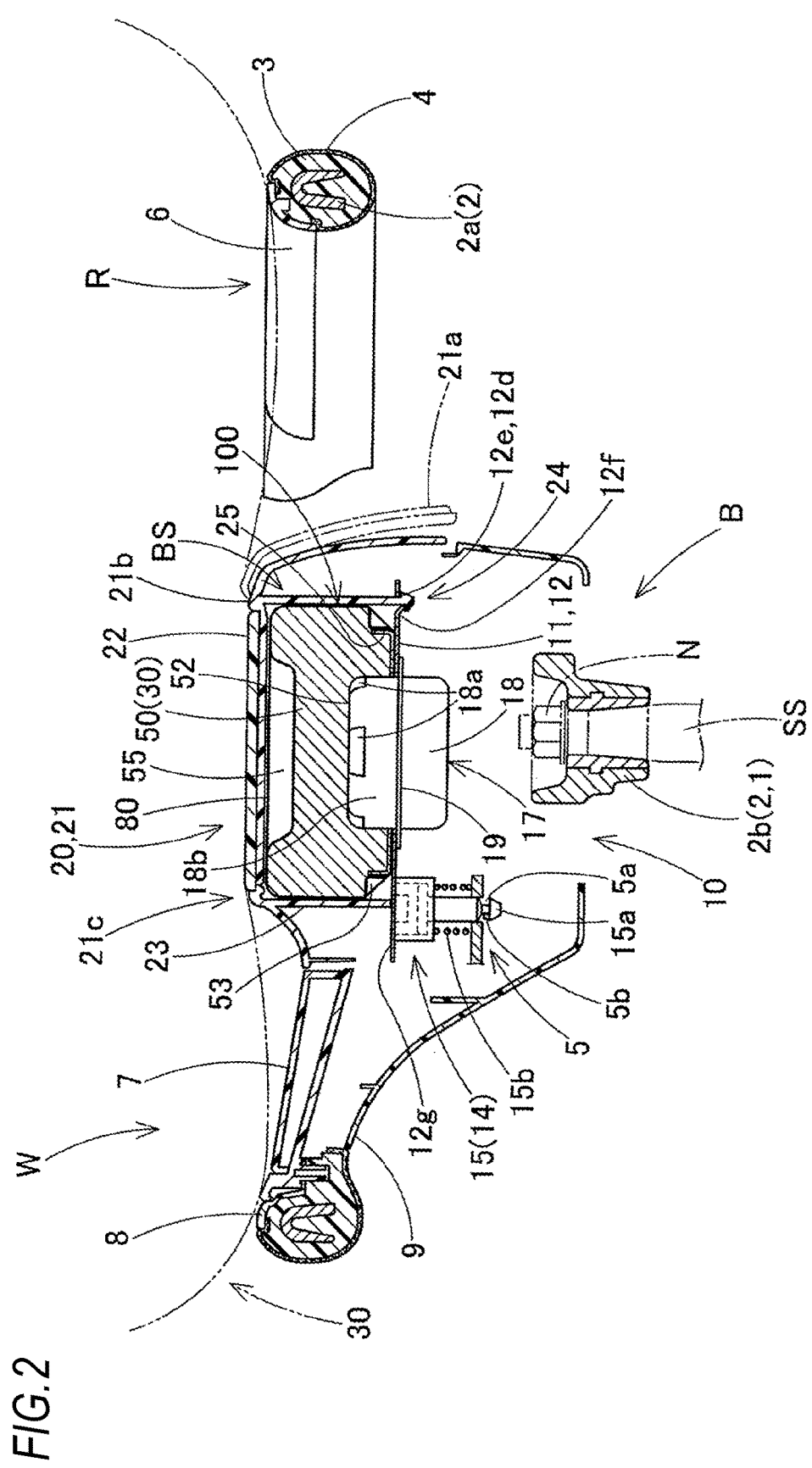
FIG. 2 is a schematic longitudinal cross-sectional view, taken along line II-II in FIG. 1, of the steering wheel on which the airbag device of the first embodiment is mounted.
Figure 3:
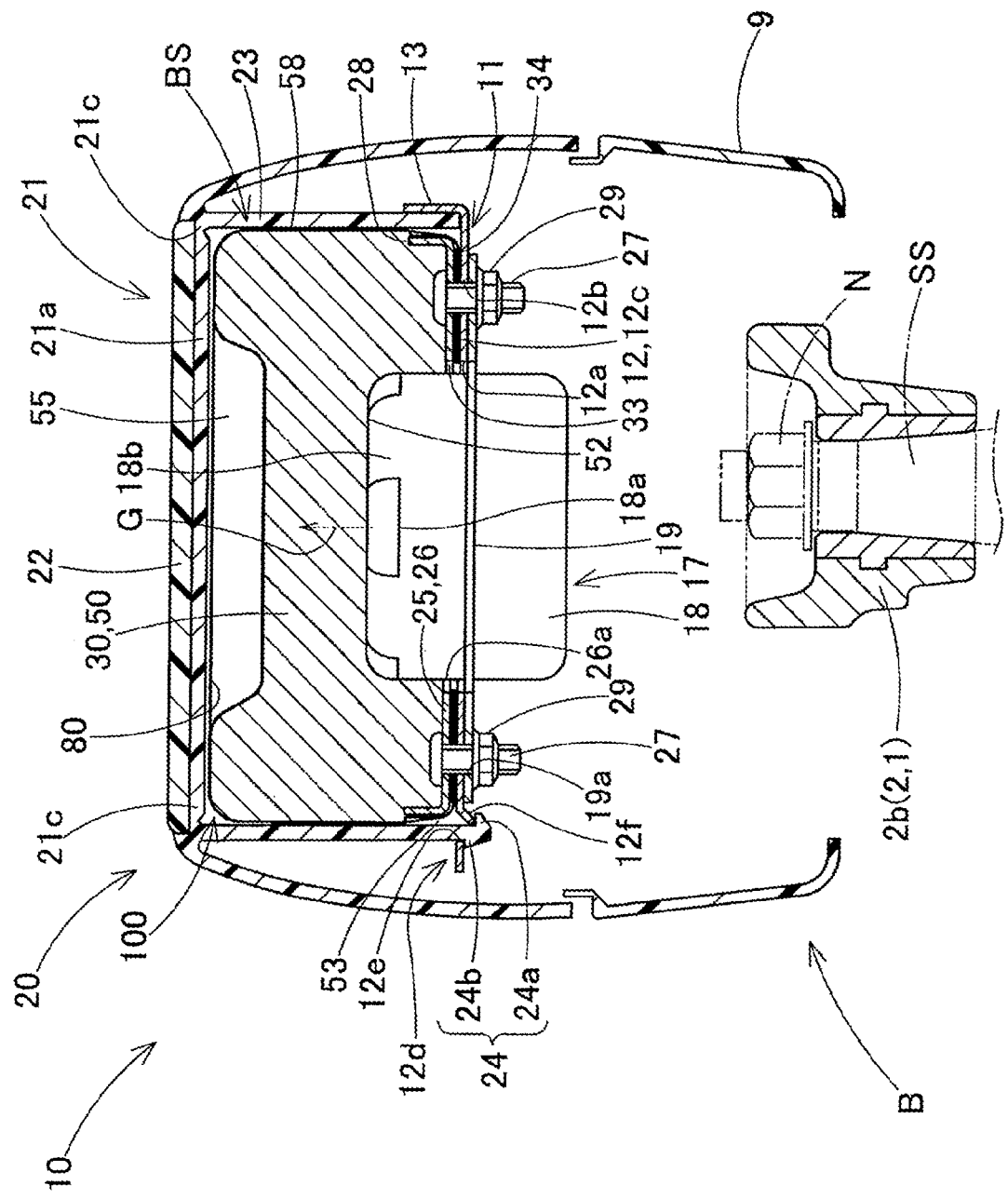
FIG. 3 is a schematic longitudinal cross-sectional view, taken along line in FIG. 1, of the steering wheel on which the airbag device of the first embodiment is mounted.

Hereinafter, a first embodiment of the invention will be described with reference to the drawings. As illustrated in FIGS. 1 to 3, an airbag device 10 of the first embodiment is the airbag device 10 for a driver's seat which is attached and fixed to a boss portion B of a steering wheel W. The steering wheel W is constituted by including a steering wheel main body 1 having a ring portion R of an annular shape which is grasped during steering, the boss portion B which is disposed at a center of the ring portion R and a spoke portion S which connects the ring portion R and the boss portion B; and the air bag device 10 disposed on an upper portion of the boss portion B.

Further, up-down, right-left, and front-rear directions of the air bag device 10, an air bag 30, the steering wheel W, and the likes in the specification are set as follows: Based on straight steering of a vehicle in a state where the steering wheel W is connected and fixed to a steering shaft SS of the vehicle with a nut N, the up-down direction corresponds to an up-down direction along an axial direction of the steering shaft SS, the right-left direction corresponds to a right-left direction of the vehicle in a direction perpendicular to an axis of the steering shaft SS, and the front-rear direction corresponds to a front-rear direction of the vehicle in the direction perpendicular to the axis of the steering shaft SS.

The spoke portions S of the steering wheel W of the first embodiment are constituted of three spoke portions which are located on right and left portion sides and a rear portion side of the boss portion B. The steering wheel main body 1 is constituted by including a core metal 2 which is arranged so as to connect the ring portion R, the boss portion B, and the spoke portions S to one another and a covering layer 3 which is made of urethane or the like covering the ring portion R and a portion of the core metal 2 of the spoke portions S in the vicinity of the ring portion R. A leather 4 is wrapped around a surface of the covering layer 3. Further, decorative garnishes 6 and 8 are arranged on inner circumferential sides of front and rear portions of the ring portion R.

The core metal 2 is constituted of a ring core metal portion 2a which is disposed in the ring portion R, a boss core metal portion 2b which is disposed in the boss portion B and connected to the steering shaft SS, and spoke core metal portions 2c which are disposed in the right and left spoke portions S and connect the ring core metal portion 2a and the boss core metal portion 2b. In the case of the first embodiment, the spoke core metal portions 2c are disposed only in portions of the two right and left spoke portions S on the front side and a bezel 7 is arranged on the spoke portion of the rear portion side so as to cover a rear side of an airbag cover (pad) 20 described below.

A fixing portion 5 for fixing each attachment pin 15a of a horn switch mechanism 14 of the airbag device 10, which will be described below, is disposed on a peripheral edge of the boss core metal portion 2b of the core metal 2. The fixing portion 5 is an attached and fixed part of the airbag device 10 with respect to the steering wheel W and constituted by arranging a locking hole 5a which penetrates in a downwardly narrowing tapered shape and a locking pin 5b which is arranged on a lower surface side of the boss core metal portion 2b and locks a tip end (lower end) of the attachment pin 15a. The locking pin 5b is formed of a deflectable spring material along a lower surface of the boss core metal portion 2b so as to be recoverable.

Further, the steering wheel main body 1 is constituted by disposing a lower cover 9 on the lower surface side of the boss portion B.

The airbag device 10 is constituted by including a folded body 50 of a substantially columnar shape which is formed by folding the airbag 30, an inflator 17 for supplying inflation gas to the airbag 30, an airbag cover (pad) 20 which is made of a synthetic resin and disposed on an upper surface side of the boss portion B so as to cover the folded body 50, a bag holder (case) 11 which is made of metal and used for holding and accommodating the folded body 50 (airbag 30) for mounting it on the boss portion B of the steering wheel W, and a wrapping material 80 for wrapping the folded body 50 so as to prevent the bending-collapse of the folded body 50. The bag holder 11 is a part for attaching, fixing, and accommodating the folded body 50 and also a part for holding the inflator 17 and the airbag cover 20.

In the case of the first embodiment, a retainer 25 having a rectangular annular shape made of sheet metal for attaching and fixing the airbag 30 to the bag holder 11 is disposed inside a bottom surface portion 51 of the folded body 50 which is formed by folding the airbag 30 (see FIGS. 2 to 8). Further, in a state where the retainer 25 is attached to the airbag 30, the airbag 30 is pre-folded and formed in a folding preparation body 44 (see FIGS. 9A and 9B), and further, the folding preparation body 44 is folded into the folded body 50 (see FIGS. 10A to 14B), and then the folded body 50 is wrapped in the wrapping material 80 to form a bag assembly 100 (see FIGS. 15A and 15B) and attached and fixed to the bag holder 11.

As illustrated in FIGS. 2 and 3, the inflator 17 includes a main body portion 18 of a columnar shape and a flange portion 19 of a rectangular annular shape protrudes on an outer circumferential surface of the main body portion 18. In the flange portion 19, a through hole 19a through which a bolt 27 of the retainer 25, which will be described below, passes is formed. A plurality of gas discharge ports 18a for discharging the inflation gas are disposed on an upper portion 18b side located further on an upper side than the flange portion 19 of the main body portion 18.

As illustrated in FIGS. 1 to 3, the airbag cover 20 is made of a synthetic resin such as an olefinic thermoplastic elastomer (TPO) or the like and is disposed on an upper surface side of the boss portion B in the vicinity of the center of the steering wheel W. The airbag cover 20 is constituted by including a ceiling wall portion 21 covering an upper side of the folded body 50 folded and accommodated in the boss portion B and a side wall portion 23 extending substantially in a cylindrical shape from a lower surface of the ceiling wall portion 21 and covering an outer circumference of a side surface portion 58 of the folded body 50 of a substantially columnar shape.

In the ceiling wall portion 21, a door portion 21a of a circular plate shape which is pushed by the inflated airbag 30 and opens to the front side is disposed. The door portion 21a is constituted by providing a hinge portion 21b on a front edge side and providing a rupture expected portion 21c which is thin and has a substantially arcuate shape when viewed from above on the periphery.

In the case of the first embodiment, an ornament 22 which has a substantially circular plate shape and is made of a synthetic resin is fixed to an upper surface side of the door portion 21a. When the door portion 21a opens, the ornament 22 integrally rotates with the door portion 21a.

As illustrated in FIGS. 1 to 3, in the side wall portion 23 of the airbag cover 20, locking leg portions 24 to be joined to the bag holder 11 are disposed at three positions in the front side and obliquely right and left rearward sides. Each locking leg portion 24 protrudes so as to extend downward from the lower end surface of the side wall portion 23 and is inserted through a locking hole 12e in the bag holder 11 and locked to the peripheral edge of the locking hole 12e. The locking leg portion 24 includes an inner protrusion portion 24a protruding to an inner circumferential surface of the side wall portion 23 and an outer protrusion portion 24b protruding toward an outer circumferential surface side of the side wall portion 23. The inner protrusion portion 24a is locked by a tongue piece portion 12f which is deformed in a bending manner after the locking leg portion 24 is inserted into the locking hole 12e and the locking leg portion 24 is pushed by the tongue piece portion 12f, and further, the outer protrusion portion 24b is locked to an outer-edge-side peripheral edge of the locking hole 12e which is the edge away from the inflator 17, whereby the airbag cover 20 is locked with respect to the bag holder 11 while the airbag cover 20 is prevented from coming off upward.

Further, the side wall portion 23 has a configuration where a lower end surface between the locking leg portions 24 and 24 is brought into contact with a base plate portion 12 of the bag holder 11 and the upward movement from the bag holder 11 is regulated by the locking leg portion 24. Therefore, the airbag cover 20 is fixedly attached with respect to the bag holder 11 in a state where the up-down movement and the front-back and right-left movements of the airbag cover 20 are restricted.

As illustrated in FIGS. 1 to 3, the bag holder 11 is constituted as a member made of sheet metal which holds the folded body 50, the inflator 17, and the airbag cover 20 and attaches the airbag device 10 to the steering wheel main body 1 side by using a switch body 15. The bag holder 11 is constituted by including the base plate portion 12 of a substantially annular shape and a side wall supporting portion 13 protruding upward from an outer peripheral edge of the base plate portion 12.

In the base plate portion 12, locking portions 12*d* constituted by passing through the locking holes 12*e* provided with the tongue piece portions 12*f* are disposed on the front side and obliquely right and left rearward sides and switch support portions 12*g* of a substantially semicircular plate shape for fixing respective switch bodies 15 are disposed on the rear side and both the right and left sides. The side wall supporting portion 13 is disposed on an outer circumferential surface side of the side wall portion 23 of the airbag cover 20 in a portion between the locking portion 12*d* and the switch support portion 12*g* and regulates the deformation such as swelling of the side wall portion 23 when the airbag 30 is inflated.

Also, in a center of the base plate portion 12, an insertion hole 12*a* of a substantially circular shape through which the main body portion 18 of the inflator 17 can be inserted from the lower side is open corresponding to an inflow opening 33 of the airbag 30. Further, four through holes 12*b* are formed in the peripheral edge of the insertion hole 12*a* so as to allow respective bolts 27 of the retainer 25 to pass therethrough. Portions provided with the through holes 12*b* in the periphery edge of the insertion hole 12*a* become attachment seats 12*c* for attaching the folded body 50 and the inflator 17 by using the retainer 25.

Three switch bodies 15 disposed in respective switch support portions 12*g* constitute a floating-type horn switch mechanism (horn switch) 14 of the steering wheel W. As illustrated in FIG. 2, each switch body 15 is biased upward by a coil spring 15*b* and the upward biasing position of the switch body 15 is restricted by the attachment pin 15*a* which is locked to the fixing portion 5 of the core metal 2 in a state where the switch body 15 is prevented from coming off upward. When the horn switch mechanism (horn switch) 14 is operated, if the airbag device 10 is pressed, a movable side contact point on the switch support portion 12*g* side in the switch body 15 comes close to and comes into contact with a fixed side contact point on the attachment pin 15*a* side, and therefore, a horn operating circuit is energized and the horn is operated.

Specifically, when a vicinity of the center of the ceiling wall portion 21 of the airbag cover 20 is pushed, the ceiling wall portion 21 abuts on a ceiling portion 54 of the folded body 50 having a shape-retaining property and capable of supporting the ceiling wall portion 21 and the folded body 50 is pushed down, and thus the bag holder 11 on which the bottom surface portion 51 of the folded body 50 moving downward abuts is lowered. Therefore, the bag holder 11 pushes down the movable side contact point of each switch body 15 together with the base plate portion 12. As a result, the horn is operated.

Figure 4A:
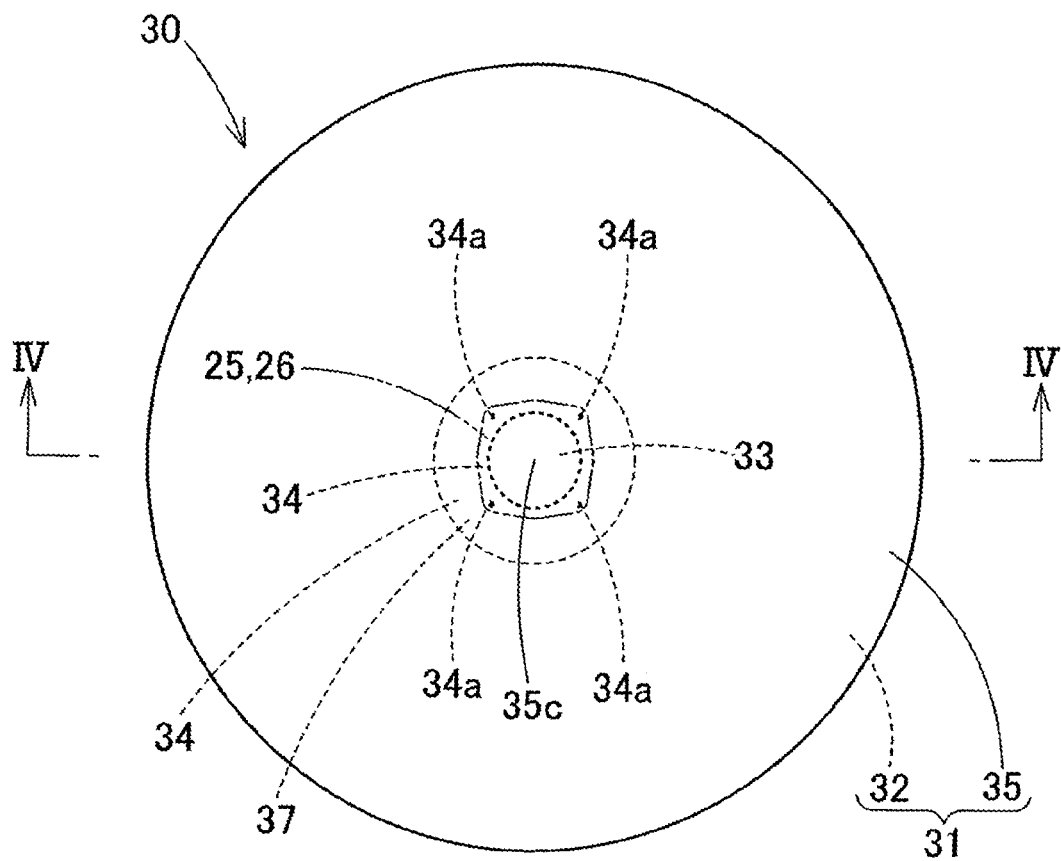
FIGS. 4A and 4B illustrate a schematic plan view and a schematic cross-sectional view which illustrate an inflation completion state of an airbag of the first embodiment as a single body.
Figure 4B:
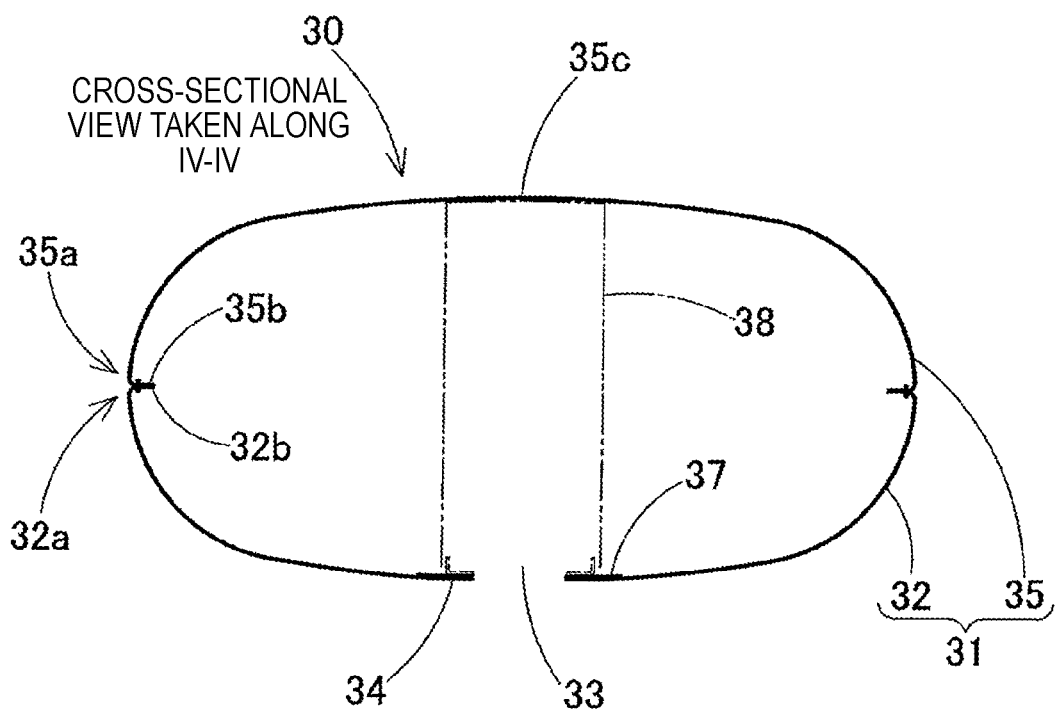
Figure 5:
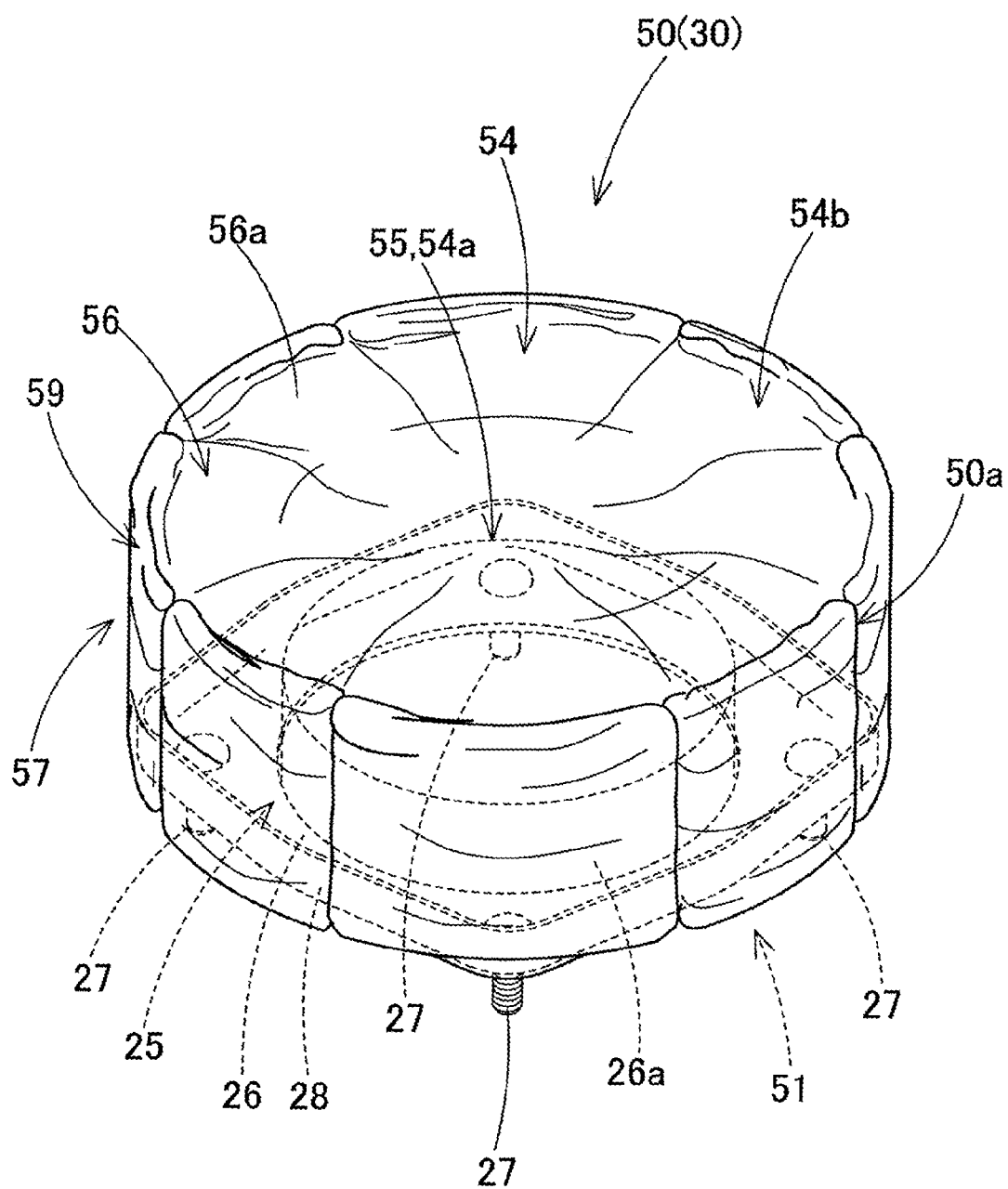
FIG. 5 is a schematic perspective view of a folded body in a state where a retainer having a fastener in the first embodiment is assembled.

As illustrated in the two-dot chain line in FIGS. 1 and 2, the airbag 30 has a substantially circular-plate-shaped inflation completion shape having a thickness similar to a spherical shape and the inflow opening 33 open in a circular shape to inflow the inflation gas is provided in a lower portion side of the air bag 30 (see FIGS. 4A and 4B). The peripheral edge of the inflow opening 33 functions as an attachment portion 34 with respect to the bag holder 11 and four through holes 34*a* through which the bolts 27 of the retainer 25 pass are formed in the attachment portion 34.

An outer circumferential wall 31 of the airbag 30 is constituted by including a vehicle-body-side wall portion 32 in which the inflow opening 33 and the attachment portion 34 described above are arranged in a vicinity of the center and a driver-side wall portion 35 which is arranged so as to oppose the vehicle-body-side wall portion 32 in a state where an outer peripheral edge 35*a* is continuous with the outer peripheral edge 32*a* of the vehicle-body-side wall portion 32. The vehicle-body-side wall portion 32 and the driver-side wall portion 35 are formed from a base fabric for a bag made of a synthetic fiber such as polyamide or polyester having flexibility in which both outer shapes are circular. In addition, sewing margins 32*b* and 35*b* provided on the outer peripheral edges 32*a* and 35*a* are stitched together to form the outer circumferential wall 31.

Further, the attachment portion 34 of the vehicle-body-side wall portion 32 is formed as a substantially rectangular annular portion of which an inner surface abuts on a lower surface side of a bottom wall portion 26 of the retainer 25, which will be described below, and which is fixed to the attachment seat 12*c* of the bag holder 11.

As illustrated in FIGS. 1 to 3 and 5 to 8, the retainer 25 is formed from sheet metal including the bottom wall portion 26 which has a rectangular annular shape and has a communicating opening 26*a* open corresponding to the inflow opening 33 at a center and a reinforcing rib 28 which is arranged to rise from the entire circumference of an outer peripheral edge of the bottom wall portion 26. The communicating opening 26*a* is a circular opening having the same shape as the inflow opening 33. The retainer 25 includes the plurality of bolts 27 which protrude downward from the bottom wall portion 26 around the communicating opening 26*a*, the bottom wall portion 26 being centered on the communicating opening 26*a*, and are used for fixing the attachment portion 34 of the airbag 30 to the bag holder 11. The respective bolts 27 protrude downward from the vicinities of four corners of the bottom wall portion 26 of a rectangular annular shape. The retainer 25 is disposed in the attachment portion 34 of the inflow opening 33 in the airbag 30. The respective bolts 27 of the retainer 25 pass successively through the through holes 34*a* of the airbag 30, the through holes 12*b* of the bag holder 11, and the through holes 19*a* of the flange portion 19 of the inflator 17 and nuts 29 are fastened to the respective bolts 27, in such a manner that the retainer 25 attaches the airbag 30 and the inflator 17 to the bag holder 11.

Each bolt 27 also has a function as a fastener for locking a bottom surface cover portion 84 of the wrapping material 80 wrapping the folded body 50 by being fitted into a locking hole 84*a* described below.

A reinforcing cloth 37 of an annular shape is sewn to a portion of the attachment portion 34 in the airbag 30 in order to increase the heat resistance of the attachment portion 34 and a tether 38 which extends from an outer peripheral edge of the reinforcing cloth 37, connects the attachment portion 34 and a central portion 35*c* of the driver-side wall portion 35, and regulates a separation distance of the vicinity of the central portion 35*c* of the airbag 30 from the attachment portion 34, is also disposed. Therefore, the retainer 25 actually abuts on the attachment portion 34 of the vehicle-body-side wall portion 32 with the reinforcing cloth 37 interposed therebetween.

As illustrated in FIGS. 5 to 8, the folded body 50 of the airbag 30 has a substantially columnar three-dimensional shape including a bottom surface portion 51, the ceiling portion 54 disposed so as to oppose the bottom surface portion 51, and the side surface portion 58 between the bottom surface portion 51 and the ceiling portion 54. As illustrated in FIGS. 9A and 9B, the folded body 50 is folded from an initial preparation body 40 spread flatly through a small-diameter folding process (see FIGS. 9A to 13C) as a first process of the folding process and a compression process (see FIGS. 14A and 14B) as a second process. The small-diameter folding process as the first process of the folding process is a process of collecting the flatly spread initial preparation body 40 on the inflow opening 33 side as illustrated in FIGS. 9A and 9B and the compression process as the second process is a process of compressing the ceiling portion 54 and the bottom surface portion 51 of the folded body 50 (preliminary folded body 49) in a direction in which those approach each other. The folded body 50 is formed through those folding processes, so a large number of wrinkles 50a (see FIG. 5) are arranged on the outer surface side.

Figure 7:
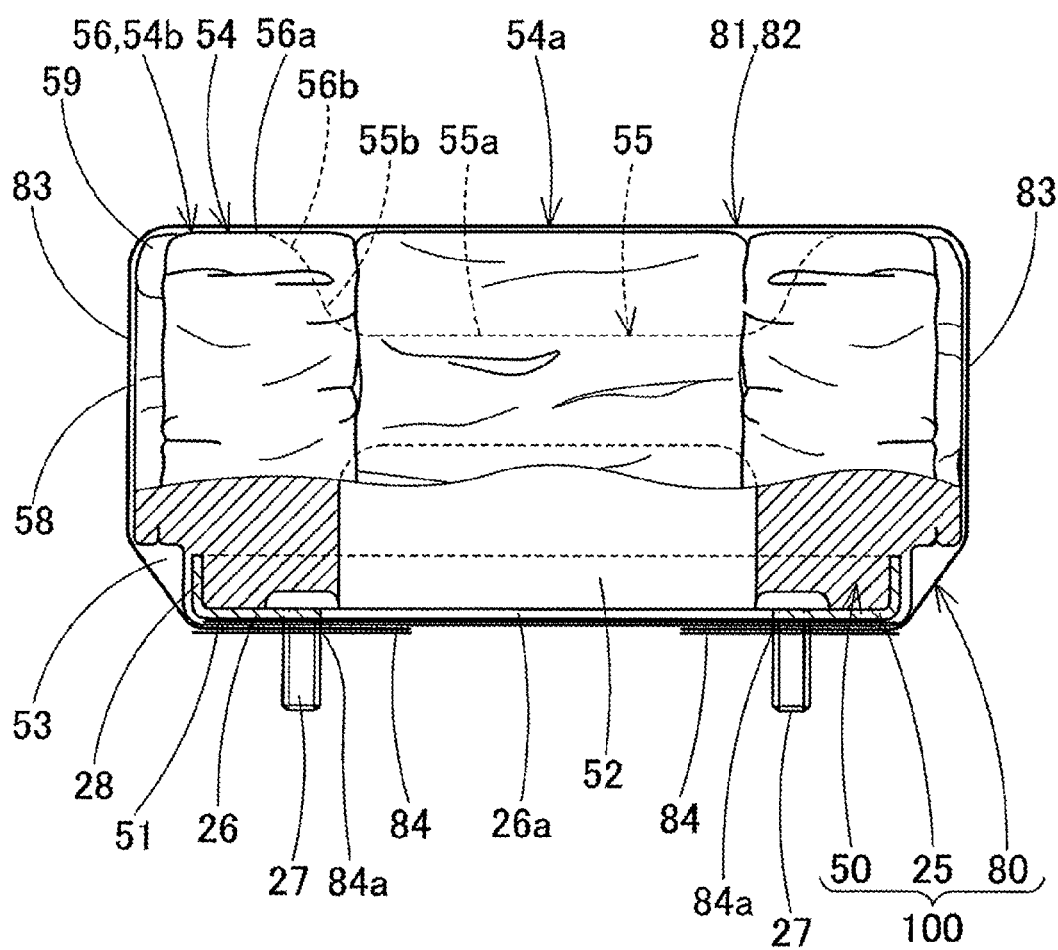
FIG. 7 is a schematic partial cross-sectional view of the folded body in a state where the folded body is wrapped in the wrapping material in the first embodiment.
Figure 20A:
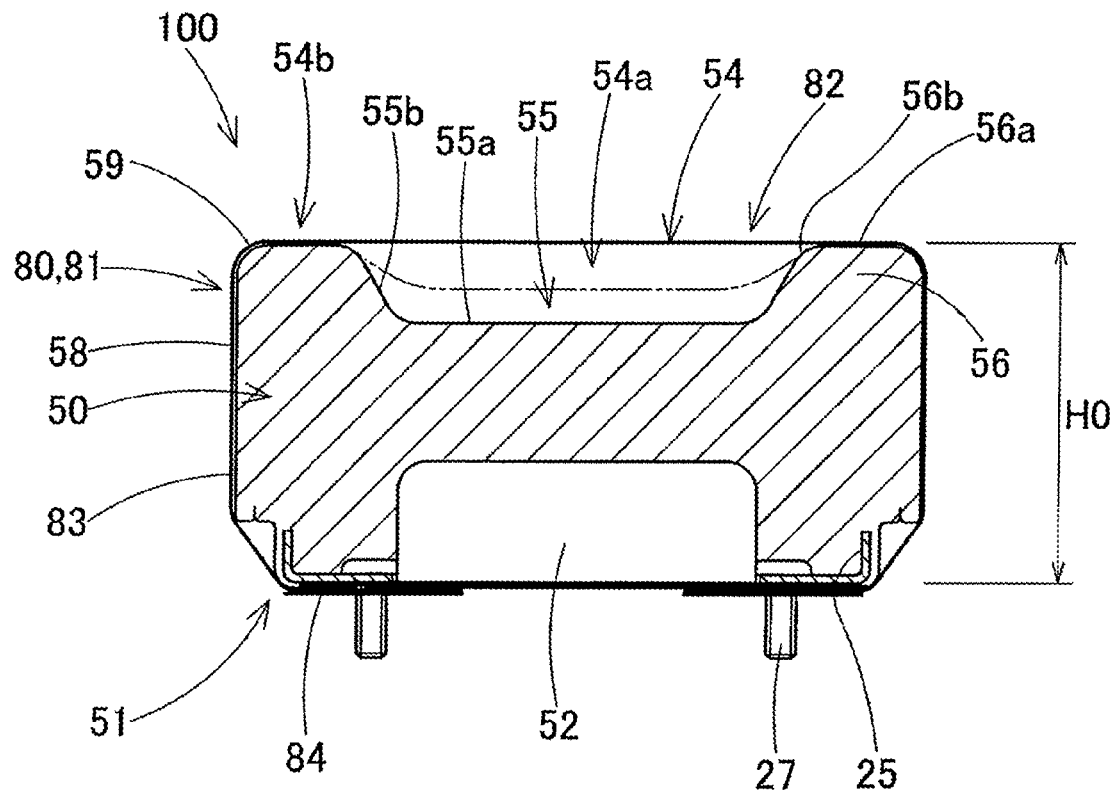
FIGS. 20A and 20B are a schematic cross-sectional view of a bag assembly in which the folded body of the first embodiment is wrapped with the wrapping material and a schematic cross-sectional view of the bag assembly of a comparative example.

In the ceiling portion 54 of the folded body 50, a recess portion 55 which is further recessed than an outer peripheral edge 54b side is provided in a vicinity of a center 54a, and a ceiling surface 56a substantially parallel to the bottom surface portion 51 is provided on the outer peripheral edge 54b side, and further, a raised portion 56 raised from the recess portion 55 is disposed so as to surround the entire periphery around the recess portion 55 (see FIGS. 7 and 20A). The recess portion 55 at the center of the ceiling portion 54 has a truncated conical recess shape and is constituted by extending an inclined portion 55b of which the diameter increases as it extends from a bottom portion 55a toward an inner peripheral edge 56b side of the raised portion 56. The recess portion 55 is disposed to prevent a portion near the center 54a of the ceiling portion 54 of the folded body 50 from being raised higher than the ceiling surface 56a when the folded body 50 is wrapped with the wrapping material 80.

In the folded body 50, a recess portion 52 corresponding to the upper portion 18b is disposed on a center of the bottom surface portion 51 so that the upper portion 18b of the columnar main body portion 18 of the inflator 17 can be smoothly accommodated and a recess portion 53 which is a recessed portion on the bottom surface portion 51, and which is the recessed portion outside the rectangular annular bottom wall portion 26 of the retainer 25, is disposed. In the recess portion 53, the retainer 25 is disposed inside the folded body 50 and the recess portion 53 is formed for preventing partial bite of the airbag 30 between the retainer 25 and the bag holder 11.

Figure 6:
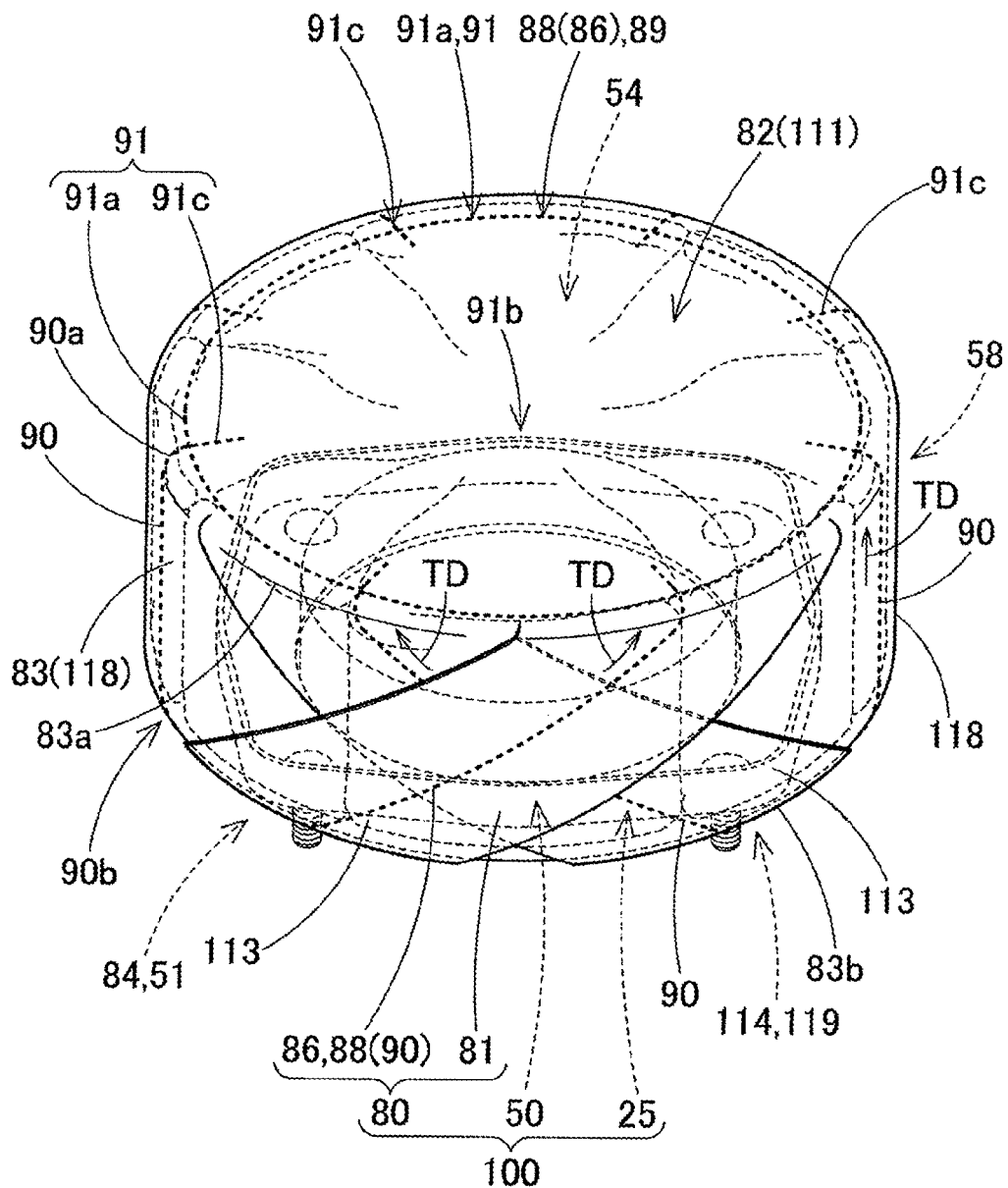
FIG. 6 is a schematic perspective view of the folded body in a state where the folded body is wrapped in a wrapping material according to the first embodiment.
Figure 8:
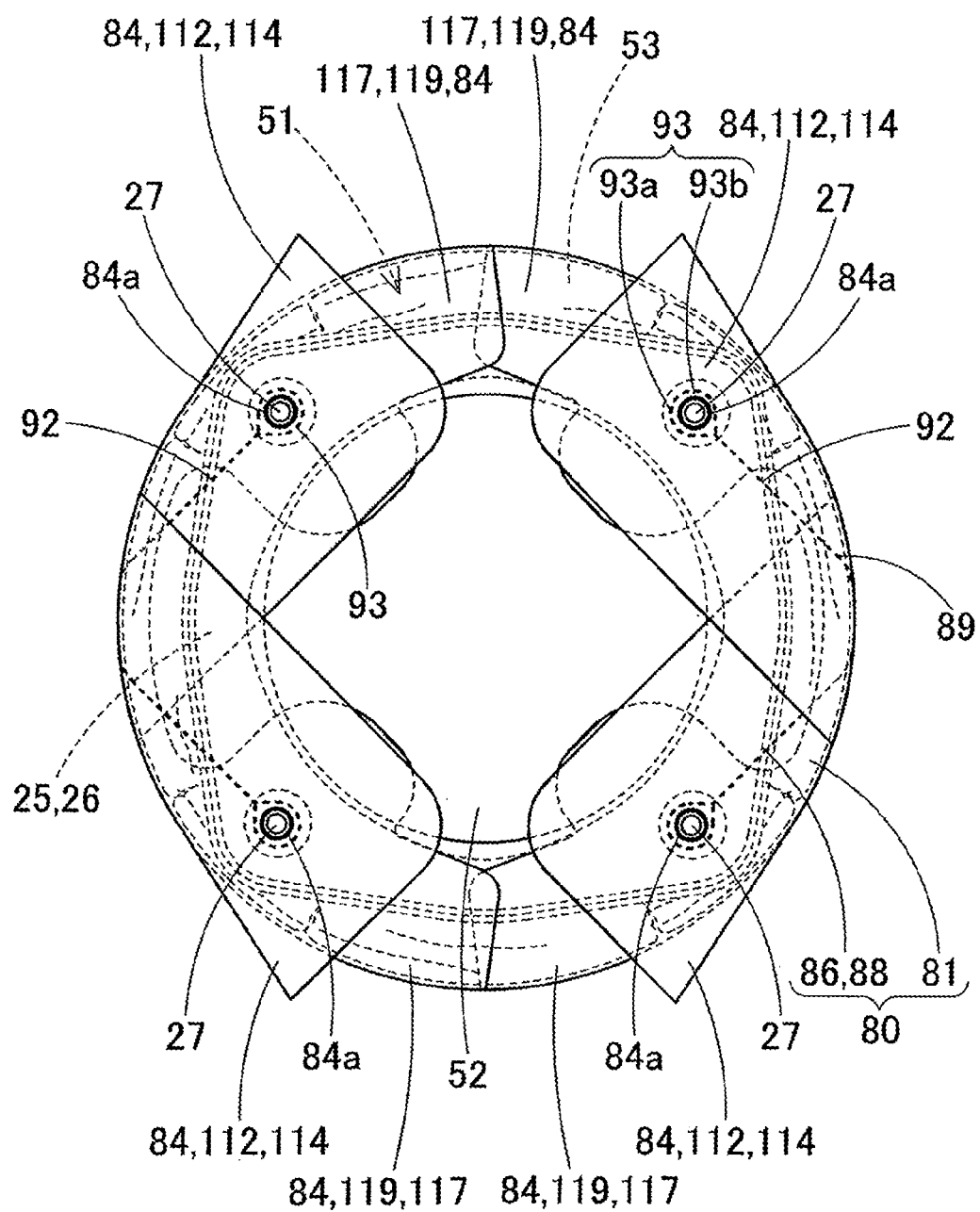
FIG. 8 is a schematic bottom view of the folded body in a state where the folded body is wrapped in the wrapping material in the first embodiment.
Figure 9A:
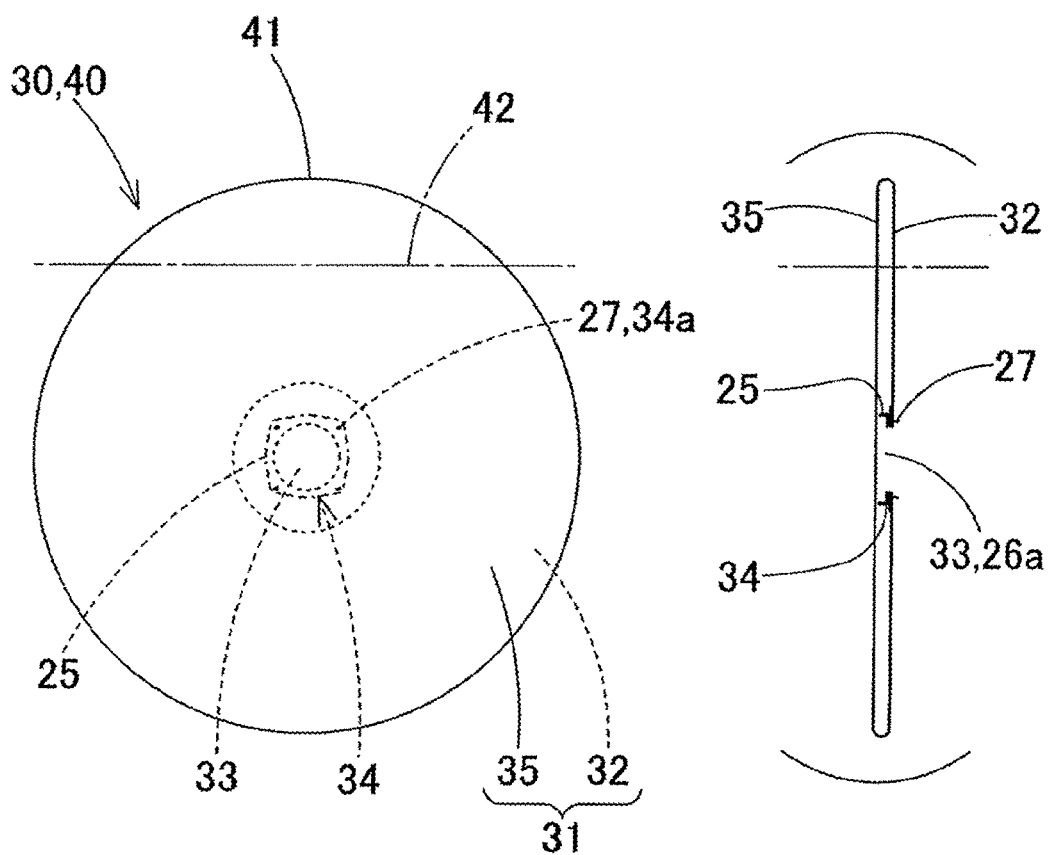
FIGS. 9A and 9B are views for illustrating an initial stage of a folding process of the airbag of the first embodiment.
Figure 9B:
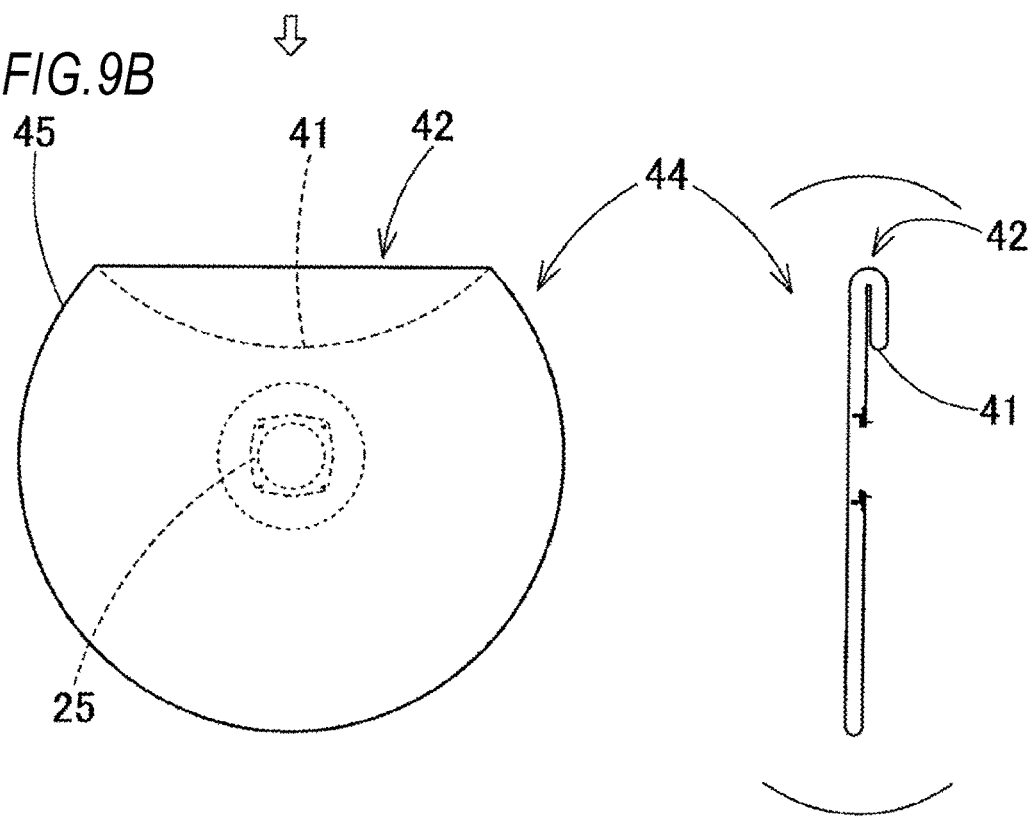

As illustrated in FIGS. 6 to 8, the wrapping material 80 wrapping (covering) the folded body 50 is constituted of a cover member 81 having flexibility and a sheet shape and an elongation regulating member 86 provided on the cover member 81. The cover member 81 is formed from a base fabric for a bag made of a synthetic fiber such as polyamide or polyester having flexibility similar to the wall portions 32 and 35 of the airbag 30. In a case of the first embodiment, the elongation regulating member 86 is constituted by an elongation regulating sewn portion 88 formed by sewing a restricting position of the extension of the cover member 81 with a sewing thread 89. The sewing thread 89 is made of a synthetic fiber such as polyamide or polyester and sewn to the cover member 81 by a lock stitch.

Figure 16:
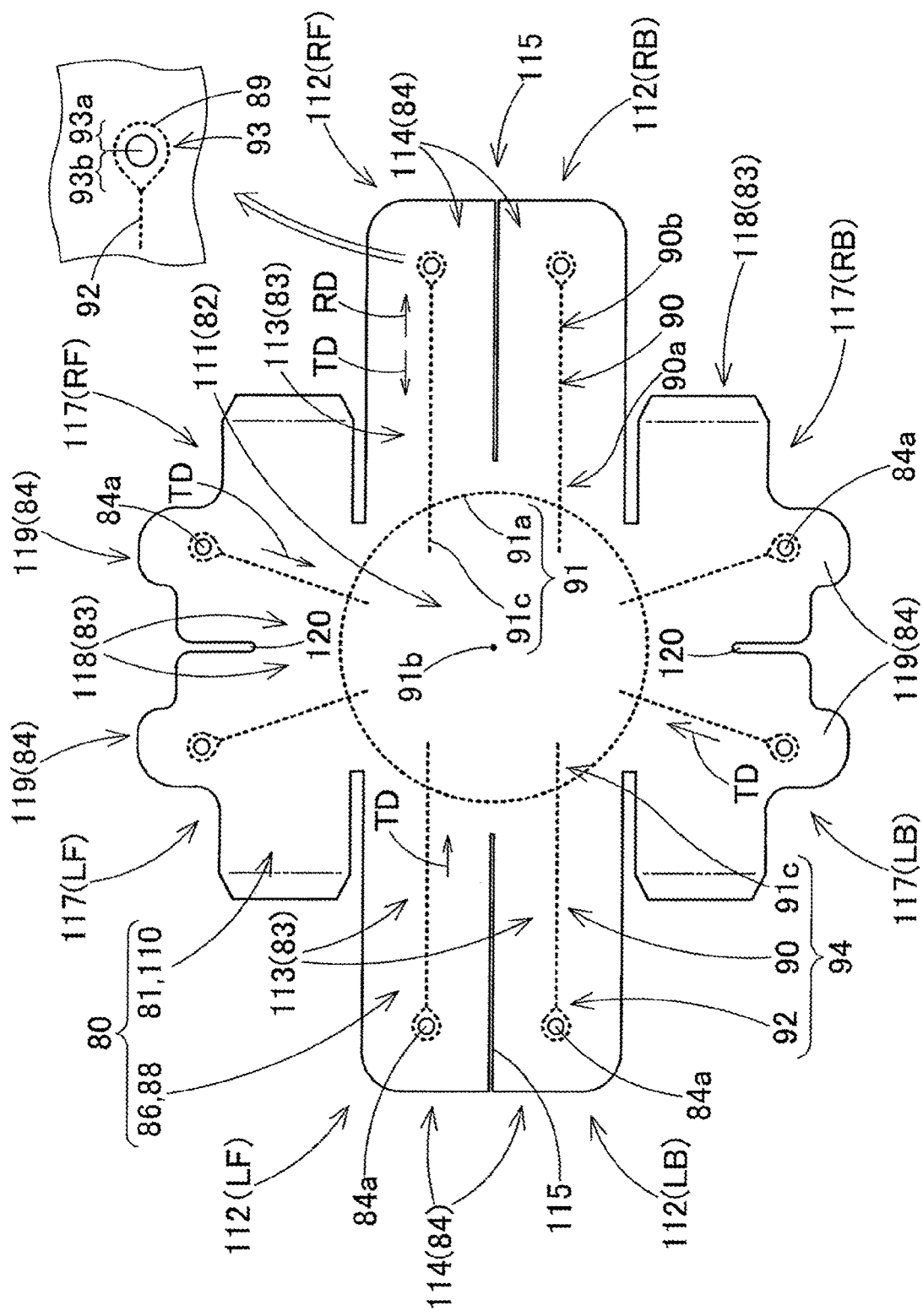
FIG. 16 is a plan view of a state where the wrapping material of the first embodiment is flatly spread.

The cover member 81 is constituted by including a ceiling cover portion 82 covering the ceiling portion 54 of the folded body 50, a side surface cover portion 83 covering the side surface portion 58, and a bottom surface cover portion 84 covering the bottom surface portion 51 and having the locking hole 84a for locking the bolt 27 serving as a fastening tool. In a state where the cover member 81 is flatly spread, the cover member 81 is formed of a covering material base fabric 110 as illustrated in FIG. 16. The covering material base fabric 110 is constituted by including a total of four band-shaped overhang portions 112 protruding in a band shape two by two in the right-left direction from a central portion 111 of a substantially circular-plate-shaped area and a total of four radial overhang portions 117 protruding from the central portion 111 to both right and left sides in the front-rear direction.

The central portion 111 forms a ceiling cover portion 82 of the cover member 81. In the band-shaped overhang portion 112 and the radial overhang portion 117, adjacent portions 113 and 118 near the central portion 111 form a side surface cover portion 83 of the cover member 81 and tip end portions 114 and 119 form a bottom surface cover portion 98, and further, the locking holes 84a for locking the bolts 27 are disposed in vicinities of the tip ends.

In addition, in the covering material base fabric 110, an annular portion 91a of a ceiling-side sewn portion 91 in which the sewing thread 89 is sewn in a circle shape is disposed in the central portion 111 and locking-hole-side sewn portions 93 formed by sewing the sewing thread 89 so as to surround the entire peripheries of the locking holes 84a are disposed on the peripheries of the locking holes 84a of the respective overhanging portions 112 and 117. In addition, in each of the overhanging portions 112 and 117, a straight sewn portion 94 which linearly extends from each locking hole 84a toward a center 91b side of the annular portion 91a of the ceiling-side sewn portion 91 and extends from the locking-hole-side sewn portion 93 so as to intersect with the annular portion 91a of the ceiling-side sewn portion 91. In the straight sewn portion 94, a portion in a vicinity of the locking-hole-side sewn portion 93 constitutes a bottom-side sewn portion 92 arranged in the bottom surface cover portion 84 of the cover member 81 and a portion intersecting with the annular portion 91a away from the locking hole 84a constitutes an extension portion 91c of the ceiling-side sewn portion 91 disposed in a ceiling cover portion 96 of the cover member 81, and further, a portion between the bottom-side sewn portion 92 and the extension portion 91c constitutes a lateral-surface-side sewn portion 90 disposed in a side surface cover portion 97 of the cover member 81. As described above, the ceiling-side sewn portion 91 is constituted by including the annular portion 91a and the extension portion 91c.

In the covering material base fabric 110, as illustrated in FIGS. 17A to 18B, in a tip end portion 119LF on the left side and a tip end portion 119RF on the right side which are arranged on the left and right sides with a front-side slit 120 interposed therebetween, for example, the tip end portion 119LF on the left side makes the locking hole 84a locked to a bolt 27LF on a left front side and the tip end portion 119RF on the right side makes the locking hole 84a locked to a bolt 27RF on a right front side. Further, in a tip end portion 119LB on a left rear side and a tip end portion 119RB on a right rear side which are arranged on the left and right sides with a rear-side slit 120 interposed therebetween, the tip end portion 119LB on the left rear side makes the locking hole 84a locked to a bolt 27LB on a left rear side and the tip end portion 119RB on the right rear side makes the locking hole 84a locked to a bolt 27RB on a right rear side. Further, as illustrated in FIGS. 17A and 17B and FIGS. 19A and 19B, in tip end portions 114 (LF, LB) arranged on the front and rear sides with a left-side slit 115 interposed therebetween, for example, the tip end portion 114LB on the left rear side makes the locking hole 84a locked to the bolt 27LF on the left front side and the tip end portion 114LF on the left front side makes the locking hole 84a locked to the bolt 27LB on the right rear side. Further, in tip end portions 114 (RF, RB) arranged on the front and rear sides with a right-side slit 115 interposed therebetween, for example, the tip end portion 114RF on the right front side makes the locking hole 84a locked to the bolt 27RB on the right rear side and the tip end portion 114RB on the right rear side makes the locking hole 84a locked to the bolt 27RF on the right front side. Therefore, the wrapping material 80 can wrap the folded body 50 so as to prevent the bending-collapse of the folded body 50.

In this case, in the covering material base fabric 110, the central portion 111 covers the ceiling portion 54 of the folded body 50 and constitutes the ceiling cover portion 82 of the cover member 81 and the adjacent portions 113 and 118 of the band-shaped overhang portion 112 and the radial overhang portion 117 cover the side surface portion 58 of the folded body 50 and constitute the side surface cover portion 83 of the cover member 81, and further, the tip end portions 114 and 119 cover the bottom surface portion 51 of the folded body 50 and form the bottom surface cover portion 98 of the cover member 81 (see FIGS. 6 and 16).

The length from the central portion 111 to each locking hole 84a in the covering material base fabric 110 is set to a length dimension where the cover member 81 can strongly press and wrap the folded body 50 when each locking hole 84a is locked to the bolt 27 as a predetermined fastener.

Figure 17A:
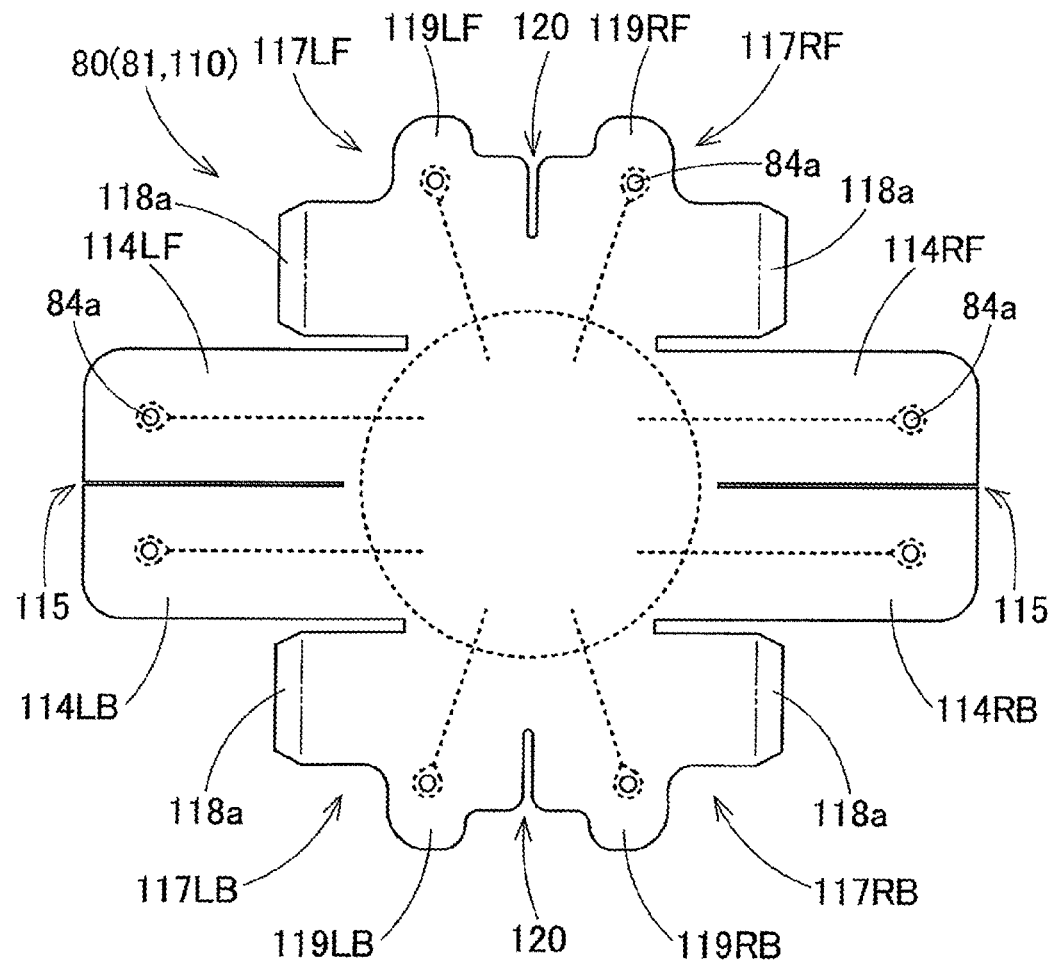
FIGS. 17A and 17B are plan views for illustrating a state where predetermined overhanging portions of the wrapping material are joined to each other before the folded body of the airbag of the first embodiment is wrapped.
Figure 17B:
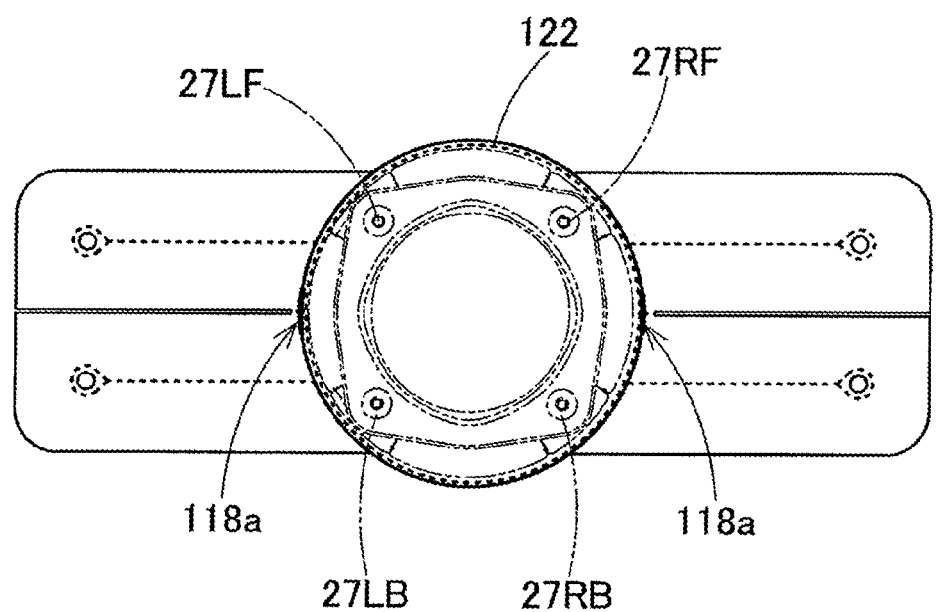
Figure 18A:
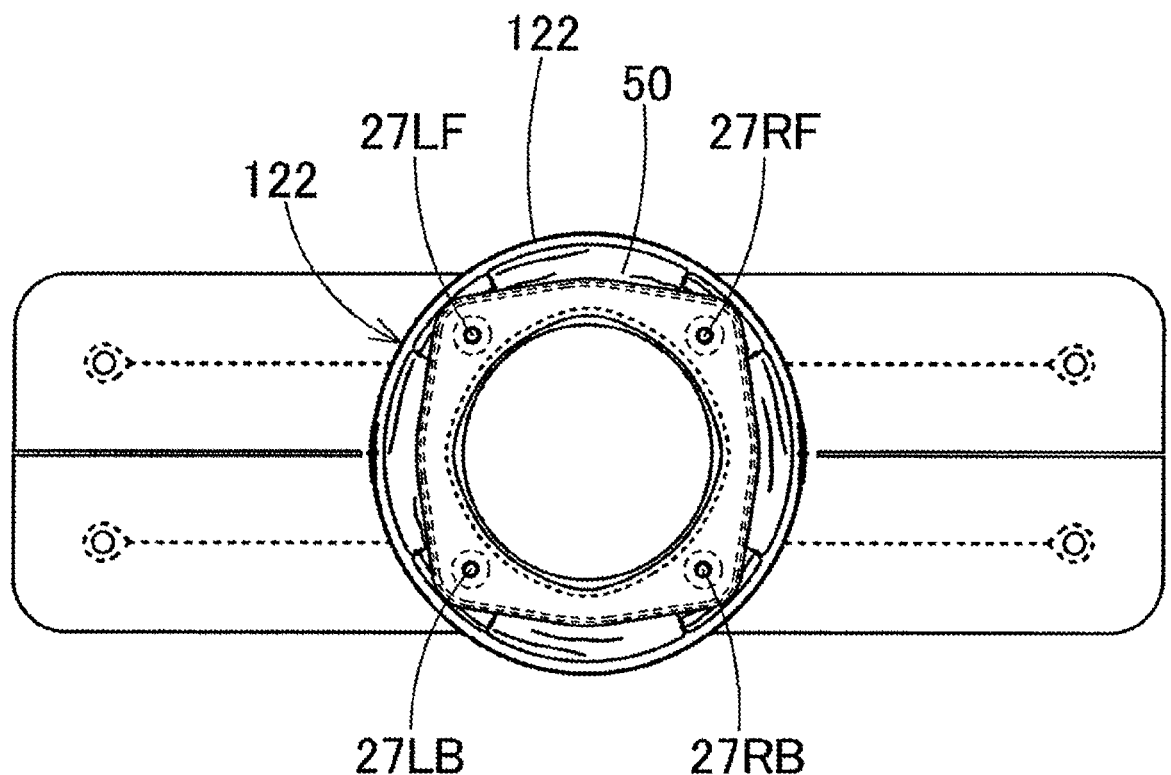
FIGS. 18A and 18B are views for illustrating a state where the folded body of the airbag of the first embodiment is wrapped with the wrapping material.
Figure 18B:
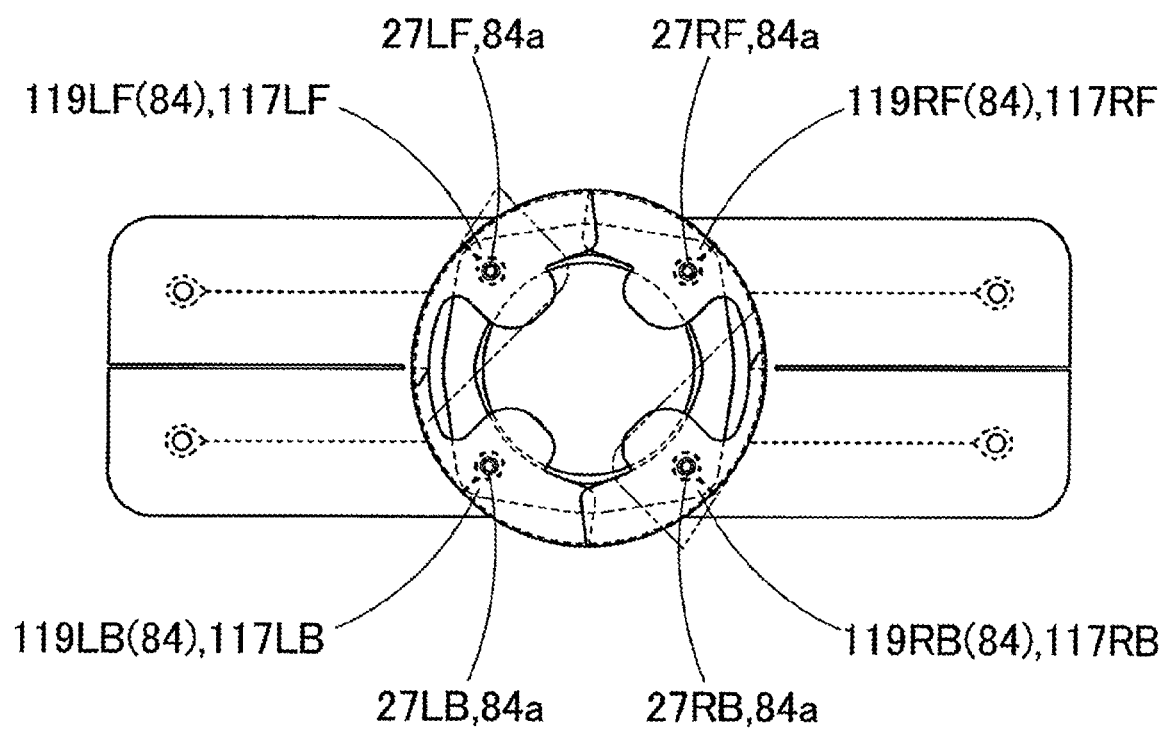
Figure 19A:
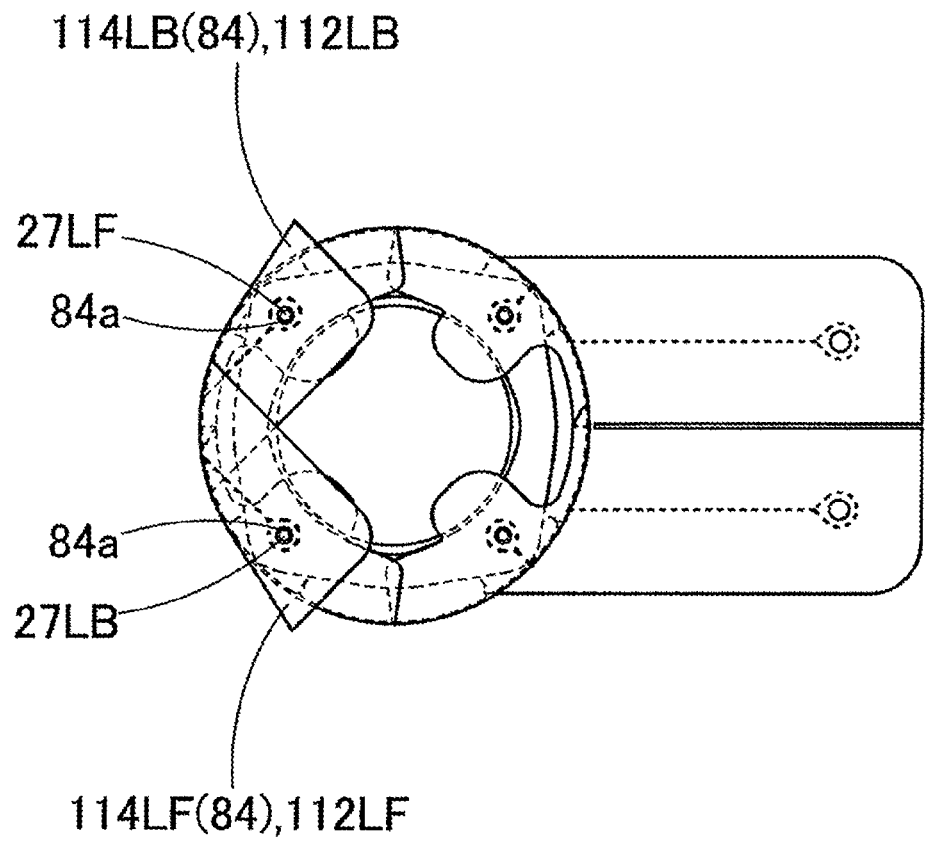
FIGS. 19A and 19B are views for illustrating a state where the folded body of the airbag of the first embodiment is wrapped with the wrapping material and illustrate a state after the state in FIGS. 18A and 18B.
Figure 19B:
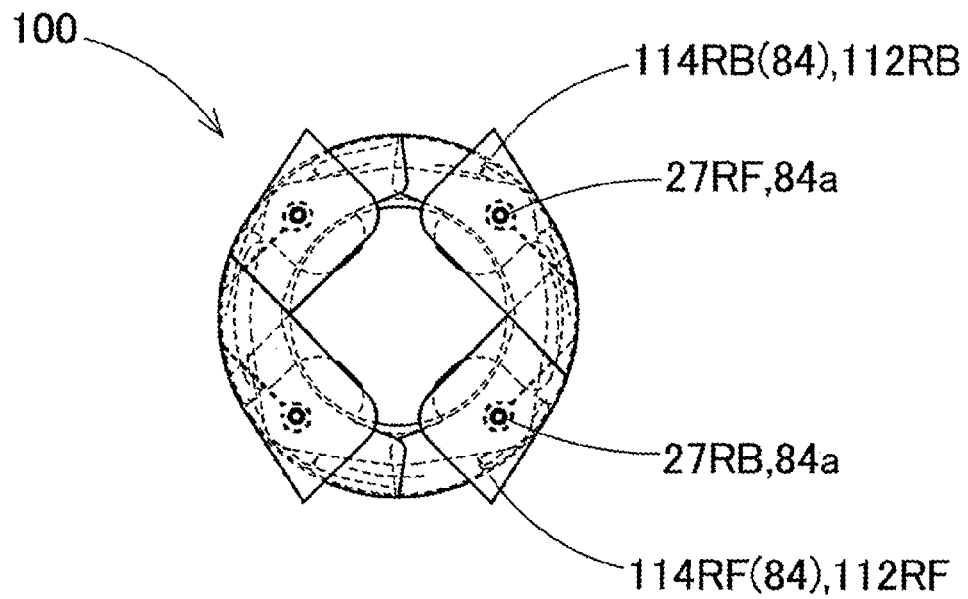

The covering material base fabric 110 is constituted such that, as illustrated in FIGS. 17A and 17B, edges of the adjacent portions 118 of the radial overhang portions 117LF on the left front side and the radial overhang portions 117LB on the left rear side are sewn together as joining edges 118a before each locking hole 84a is locked to the bolt 27 and edges of the adjacent portions 118 of the radial overhang portions 117RF on the right front side and the radial overhang portions 117RB on the right rear side are also sewn together as joining edges 118a, in such a manner that a cylindrical portion 122 is formed and the locking operation to the bolt 27 can be easily performed in a state where the folded body 50 is disposed in the cylindrical portion 122.

When the wrapping material 80 wraps the folded body 50 as described above, as illustrated in FIG. 6, each lateral-surface-side sewn portion 90 is disposed to extend from an edge 83b of the side surface cover portion 83 near the bolt 27, which is the edge 83b on the bottom surface cover portion 84 side near the bolt 27, to an edge 83a on the ceiling cover portion 82 side in a part of the corresponding ceiling-side sewn portion 91 substantially along a facing direction between the ceiling cover portion 82 and the bottom surface cover portion 84 with the shortest distance. Also, the annular portion 91a of the ceiling-side sewn portion 91 is disposed along the outer peripheral edge of the ceiling cover portion 82 in the vicinity of the outer peripheral edge of the ceiling cover portion 82 and the extension portion 91c is disposed so as to extend from an end portion 90a of the lateral-surface-side sewn portion 90, which is the end portion 90a on the ceiling cover portion 82 side, toward the center 91b side of the ceiling cover portion 82. Further, the bottom-side sewn portion 92 is disposed so as to extend from an end portion 90b of the lateral-surface-side sewn portion 90, which is the end portion 90b on the bottom surface cover portion 84 side, to the locking-hole-side sewn portion 93 (see FIG. 8).

A manufacturing process until the airbag 30 with the retainer 25 assembled is assembled to the bag holder 11 is constituted of a folding process (see FIGS. 9A to 14B) including the small-diameter folding process and the compression process; and a wrapping process (see FIGS. 15A and 15B and FIGS. 17A to 19B) for wrapping the folded body 50 with the wrapping material 80.

The small-diameter folding process in the folding process will be described. As illustrated in FIG. 9A, the retainer 25 is disposed to the attachment portion 34 in the airbag 30 such that each bolt 27 protrudes from the through hole 34a and the driver-side wall portion 35 is overlaid on the vehicle-body-side wall portion 32, in such a manner that the initial preparation body (also referred to as an initial spread body) 40 which is the flatly spread airbag 30 is formed.

Next, the folding preparation body 44 is formed as illustrated in FIG. 9B. A fold 42 along the right-left direction is provided on a front edge 41 side of the initial preparation body 40 and the front edge 41 is folded back so as to approach the inflow opening 33 side in the vehicle-body-side wall portion 32, in such a manner that the folding preparation body 44 can be formed.

Figure 10A:
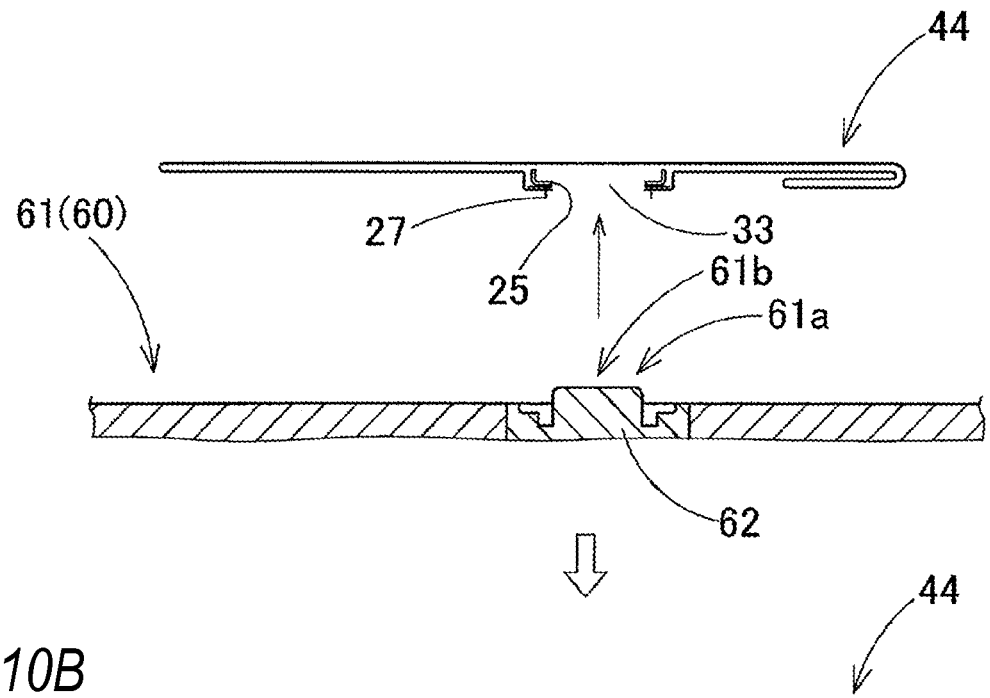
FIGS. 10A, 10B and 10C are schematic cross-sectional views for illustrating a small-diameter folding process as a first process in the folding process of the airbag of the first embodiment and illustrate processes succeeding the process in FIG. 9.
Figure 10B:
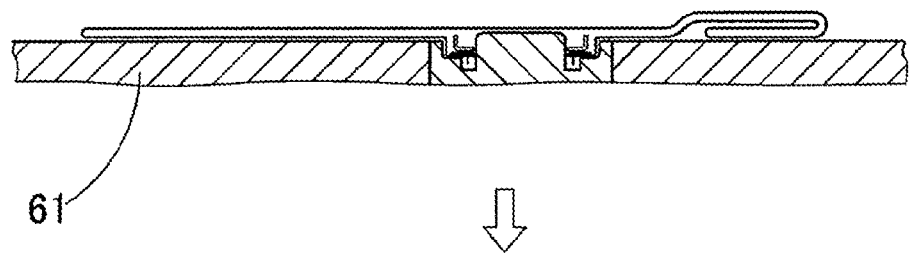
Figure 10C:
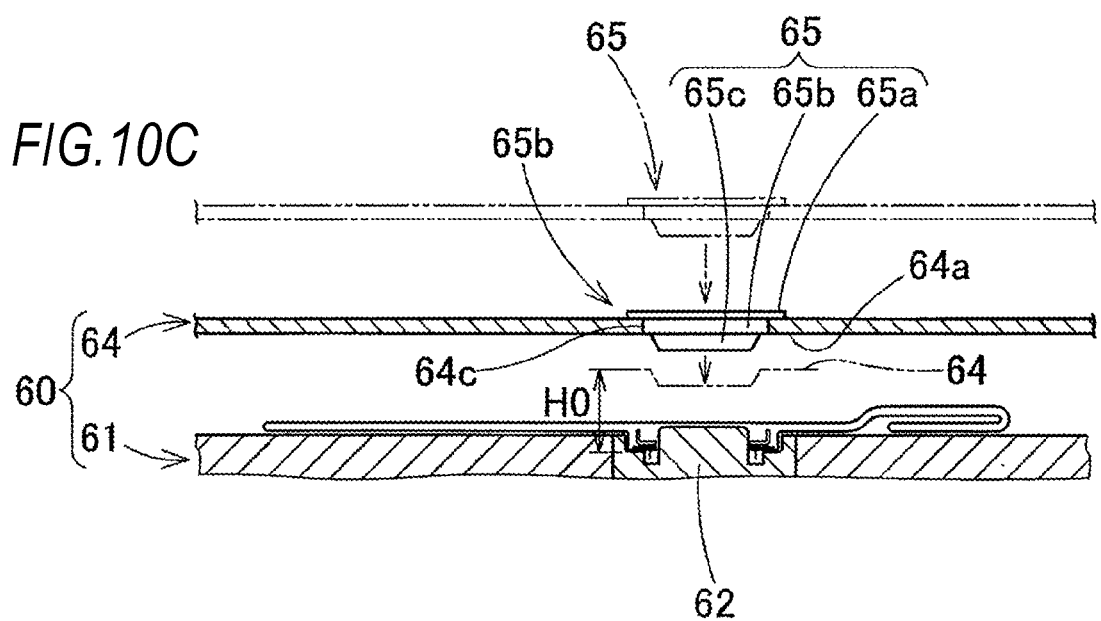
Figure 11:
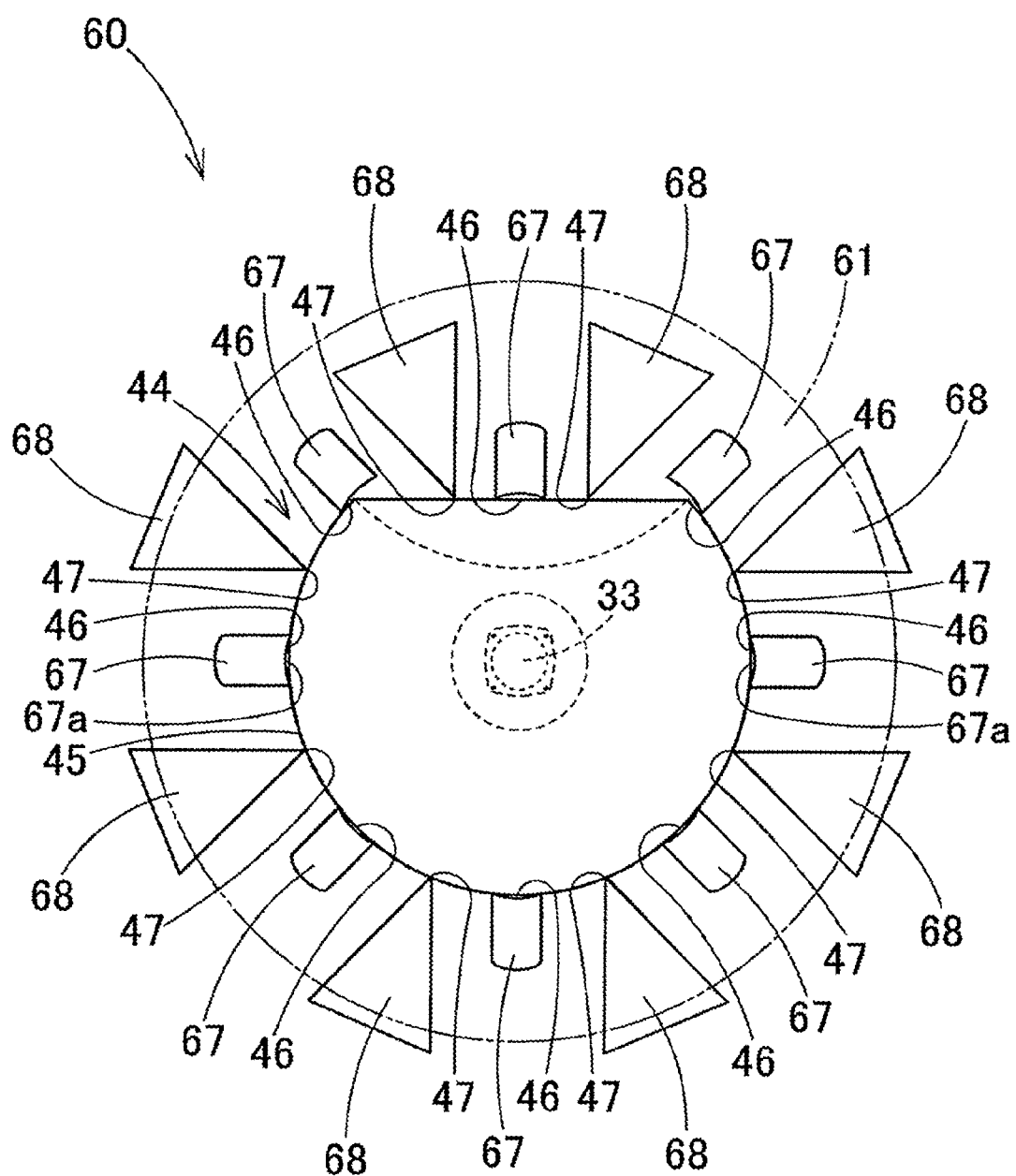
FIG. 11 is a schematic plan view for illustrating the small-diameter folding process of the airbag of the first embodiment and illustrates a process succeeding the processes in FIG. 10.

Next, as illustrated in FIGS. 10A to 11, the folding preparation body 44 is set on a bag folding machine 60, and then an outer peripheral edge 45 side is gathered above the inflow opening 33 and folded so as to have a small diameter as illustrated in FIGS. 12A to 13C.

As illustrated in FIGS. 10A to 12B, the bag folding machine 60 is constituted by including a bottom-side base plate 61, a ceiling-side base plate 64 disposed above the bottom-side base plate 61 so as to be vertically movable, and two kinds of eight push-in tools 67 and eight push-in tools 68 which move to a center 61b side of the bottom-side base plate 61 on the bottom-side base plate 61. A setting portion 62 to which each bolt 27 of the retainer 25 protruding from the folding preparation body 44 is fitted is disposed on the center 61b on an upper surface side of the bottom-side base plate 61. A portion of the setting portion 62 on the upper surface side of the bottom-side base plate 61 has small concave and convex portions capable of forming the recessed portions 52 and 53 of the folded body 50 of the airbag 30 and becomes a molding surface (mold surface) 61a which forms the bottom surface portion 51 side. Further, a portion of the setting portion 62 is configured to be movable upward from the bottom-side base plate 61 (see FIG. 13C) and configured so that the folded body 50 (preliminary folded body 49) after the small-diameter folding process can be extruded and taken out such that the folded body 50 can be shifted to the compression process. In addition, the push-in tools 67 are configured so that eight portions 46 in the outer peripheral edge 45 of the folding preparation body 44 can be gripped and can be pushed toward the center 61b side (see FIGS. 11 and 12B). Further, a mold surface 67a corresponding to an arcuate curved surface in the columnar side surface portion 58 of the folded body 50 is formed on the setting portion 62 side of the push-in tool 67. The push-in tool 68 has a substantially triangular plate shape with a tapered setting portion 62 side.

A portion in a vicinity of a center of a lower surface side of the ceiling-side base plate 64 becomes a molding surface (mold surface) 64a for forming the ceiling portion 54 of the folded body 50. A setting portion 64b is provided at a center of the molding surface 64a for assembling a pressing jig 65 for shaping the recessed portion 55 of the folded body 50.

Figure 21A:
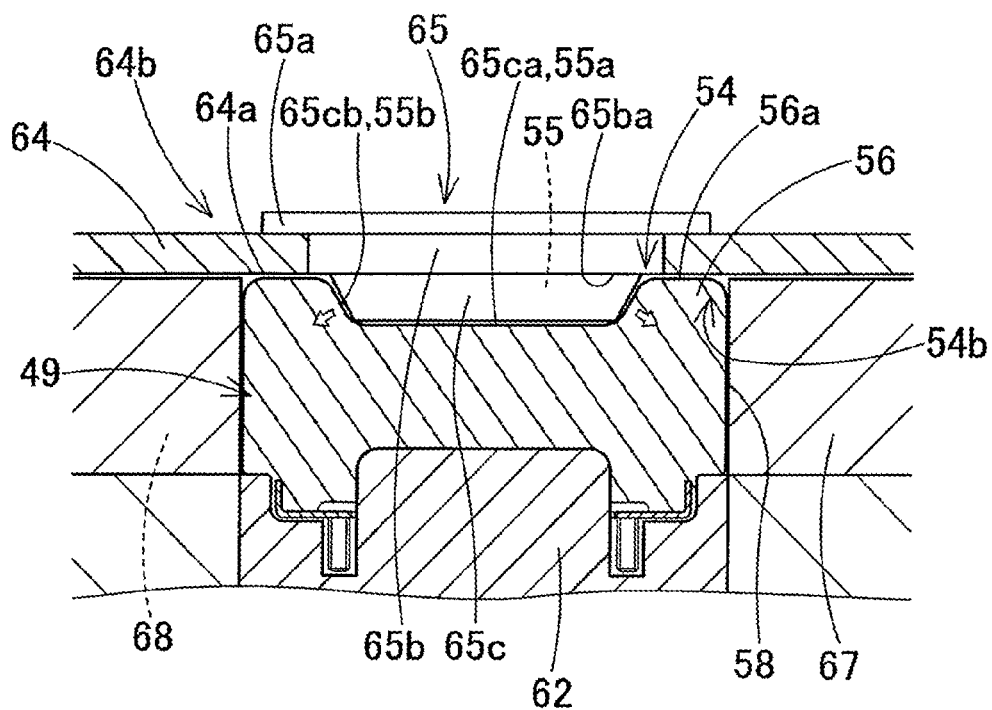
FIGS. 21A and 21B are views for illustrating an operation of a pressing jig for forming a recess portion in the folded body of the airbag of the first embodiment.

The pressing jig 65 is constituted by including an assembled portion 65a of a flange shape which is attached to the periphery of an assembly hole 64c of the setting portion 64b, a base plate portion 65b of a circular plate shape which is fitted into the assembly hole 64c, and a projection portion 65c of a truncated conical shape which protrudes downward from the base plate portion 65b. As illustrated in FIG. 21A, the projection portion 65c is constituted by including a tip end surface 65ca which can form a bottom portion 55a of the recess portion 55 as a convex shape corresponding to the concave shape of the recess portion 55 of the folded body 50 and an inclined surface 65cb which can form the inclined portion 55b of the recess portion 55. Further, a lower surface 65ba side of the base plate portion 65b shapes the ceiling surface 56a of the raised portion 56 in the ceiling portion 54 of the folded body 50.

In the small-diameter folding process of the folding process using the bag folding machine 60, first, each bolt 27 is set in the setting portion 62 in a state where the folding preparation body 44 is formed as illustrated in FIGS. 10A and 10B, and then the ceiling-side base plate 64 is disposed at a position at which the ceiling-side base plate 64 located at a predetermined height (equivalent to a height dimension H0 from the bottom surface portion 51 to the ceiling portion 54 of the folded body 50) from the setting portion 62 of the bottom-side base plate 61 as illustrated in FIG. 10C.

Figure 12A:
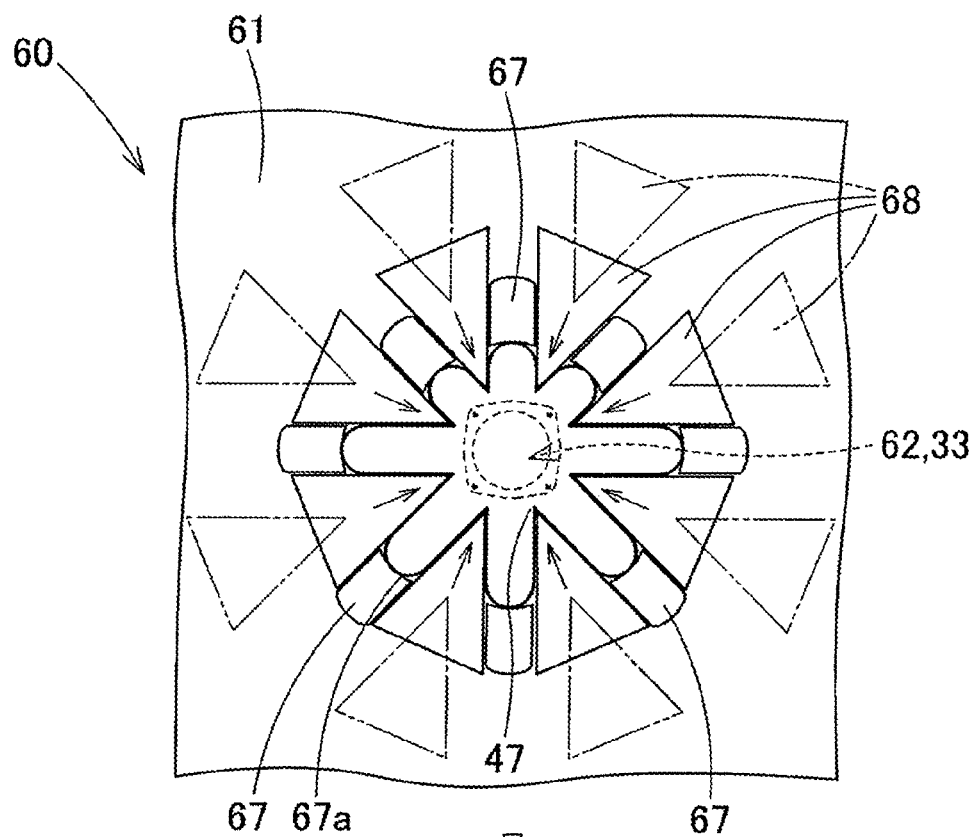
FIGS. 12A and 12B are views for illustrating the small-diameter folding process of the airbag of the first embodiment and illustrate processes succeeding the process in FIG. 11.

Next, as illustrated in FIG. 11, the respective push-in tools 67 and 68 are moved to the setting portion 62 side and predetermined eight portions 46 of an outer peripheral edge 44a of the folding preparation body 44 are gripped by the push-in tools 67. Then, as illustrated in FIG. 12A, first, each push-in tool 68 is moved to the setting portion 62 side (inflow opening 33 side) and eight push-in portions 47 of the outer peripheral edge 44a of the folding preparation body 44 are pushed toward the setting portion 62 side while leaving a part of the folding preparation body 44 which is the region on the setting portion 62 side of the push-in tool 67.

Figure 12B:
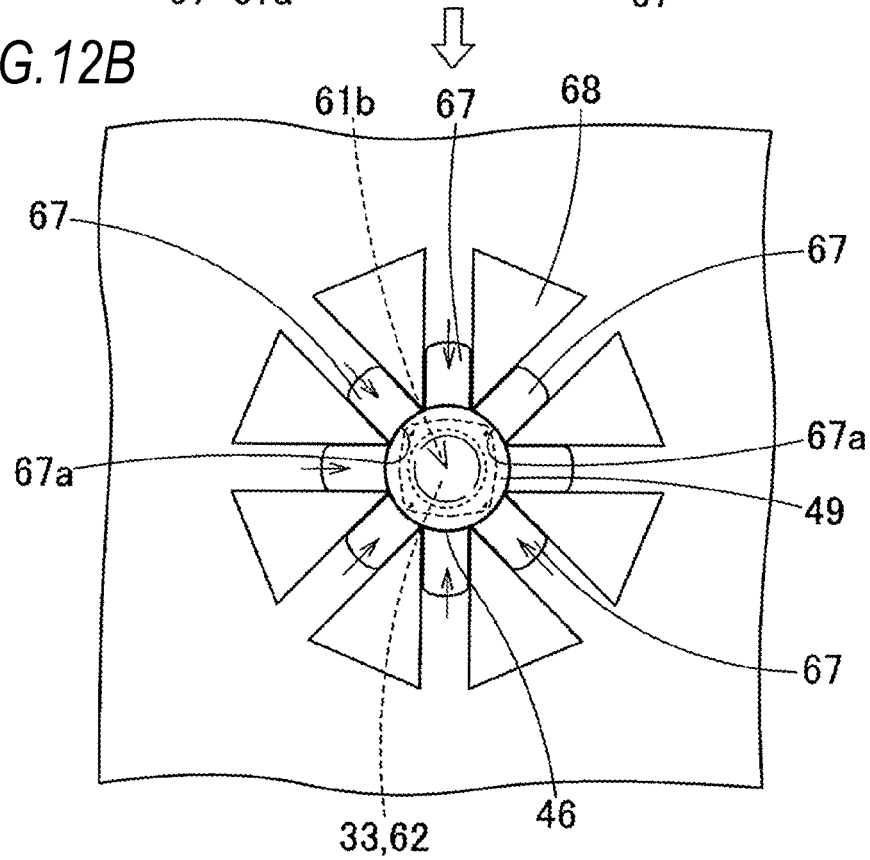

Then, the grasping of the grip portion 46 of the outer peripheral edge 44a by each push-in tool 67 is canceled and each push-in tool 67 is moved to the setting portion 62 side, and then the eight portions 46 are pushed toward the setting portion 62 side as illustrated in FIG. 12B.

Figure 13A:
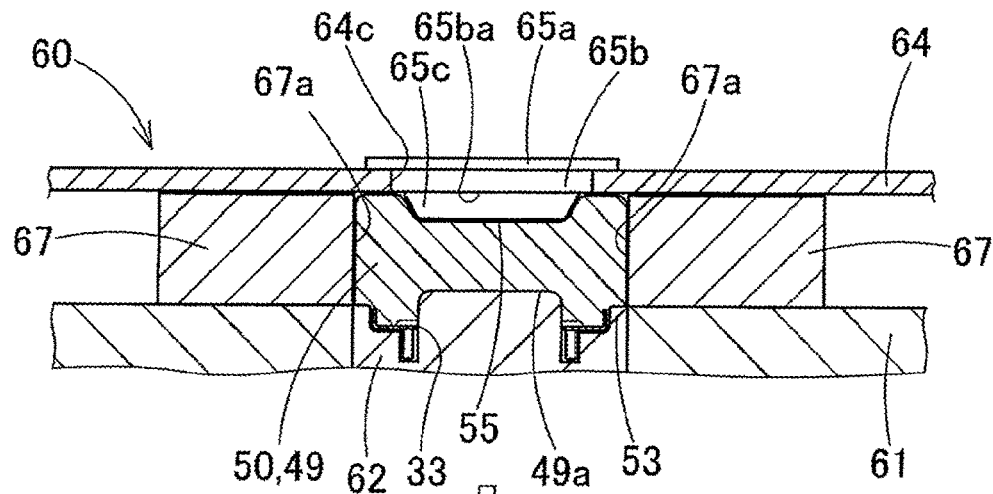
FIGS. 13A, 13B, and 13C are schematic cross-sectional views for illustrating the small-diameter folding process of the airbag of the first embodiment and illustrate processes succeeding the processes in FIGS. 12A and 12B.

As a result, as illustrated in FIG. 13A, the folding preparation body 44 is small-diameter-folded into a substantially cylindrical preliminary folded body 49 which is equivalent to the substantially cylindrical folded body 50. Although this preliminary folded body 49 is a folded body before the compression process is performed, the preliminary folded body 49 is constituted by including the ceiling portion 54 with the recess portion 55 similar to that of the folded body 50, the side surface portion 58, and the bottom surface portion 51 which has a recess portion 49a having a smaller volume than that of the recess portion 52 and the recess portion 53 (see FIGS. 13A and 13B).

Since the projection portion 65c of the pressing jig 65 has a truncated conical shape, as illustrated in FIG. 21A, a portion, that is, the portion of the outer peripheral edge 54b of the ceiling portion 54 extending from the ceiling surface 56a, which is the periphery of the recess portion 55, of the raised portion 56 to the side surface portion 58, which is pressed by the push-in tools 67 and 68 and interposed between the push-in tools 67 and 68 and the inclined surface 65cb of the projection portion 65c is strongly compressed compared to the portion of the recess portion 55 and formed into a shape. Further, the preliminary folded body 49 is in a compressed state by being pressed by the push-in tools 67 and 68 in a portion between the pressing jig 65 and the setting portion 62 of the bottom-side base plate 61. Therefore, in an internal stress state at the completion of pushing, the preliminary folded body 49 becomes in a stress state similar to that compressed in a direction in which the ceiling portion 54 and the bottom surface portion 51 are brought closer to each other.

Figure 13B:
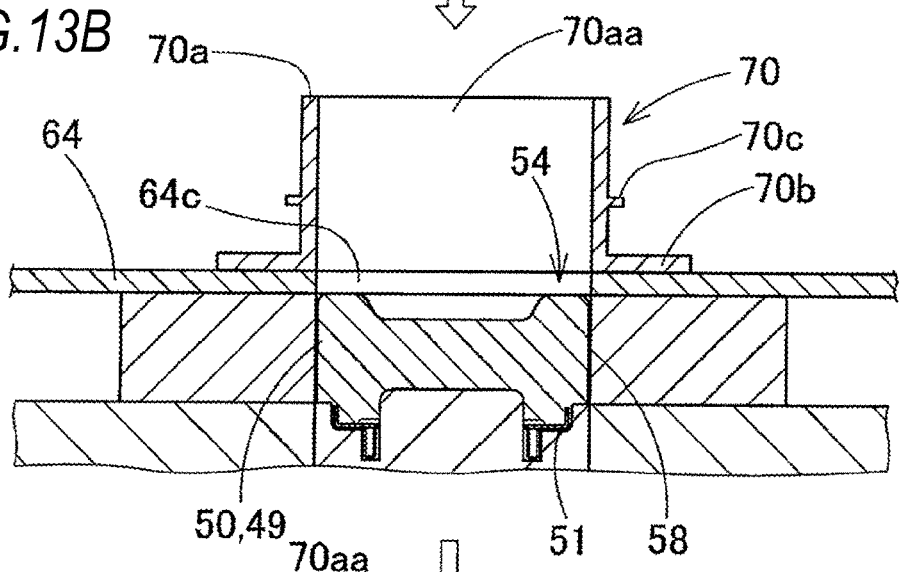

After the small-diameter folding process is performed, as illustrated in FIGS. 13A and 13B, the ceiling-side base plate 64 provided with the pressing jig 65 is replaced with a ceiling-side base plate 64 provided with a tube jig 70 so that the compression process can be performed. The tube jig 70 is constituted by including a tube portion 70a of a cylindrical shape into which the preliminary folded body 49 can be fittably inserted and a flange portion 70b which can be assembled to the periphery of the assembly hole 64c. In addition, A lock pin 70c for locking the side surface cover portion 83 (the cylindrical portion 122) of the wrapping material 80 is disposed in the tube portion 70a.

Figure 13C:
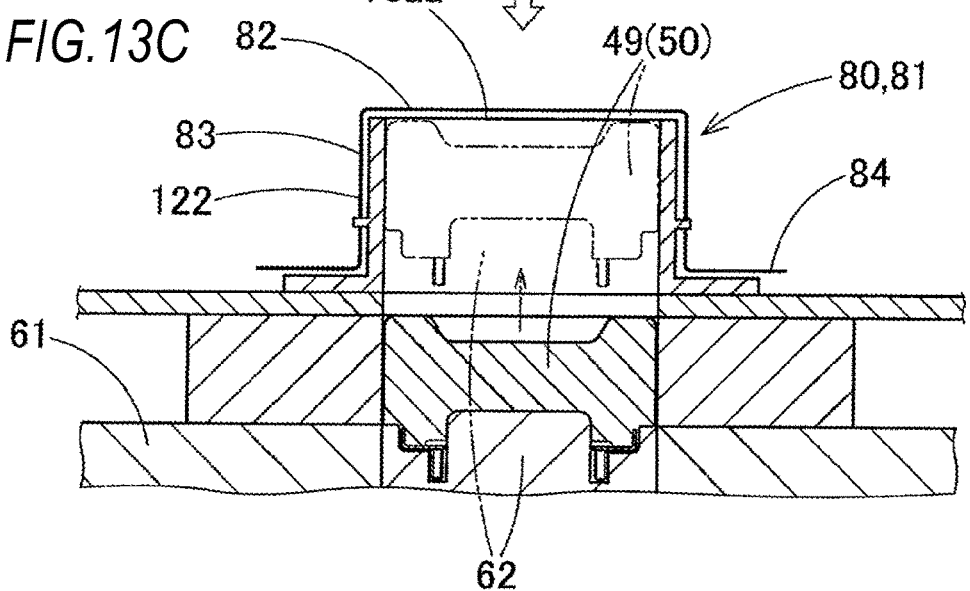

Then, as illustrated by the solid line in FIGS. 13B and 13C and further as illustrated by the two-dot chain line in FIG. 13C, the wrapping material 80 is put on the tube jig 70 and the setting portion 62 is pushed up with the preliminary folded body 49, in such a manner that the preliminary folded body 49 is moved into the tube portion 70a of the tube jig 70. As illustrated in FIG. 17B, the cylindrical portion 122 is formed in the wrapping material 80, and then the ceiling cover portion 82 is placed at an opening end 70aa of the tube portion 70a and the side surface cover portion 83 (cylindrical portion 122) is locked to the locking pin 70c.

Figure 14A:
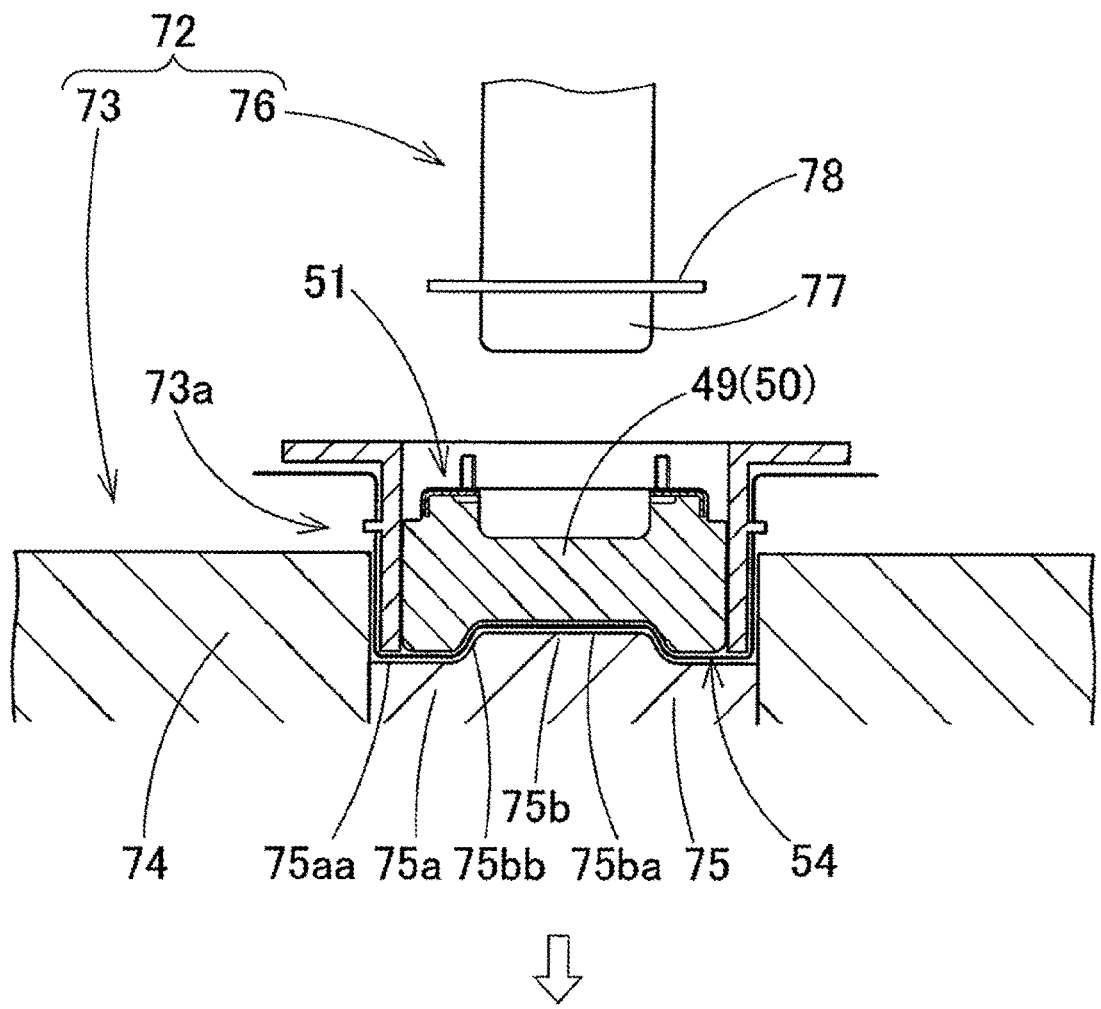
FIGS. 14A and 14B are views for illustrating a compression process as a second process in the folding process of the airbag of the first embodiment.

Next, as illustrated in FIG. 14A, the tube jig 70 accommodating the preliminary folded body 49 is set in a setting portion 73a of a fixed-side portion 73 of a bag press machine 72 performing the compression process.

The bag press machine 72 is constituted by including the fixed-side portion 73 and a movable-side portion 76. The fixed-side portion 73 includes a block 74 which accommodates a tube jig 70 to which the wrapping material 80 is assembled and a pressing jig 75 which is arranged to face the ceiling portion 54 side of the preliminary folded body 49. The pressing jig 75 is constituted by including a base plate portion 75a of a circular plate shape and a projection portion 75b of a truncated conical shape which protrudes upward from the base plate portion 75a. The projection portion 75b is constituted by including a tip end surface 75ba which can form the bottom portion 55a of the recess portion 55 as a convex shape corresponding to the concave shape of the recess portion 55 of the folded body 50 and an inclined surface 75bb which can form the inclined portion 55b of the recess portion 55. Further, an upper surface 75aa side of the base plate portion 75a shapes the ceiling surface 56a of the raised portion 56 in the ceiling portion 54 of the folded body 50.

The movable-side portion 76 is vertically movably provided in a state where a pressing jig 77 for forming the recess portion 52 for accommodating the inflator 17 in the folded body 50 is provided in a lower end of the movable-side portion 76 and a flange portion 78 to be abutted on the bottom surface portion 51 of the folded body 50 is disposed on an upper edge side of the pressing jig 77. A through hole (not illustrated) is formed in the flange portion 78 so as to allow each bolt 27 to pass therethrough.

Figure 14B:
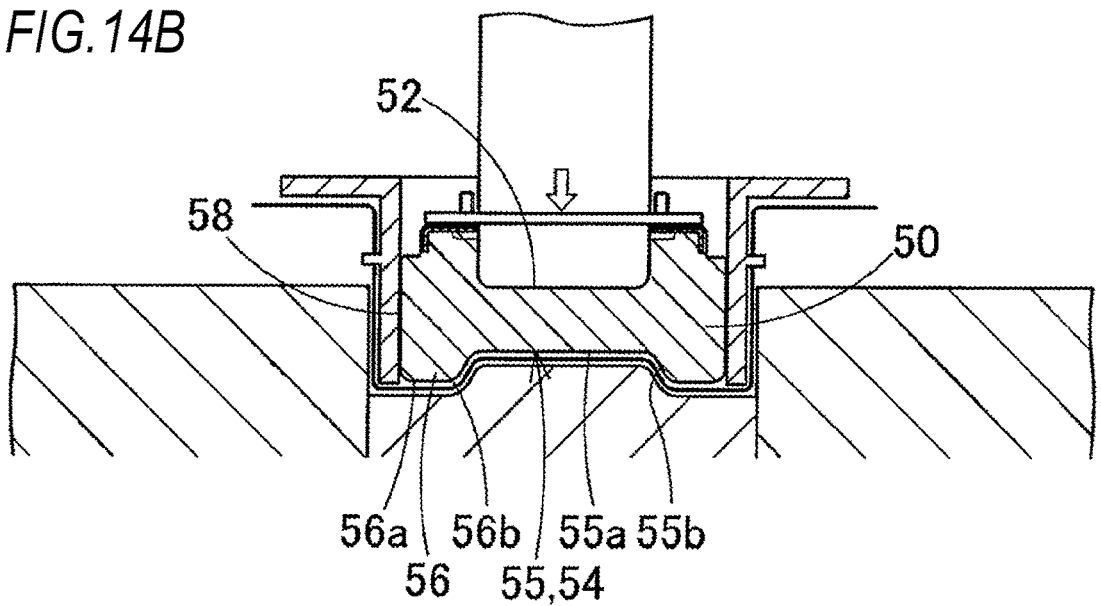

As illustrated in FIG. 14A, the tube jig 70 accommodating the preliminary folded body 49 is set in the setting portion 73a of the fixed-side portion 73, and then the movable-side portion 76 is lowered as illustrated in FIG. 14B. Therefore, the recess portion 52 is shaped by the pressing jig 77 and the recess portion 55 is reshaped by the pressing jig 75 with high accuracy. As a result, the folded body 50 can be formed.

Figure 21B:
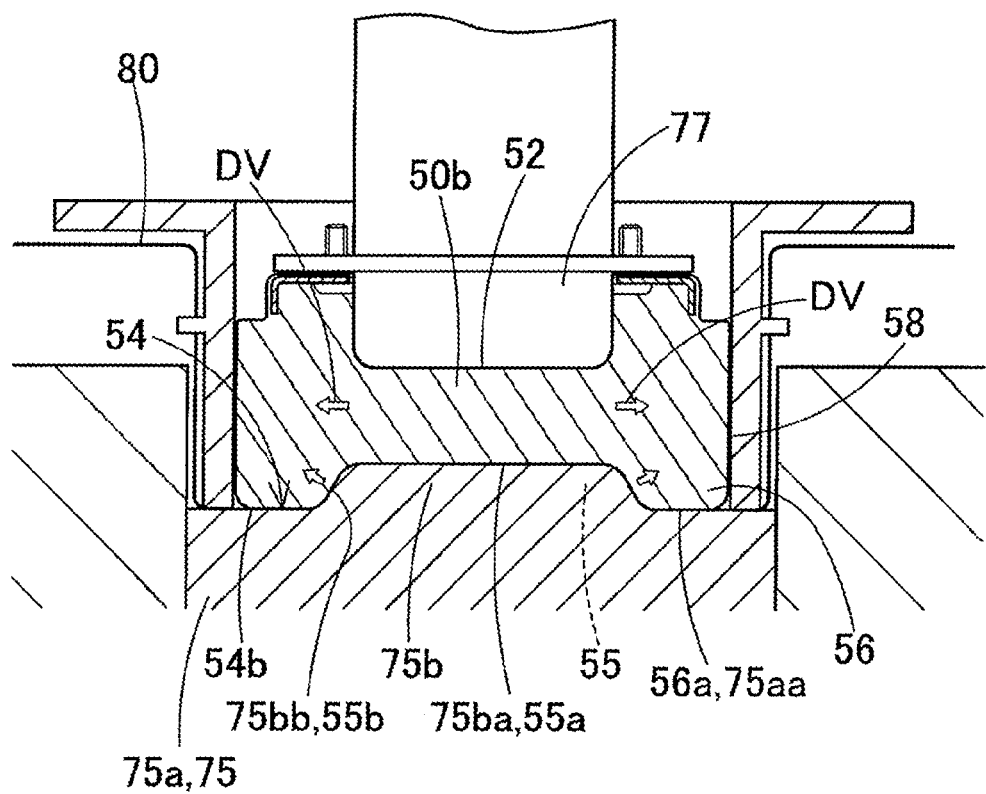

In this case, since the projection portion 75*b* of the pressing jig 75 has a truncated conical shape, as illustrated in FIG. 21B, a portion, that is, a portion (portion on the bottom surface portion 51 side) 50*b* directly below the recess portion 55, interposed between the pressing jig 77 and the projection portion 75*b* becomes in a state of being retreated to an axially perpendicular direction DV of the folded body 50 by being pressed by the pressing jig 77 and a portion of the outer peripheral edge 54*d* of the ceiling portion 54 which is the portion extending from the ceiling surface 56*a*, which is the periphery of the recess portion 55, of the raised portion 56 to the side surface portion 58 becomes in a state (state where portions connecting the outer peripheral edges of the ceiling portion 54 and the bottom surface portion 51 are vertically strongly compressed) where the portion of the outer peripheral edge 54*b* of the ceiling portion 54 is strongly compressed by the inclined surface 75*bb* of the projection portion 75*b* compared to the portion of the recess portion 55 and formed into a shape. In FIGS. 14A and 14B, the shapes of the wrapping material 80 and the pressing jig 75 are illustrated with a gap from the preliminary folded body 49 so as to make it easier to understand. However, as illustrated in FIG. 21B, the ceiling portion 54 and the wrapping material 80 are actually in close contact with the pressing jig 75.

Figure 15A:
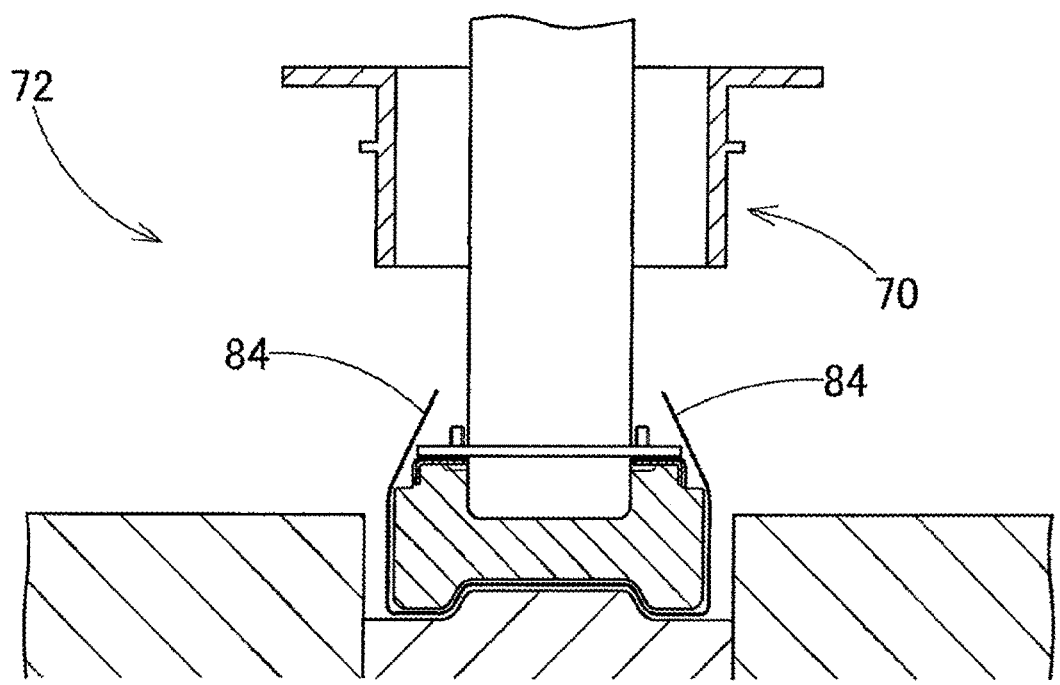
FIGS. 15A and 15B are views for illustrating processes where the airbag of the first embodiment forms the folded body and is wrapped in the wrapping material.
Figure 15B:
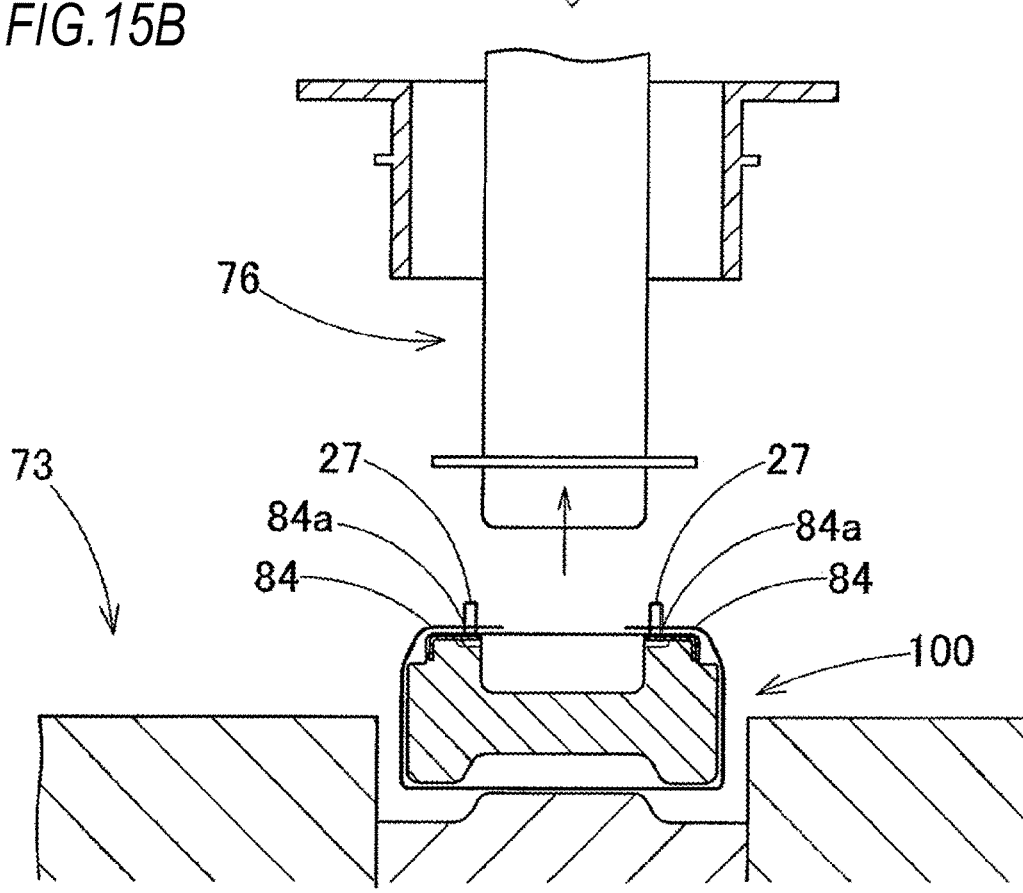

After the compression process is performed, as illustrated in FIGS. 15A and 15B, the tube jig 70 is pulled out and the movable-side portion 76 is retreated, and then each bottom surface cover portion 84 of the wrapping material 80 is locked to the predetermined bolt 27 by using the locking hole 84*a* (see FIGS. 18A to 19B). As a result, it is possible to obtain the bag assembly 100 which is the folded body 50 wrapped with the wrapping material 80.

When the airbag device 10 is assembled, first, the bag assembly 100 is fitted to the inner peripheral surface side of the side wall portion 23 of the airbag cover 20. Next, each bolt 27 of the bag assembly 100 passes through the through hole 12*b* of the bag holder 11 and each locking leg portion 24 of the airbag cover 20 is inserted into the locking hole 12*e* of the bag holder 11, and further, the outer protruding portion 24*b* of the locking leg portion 24 is locked to the inner peripheral edge on the outer edge side of the locking hole 12*e* while each tongue piece portion 12*f* is bent outward so as to be locked to the inner protrusion portion 24*a* of the locking leg portion 24, in such a manner that the airbag cover 20 is attached to the bag holder 11. In addition, each switch body 15 is attached to the bag holder 11 in advance. Then, each bolt 27 protruding from the bag holder 11 passes through the through hole 19*a* of the inflator 17 and the nut 29 is fastened to each bolt 27, and further, the bag assembly 100 and the inflator 17 are attached and fixed to the bag holder 11 to which the airbag cover 20 is already attached, whereby the airbag device 10 can be assembled.

The installation of the airbag device 10 in the vehicle is as follows: A lower end of the attachment pin 15*a* of each switch body 15 is inserted into the locking hole 5*a* of each fixing portion 5 of the steering wheel main body 1 which is already assembled to the steering shaft SS and the attachment pin 15*a* is locked to the locking pin 5*b*, and thus the airbag device 10 can be attached to the steering wheel main body 1. Therefore, assembling of the steering wheel W is completed and the steering wheel W can be mounted on the vehicle together with the airbag device 10.

When the airbag device 10 is assembled to the steering wheel main body 1, a lead wire (not illustrated) of the bag holder 11 is connected to a positive electrode side of a horn operating circuit and a lead wire (not illustrated) for inputting an activation signal is connected to the inflator 17.

After those parts are mounted on the vehicle, when an activation signal is input to the inflator 17, the inflator 17 makes inflation gas G discharged from the gas discharge port 18*a*. Therefore, the folded airbag 30 inflates by the flowing-in inflation gas G and breaks the ceiling cover portion 82 of the wrapping material 80, and further pushes and opens the door portion 21*a* of the ceiling wall portion 21 of the airbag cover 20. As a result, the airbag 30 protrudes from the open opening of the door portion 21*a* and are expanded and spread so as to cover an upper surface of the ring portion R from above the boss portion B (see the two-dot chain lines in FIGS. 1 and 2).

As illustrated in FIGS. 6 to 8, in the airbag device 10 of the first embodiment, the folded body 50 of the airbag 30 is wrapped in the wrapping material 80 and the wrapping material 80 is configured such that the elongation regulating sewn portion 88 as the elongation regulating member 86 which suppresses elongation of the cover member 81 is provided in the cover member 81 having a sheet shape which covers over the ceiling portion 54, the side surface portion 58, and the bottom surface portion 51 of the folded body 50. Therefore, when the cover member 81 wraps the folded body 50 such that the cover member 81 covers the ceiling portion 54 of the folded body 50 by the ceiling cover portion 82, covers the side surface portion 58 of the folded body 50 by the side surface cover portion 83, and covers the bottom surface portion 51 of the folded body 50 by the bottom surface cover portion 84 and the bottom surface cover portion 84 is locked to the bolt 27 as a fastener using the locking hole 84*a*, the elongation regulating member 86 can resist the restoring force of the folded body 50 acting on the cover member 81, and thus the spring back of the folded body 50 can be regulated. As a result, a compact folded shape can be maintained.

Therefore, in the airbag device 10 of the first embodiment, the folded body 50 can be maintained in a compact state. Thus, the airbag device 10 can be can be easily mounted in a portion having a small space, that is, a small accommodation portion BS (see FIGS. 2 and 3) which is located above the bag holder 11 of the boss portion B of the steering wheel W and surrounded by ceiling wall portion 21 and side wall portion 23 of airbag cover 20.

In the airbag device 10 of the first embodiment, the elongation regulating member 86 is configured to include the lateral-surface-side sewn portion 90 and the ceiling-side sewn portion 91 as the elongation regulating sewn portion 88. The lateral surface-side sewn portion 90 is disposed so as to extend from an edge 83*b* on the bottom surface cover portion 84 side near the bolt 27, as a fastener, in the side surface cover portion 83 near the bolt 27 to the ceiling cover portion 82. The ceiling-side sewn portion 91 is provided to have the extension portion 91*c* extending from the end portion 90*a* on the ceiling cover portion 82 side of the lateral-surface-side sewn portion 90 toward a center 91*b* side of the ceiling cover portion 82 and at least a portion, that is, the annular portion 91*a* intersect with the extension portion 91*c* in the first embodiment, which is located in the vicinity of the outer peripheral edge of the ceiling cover portion 82 and extends along the outer peripheral edge of the ceiling cover portion 82. Specifically, the lateral-surface-side sewn portion 90 is disposed so as to extend at the shortest distance from the edge 83*b* on the bottom surface cover portion 84 side near the bolt 27 to the extension portion 91*c* of the corresponding ceiling-side sewn portion 91 substantially along a opposing direction (up-down direction) between the ceiling cover portion 82 and the bottom surface cover portion 84.

Therefore, in the first embodiment, it is configured such that the lateral-surface-side sewn portion 90 which is provided in the side surface cover portion 83 of the cover member 81 as the elongation regulating sewn portion 88 is disposed in the vicinity of the locking hole 84*a* locked to the bolt 27 and pulls the annular portion 91*a* of the ceiling-side sewn portion 91 provided on the outer peripheral edge of the ceiling cover portion 82 of the cover member 81 so as to opposite to an acting direction TD (see FIGS. 6 and 16) of the restoring force of the folded body 50. Therefore, the cover member 81 prevents the height near the center 54*a* of the ceiling portion 54 of the folded body 50 from being increased by the ceiling-side sewn portion 91 and the lateral-surface-side sewn portion 90 in the elongation regulating sewn portion 88 and only a part of the outer peripheral edge 54*b* of the ceiling portion 54 is pressed toward the bottom surface portion 51 side along the side surface portion 58. As a result, a height dimension H0 from the bottom surface portion 51 to the ceiling portion 54 of the folded body 50 can be suppressed, and thus the compact folded shape of the folded body 50 can be maintained.

Figure 20B:
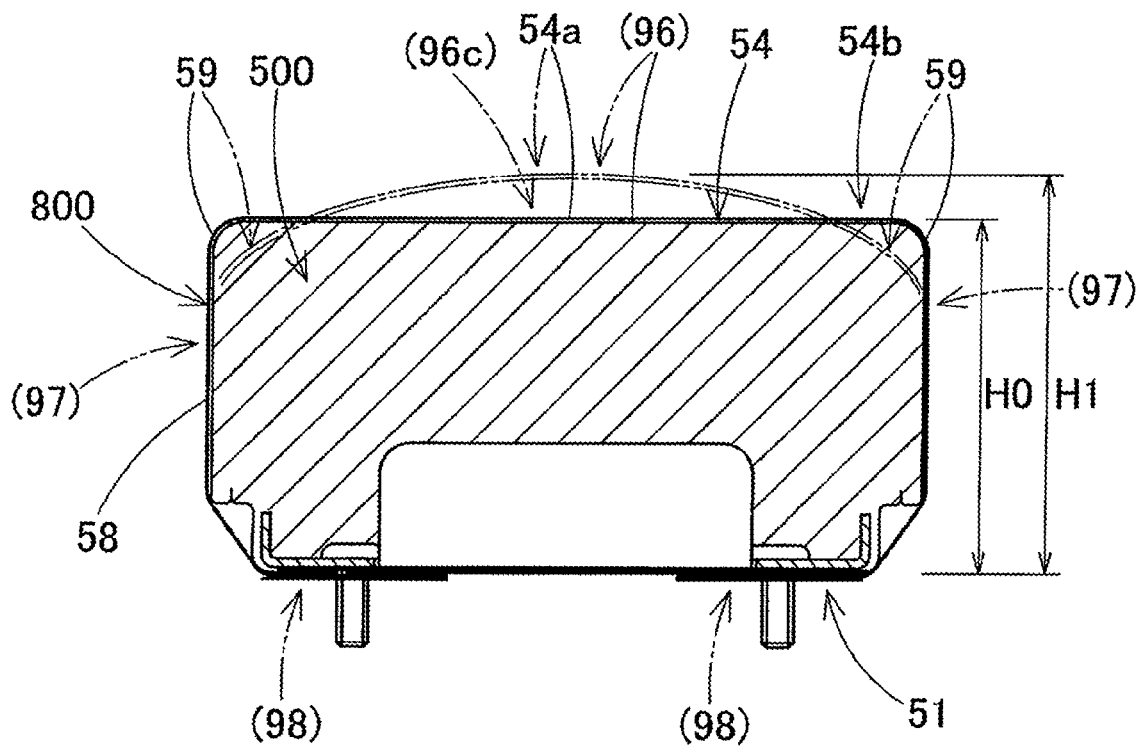

By the way, as illustrated in FIG. 20B, when a wrapping material 800 wraps a folded body 500 so as to include not only the part of the outer peripheral edge 54*b* of the ceiling portion 54 of the folded body 500 but also a part in a vicinity of the center 54*a* of the ceiling portion 54 and connect from the vicinity of the center 54*a* to the bottom surface portion 51 side through both intersection portions 59 between the ceiling portion 54 and the side surface portion 58 and further through both side surface portions 58 and the wrapping material 800 strongly presses the folded body 500, both intersection portions 59 between the ceiling portion 54 and the side surface portion 58 hangs down to the bottom surface portion 51 side as illustrated by the two-dot chain line in FIG. 20B and this causes a situation where the vicinity of the center 54*a* of the ceiling portion 54 is raised. Therefore, the height dimension of the folded body 500 is increased from H0 to H1, which makes it difficult to maintain the compact folded shape of the folded body 500.

Further, in the first embodiment, as an elongation regulating sewn portion 88, the locking-hole-side sewn portion 93 arranged around the entire peripheral edge of the locking hole 84*a* for locking the bolt 27 as a fastener is provided.

Therefore, in the first embodiment, even when the bottom surface cover portion 84 of the cover member 81 is stretched and forced to be extended, it is possible to suppress the extension of the peripheral edge of the locking hole 84*a* in the bottom surface cover portion 84 of the cover member 81 locked to the bolt 27. As a result, the cover member 81 (wrapping material 80) can maintain the compact folded shape of the folded body 50.

In the first embodiment, a case where a sewn portion is provided around the entire peripheral edge of the locking hole 84*a* as the locking-hole-side sewn portion 93 is described. However, a sewn portion may be provided only on an edge 93*a* side (see FIG. 16) in an opposing direction RD opposite to the acting direction TD of the restoring force of the folded body 50. Needless to say, when, as illustrated in the first embodiment, the bottom-side sewn 92 which connects the edge 93*a* of the peripheral edge of the locking hole 84*a* to an edge 93*b* on an opposite side and linearly connects the edge 93*b* side to the bottom-surface-side end portion 90*b* of the lateral-surface-side sewn portion 90 is provided, it is possible to further resist the restoring force of the folded body 50 and maintain the compact folded shape of the folded body 50.

Figure 22:
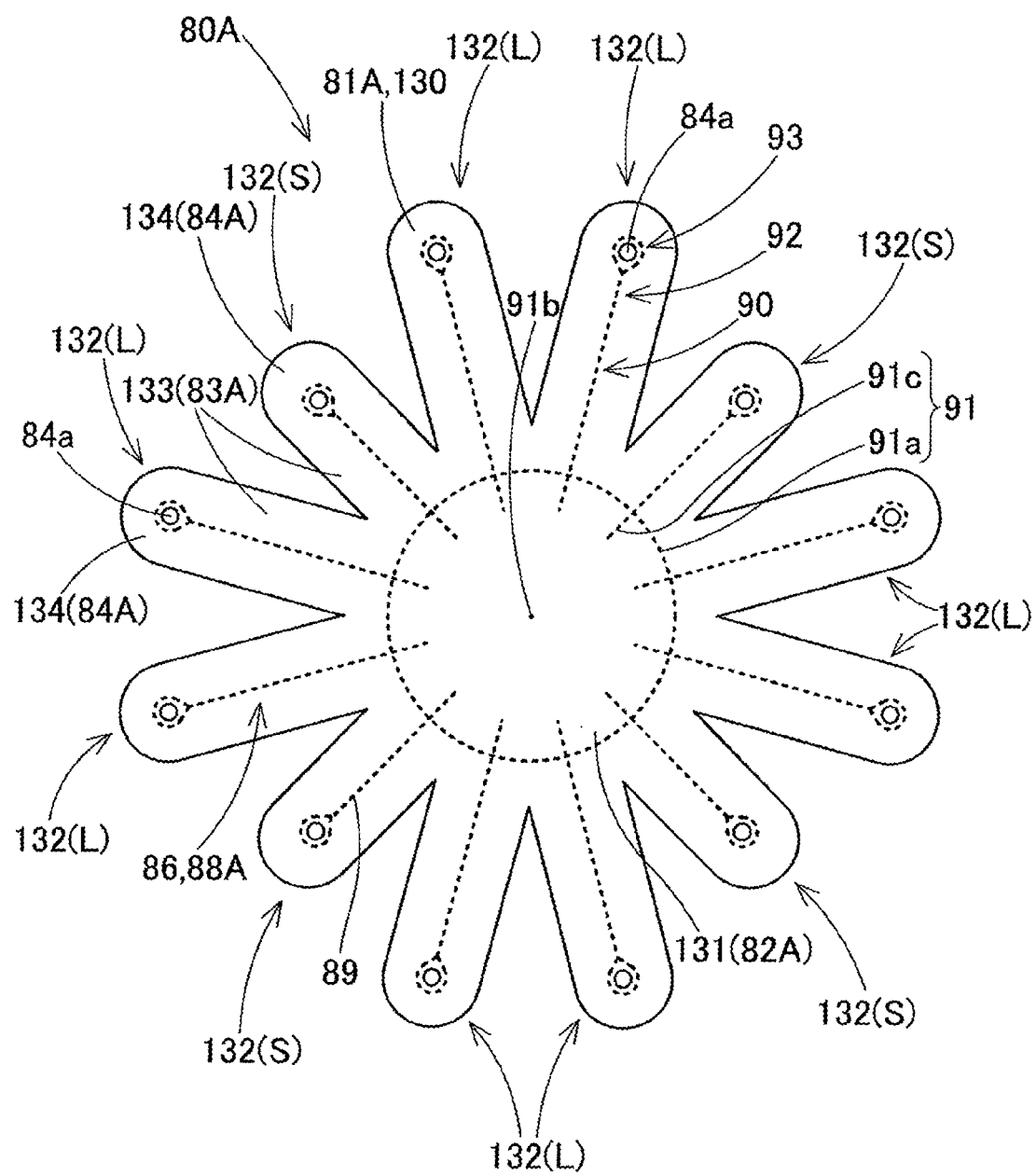
FIG. 22 is a plan view for illustrating a modification example of the wrapping material.
Figure 23:
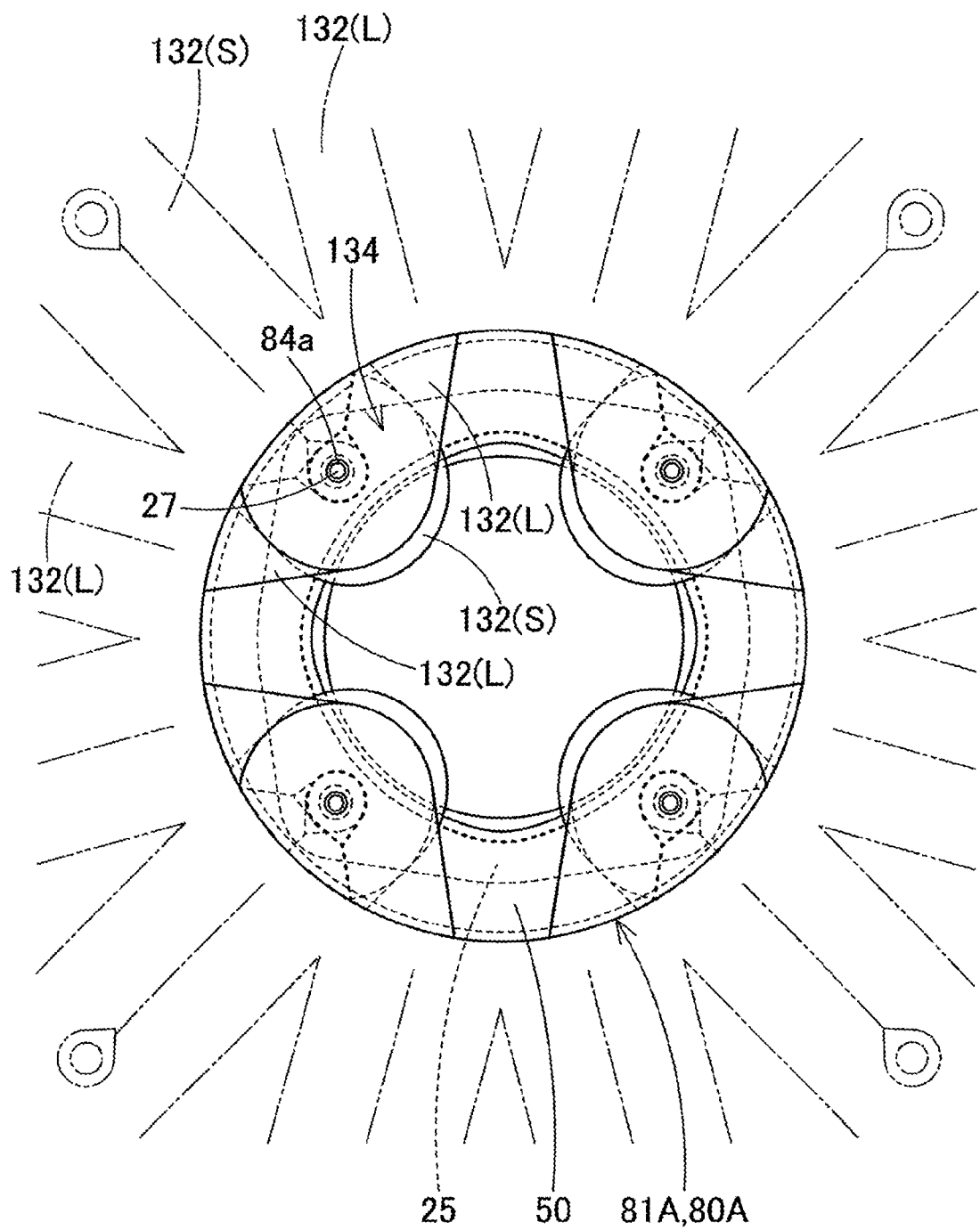
FIG. 23 is a bottom view of a bag assembly in which the folded body is wrapped with a wrapping material illustrated in FIG. 22.
Figure 24:
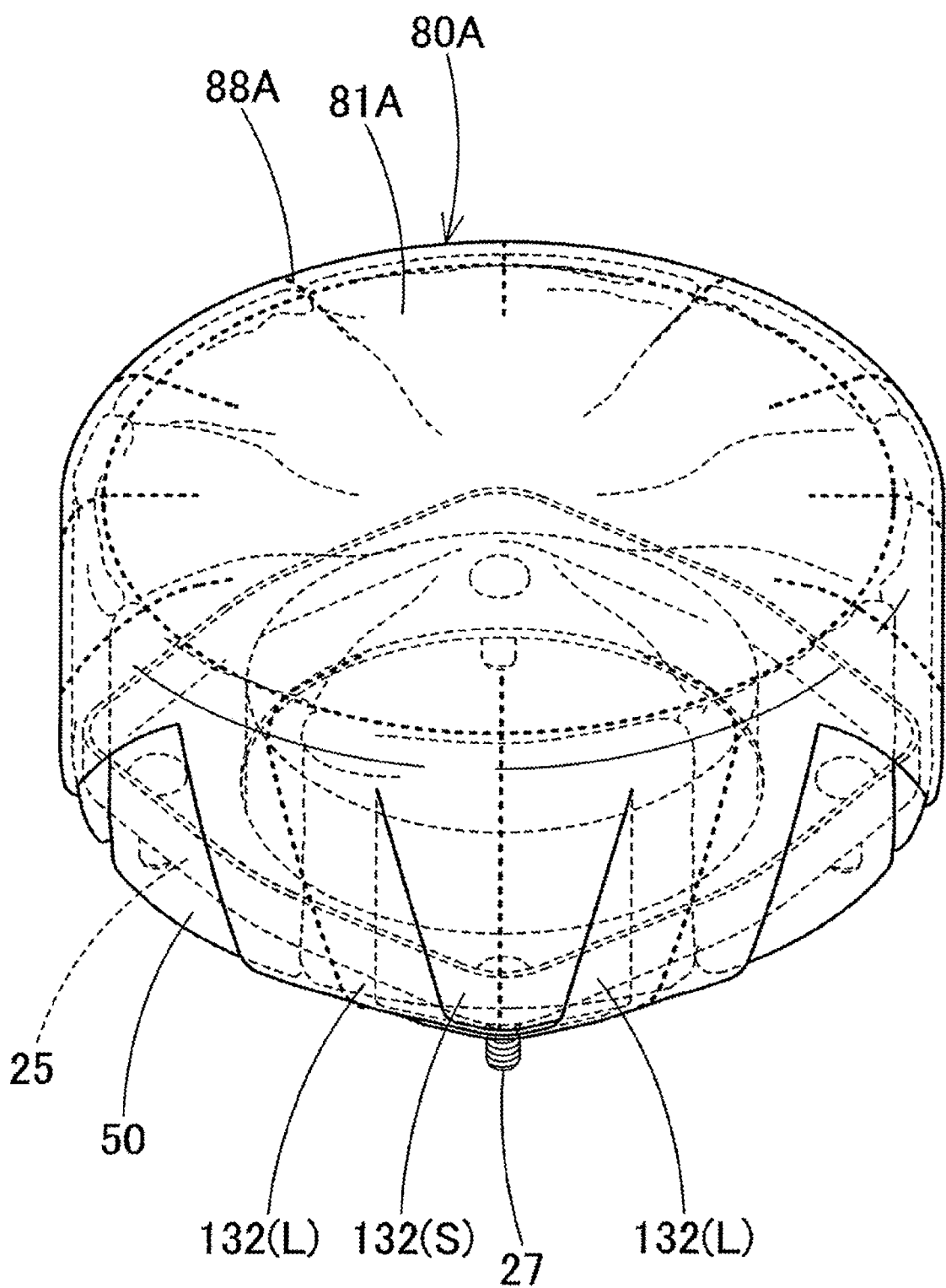
FIG. 24 is a schematic perspective view of the bag assembly in which the folded body is wrapped with the wrapping material illustrated in FIG. 22.

In a case of providing an elongation regulating sewn portion as an elongation regulating member, a wrapping material 80A illustrated in FIGS. 22 to 24 may be used. The wrapping material 80A is constituted by arranging an elongation regulating sewn portion 88A, which is constituted by sewing the sewing thread 89 by a chain stitching manner, on a cover member 81A made of a covering material base fabric 130 similar to the covering material base fabric 110 of the cover member 81. In the covering material base fabric 130, long and short band-shaped overhang portions 132 (L, S) radially protrude from a central portion 131 of a circular plate shape. The short band-shaped overhang portions 132S are radially arranged offset by 90° from the central portion 131 and the two long band-shaped overhang portions 132L radially protrudes from each portion between the adjacent short band-shaped overhang portions 132S and 132S. In addition, the central portion 131 constitutes a ceiling cover portion 82A and a tip end of the band-shaped overhang portion 132 constitutes a bottom surface cover portion 84A provided with the locking hole 84*a*, and further the central portion 131 side of the band-shaped overhang portion 132 constitutes a side surface cover portion 83A.

The length from the central portion 131 in each band-shaped overhang portion 132 of the covering material base fabric 130 to each locking hole 84*a* is set to a length dimension which allows the cover member 81A to strongly press and wrap the folded body 50 when each locking hole 84*a* is locked to the bolt 27 as a predetermined fastener.

Further, the elongation regulating sewn portion 88A is constituted to include the locking-hole-side sewn portions 93 and the bottom-side sewn portion 92 provided on the peripheral edge of the locking hole 84*a* of the bottom surface cover portion 84A, lateral-surface-side sewn portion 90 extending from the bottom-side sewn portion 92 to an extension portion 91*c* intersect with the annular portion 91*a* of the ceiling-side sewn portion 91 provided in the central portion 131, and the ceiling-side sewn portion 91 constituted by including the annular portion 91*a* and the extension portion 91*c*.

Respective short band-shaped overhang portions 132S are disposed at positions where the short band-shaped overhang portions 132S are respectively located close to the bolts 27 at different positions and the ceiling cover portion 82A is disposed in the ceiling portion 54 of the folded body 50 and the locking holes 134*a* of the short band-shaped overhang portions 132S are respectively locked to the neighboring bolt 27, and further locking holes 134*a* of the long band-shaped overhang portions 132L on both sides of each band-shaped overhang portion 132S are locked to each bolt 27 between the two long band-shaped overhang portions 132L, in such a manner that the wrapping material 80A can wrap the folded body 50 (see FIGS. 23 and 24).

Since the wrapping material 80A also has the elongation regulating sewn portion 88A as similar to the wrapping material 80 of the first embodiment, it is possible to resist the restoring force of the folded body 50 as similar to the case of the wrapping material 80 of the first embodiment. As a result, the wrapping material 80A can wrap the folded body 50 while maintaining the compact folded shape.

Figure 25:
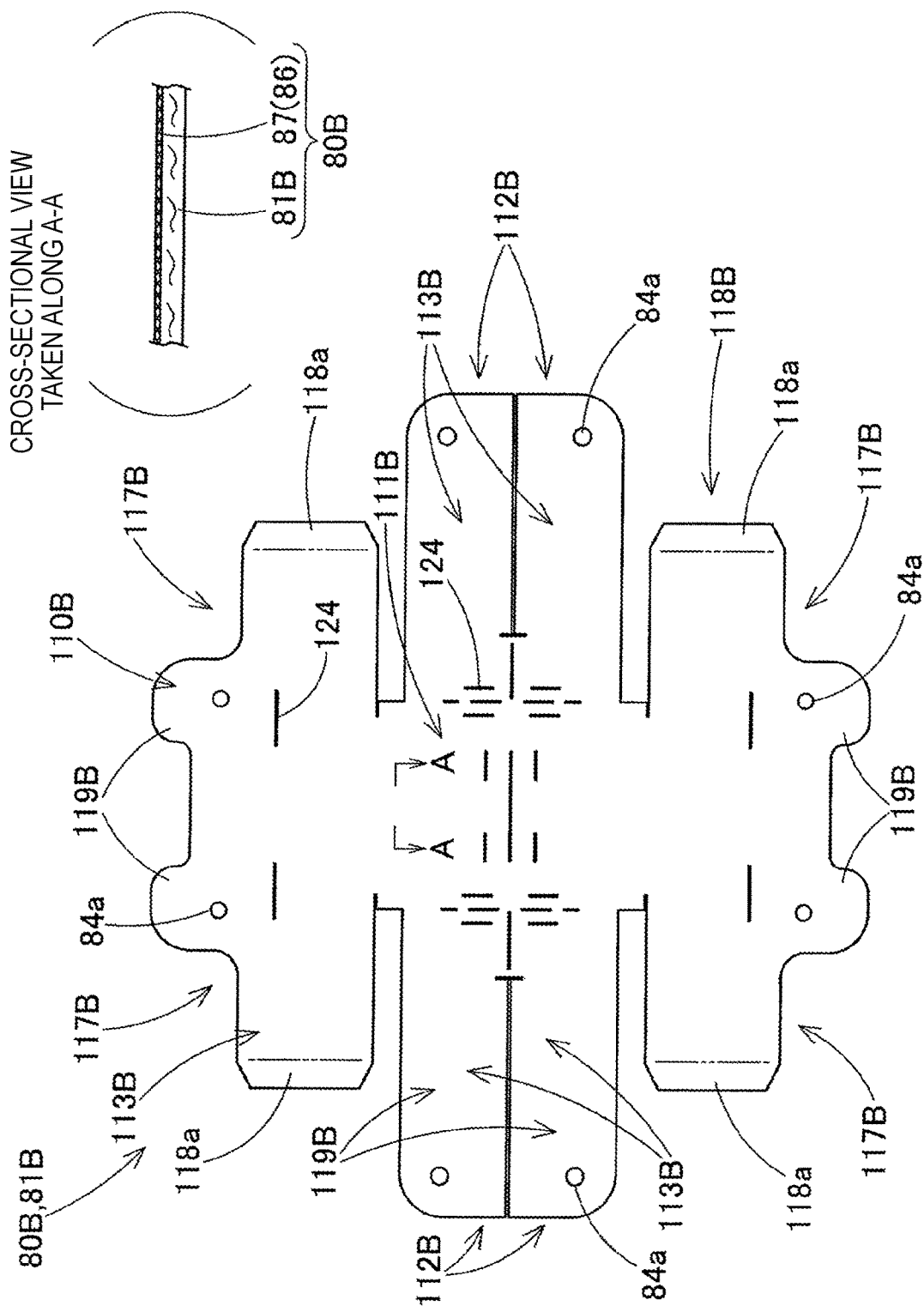
FIG. 25 is a plan view for illustrating another modification example of the wrapping material.
Figure 26:
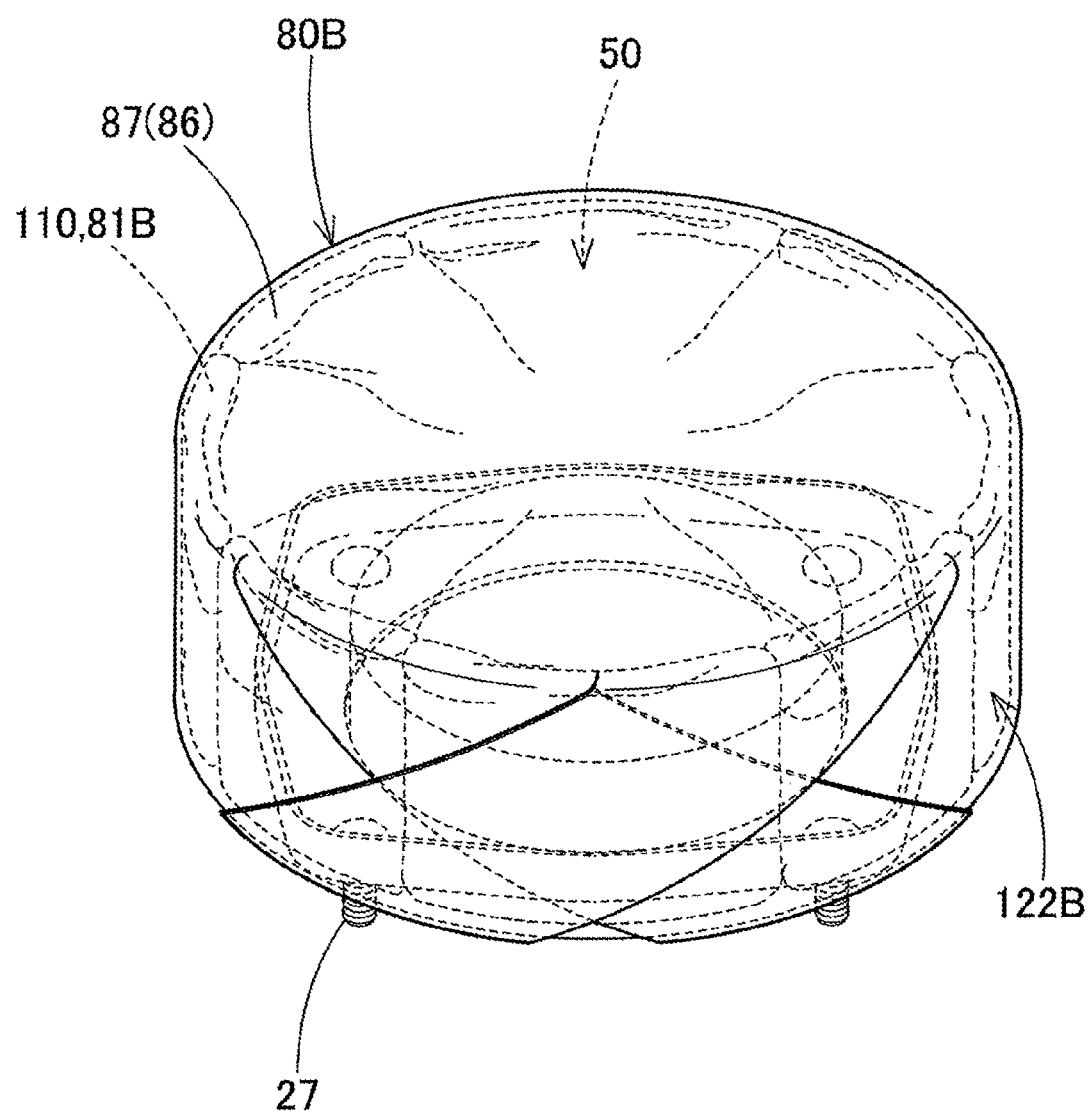
FIG. 26 is a schematic perspective view of a bag assembly in which the folded body is wrapped with a wrapping material illustrated in FIG. 25.

Further, the elongation regulating member 86 may be constituted by an elongation regulating coating agent 87 to be applied to the covering material base fabric 110B of the cover member 81B as the wrapping material 80B illustrated in FIGS. 25 and 26. The elongation regulating coating agent 87 is a silicone coating agent used for improving heat resistance of the airbag fabric. Further, the elongation regulating coating agent 87 may be provided at elongation suppressing places in the cover member. That is, the elongation regulating coating agent 87 may be partially provided in the cover member 81B so as to have a band shape in which, for example, a portion provided with the elongation regulating sewn portion 88 of the first embodiment is disposed in the vicinity of the center in the width direction. However, in a case of the example in the drawing, the elongation regulating coating agent 87 is provided on substantially the entire surface of the cover member 81B as a range where the intersection portion 59 between the ceiling portion and the lateral surface portion illustrated in FIG. 20B can be prevented from hanging down because it can be easily applied. Further, in a case of the example illustrated in the drawing, the elongation regulating coating agent 87 is provided on either one of a front side surface or a rear side surface of the cover member 81B. However, the elongation regulating coating agent 87 may be provided on both the front surface side and the rear surface side of the cover member 81B.

Further, the covering material base fabric 110B forming the cover member 81B is substantially similar to the covering material base fabric 110 forming the cover member 81 of the first embodiment. Therefore, a reference character "B" is additionally given to the similar part and the description thereof will be omitted.

In addition, the covering material base fabric 110B has a plurality of slits 124 formed at predetermined positions so that the airbag 30 at the time of inflation easily breaks and protrudes from the wrapping material 80B. Such slit 124 may also be provided in the covering material base fabric 110 of the first embodiment or the covering material base fabric 130 of the modification example.

The wrapping material 80B wraps the folded body 50 as similar to a case of the wrapping material 80 of the first embodiment, so operations and effects similar to those of the first embodiment can be obtained.

The folded body 50 of the first embodiment is formed by being compressed in a direction in which the ceiling portion 54 and the bottom surface portion 51 approach each other by using the bag folding machine 60 or the bag press machine 72 and is constituted such that the ceiling portion 54 of the folded body 50 is provided with the recess portion 55 which is recessed further downward than the outer peripheral edge 54b in a portion near the center 54a and the ceiling surface 56a substantially parallel to the bottom surface portion 51 is provided on the outer peripheral edge 54b side, and further a raised portion 56 raised from the recess portion 55 is arranged so as to surround the recess portion 55.

According to such a folded body 50, the raised portion 56 provided in the outer peripheral edge 54b of the ceiling portion 54 is compressed toward the bottom surface portion 51 side. In addition, since the raised portion 56 located in the intersection portion 59 between the ceiling portion 54 and the side surface portion 58 is in a compressed state, it is difficult for the raised portion 56 to hang down toward the center side of the bottom surface portion 51 even when the wrapping material 80, 80A, or 80B provided with the elongation regulating member 86 on the cover member 81, 81A, or 81B wraps the folded body 50. As a result, the folded body 50 can maintain the compact folded shape. Further, even when it is assumed that the folded body 50 is wrapped in the wrapping material 80, 80A, or 80B and the intersection portion 59 between the ceiling portion 54 and the side surface portion 58 hangs down and tries to raise the center 54a of the ceiling portion 54 as illustrated by the two-dot chain line in FIG. 20A, the recess portion 55 is formed in the center 54a of the ceiling portion 54 in advance and the recess portion 55 can absorb a protuberance which raises the ceiling portion 54. Therefore, the ceiling portion 54 can be prevented from becoming higher. As a result, the folded body 50 can maintain the compact folded shape.

By the way, as described above, in the folded body 500 illustrated in FIG. 20B which does not include a recess portion, the folded body 500 is wrapped by the wrapping material 800 so as to connect from the ceiling portion 54 to the bottom surface portion 51 side through both intersection portions 59 between the ceiling portion 54 and the side surface portion 58 and further through both side surface portions 58. Therefore, when the wrapping material 800 strongly presses the folded body 500, both intersection portions 59 between the ceiling portion 54 and the side surface portion 58 hang down to the bottom surface portion 51 side as illustrated by the two-dot chain line in FIG. 20B and this caused a situation of raising the vicinity of the center 54a of the ceiling portion 54. As a result, it results in an increase in the height dimension H1 of the folded body 500, and thus it is difficult to maintain the compact folded shape of the folded body 50.

In the first embodiment, the recess portion 55 of the folded body 50 is formed by using the pressing jig 65 or 75 of the bag folding machine 60 or the bag press machine 72 as illustrated in FIG. 21. However, as another shape of the recess portion, a recess portion 55A, 55B, or 55C having a shape using a pressing jig 65A, 65B, 65C, 75A, 75B, or 75C as illustrated in FIGS. 27A to 29B may be exemplified.

Figure 27A:
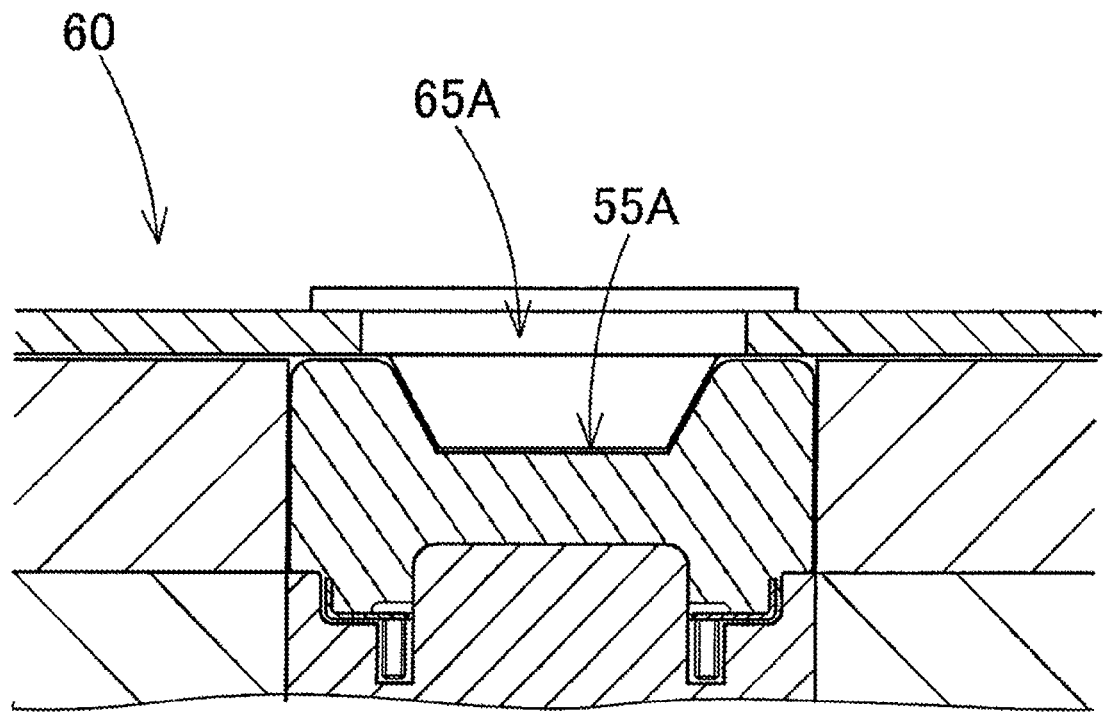
FIGS. 27A and 27B are views for illustrating a modification example of the recess portion of a ceiling portion in the folded body of the airbag of the first embodiment.
Figure 27B:
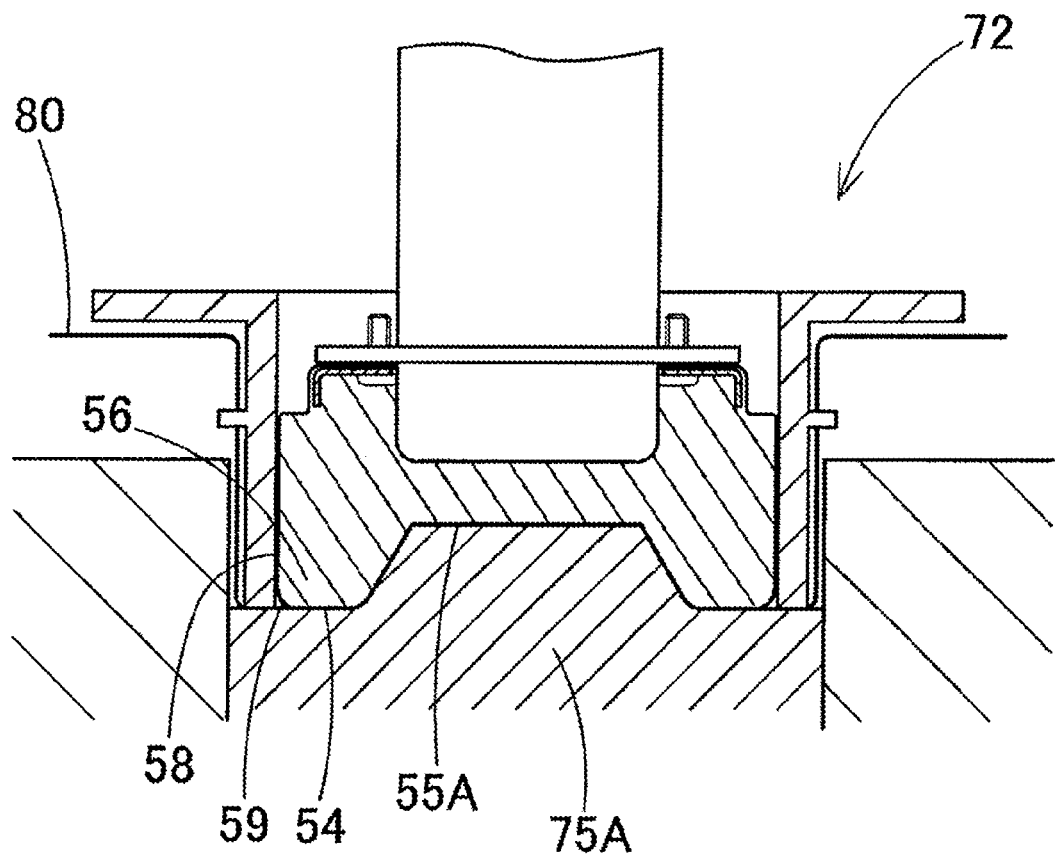

Although the recess portion 55A illustrated in FIGS. 27A and 27B is a truncated conical recess portion 55A similar to the recess portion 55 of the first embodiment, it is enlarged.

Figure 28A:
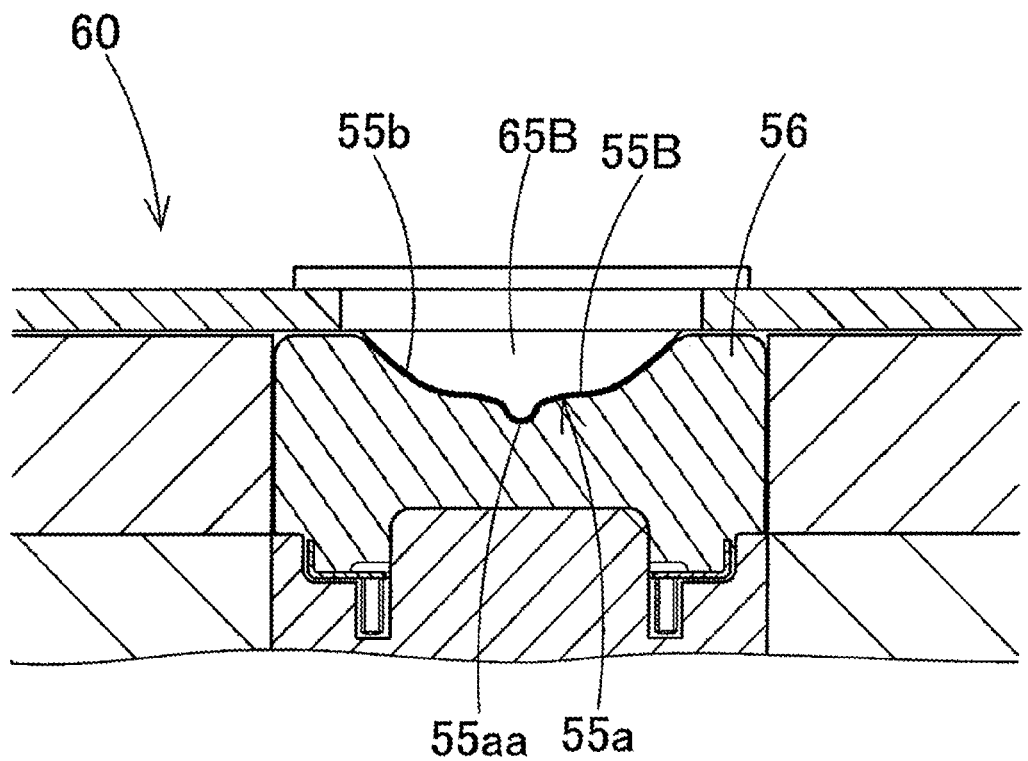
FIGS. 28A and 28B are views for illustrating another modification example of the recess portion of the ceiling portion in the folded body of the airbag of the first embodiment.
Figure 28B:
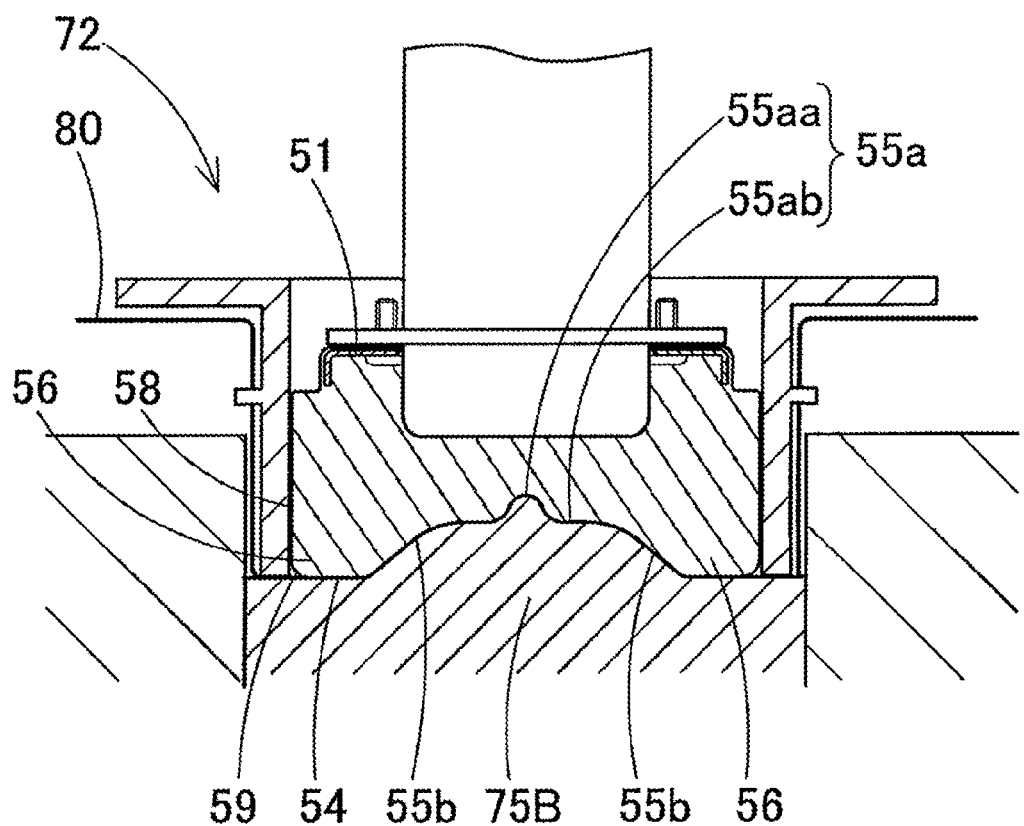

In the recess portion 55B illustrated in FIGS. 28A and 28B, the bottom portion 55a is provided with a recess portion 55aa which is further recessed in the center and an inclined portion 55b continuous with the raised portion 56 from a peripheral edge portion 55ab around the recess portion 55aa is formed in a concave surface shape which gently rises.

Figure 29A:
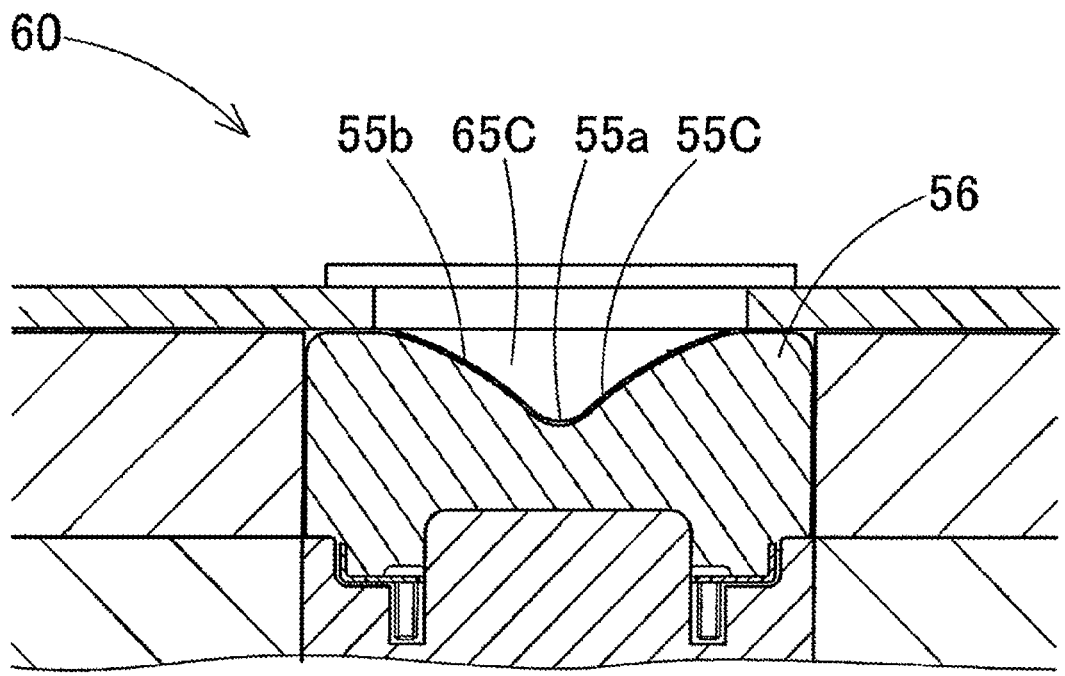
FIGS. 29A and 29B are views for illustrating still another modification example of the recess portion of the ceiling portion in the folded body of the airbag of the first embodiment.
Figure 29B:
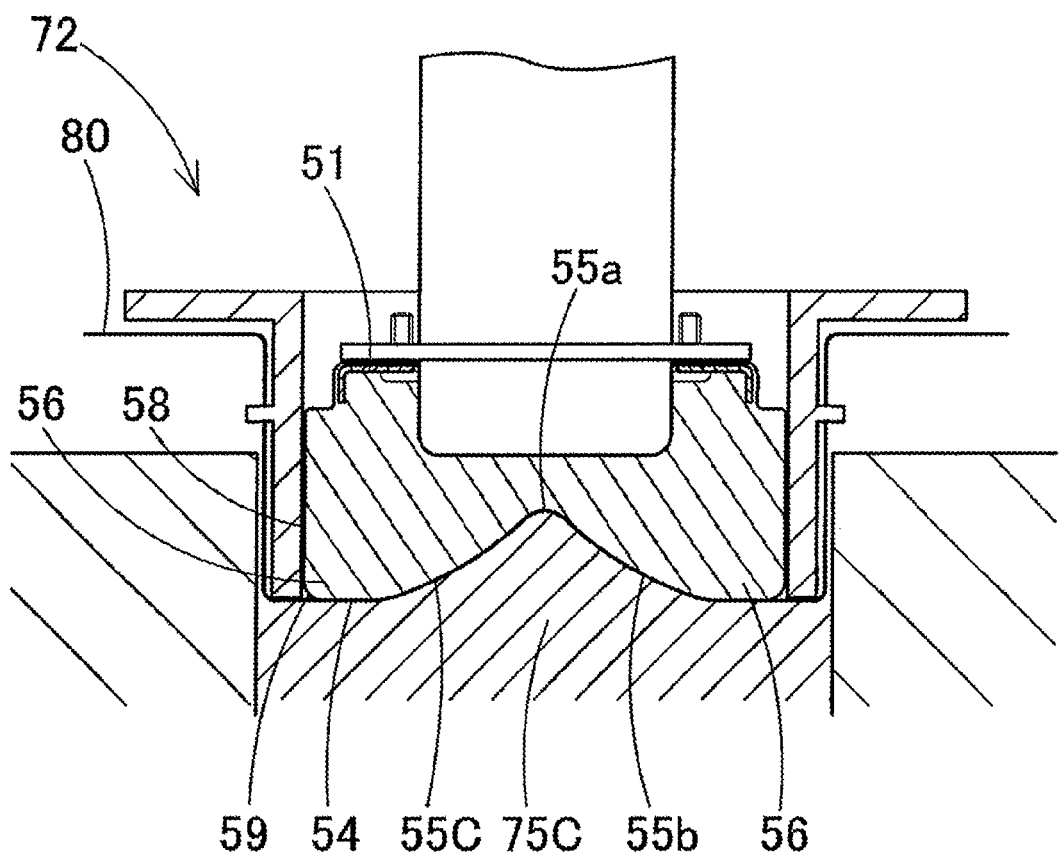

The recess portion 55C illustrated in FIGS. 29A and 29B is formed as a substantially conical recess portion 55C and is formed so as to continuous from a spherical bottom portion 55a to the raised portion 56 through a bulging conical inclined portion 55b.

Even in the recess portion 55A, 55B, or 55C, when the pressing jig 65A, 65B, 65C, 75A, 75B, or 75C in the small-diameter folding process or the compression process compresses the ceiling portion 54 and the bottom surface portion 51 so as to approach each other, the inclined portions 55b of the recess portions 55A, 55B, or 55C receives an internal stress so as to be pushed and expanded and the raised portion 56 on the outer peripheral edge 54b side of the ceiling portion 54 becomes harder so as to enhance the shape retention performance. Therefore, the intersection portion 59 between the ceiling portion 54 and the side surface portion 58 becomes difficult to be deformed so as to hang downward. As a result, even when the folded body 50A, 50B, or 50C is wrapped by the wrapping material locked to the bolt 27 with a strong fastening force, the folded body 50A, 50B, or 50C does not cause deformation causing the center 54a of the ceiling portion 54 to be raised, and thus it is possible to maintain the compact folded shape.

As the recess portion 55 provided in the center 54a of the ceiling portion 54, it may be formed in, for example, a cylindrical recess portion by using a cylindrical pressing jig as long as it is formed by being compressed by the pressing jig such that the raised portion 56 on the outer peripheral edge 54b side of the ceiling portion 54 enhances the shape retention performance. However, when the raised portion 56 on the outer peripheral edge 54b side of the ceiling portion 54 further enhances the shape retention performance, it is preferable that the recess portion 55, 55A, 55B, or 55C have a shape having the inclined portion 55b that expands from the bottom portion 55a to the inner peripheral edge 56b side of the raised portion 56 such that the raised portion 56 can secure an internal stress which causes the raised portion 56 to be compressed toward the side surface portion 58 side.

Further, when the recess portion 55 is formed in the folded body 50, it may be formed solely by the compression process using the pressing jig 75 which is the second process of the folding process. Needless to say, to form the recess portion 55 from the small-diameter folding process, as the first process of the folding process, the small-diameter folding process may be performed by generating the internal stress which causes the ceiling portion 54 and the bottom surface portion 51 to be compressed so as to approach each other.

Figure 30:
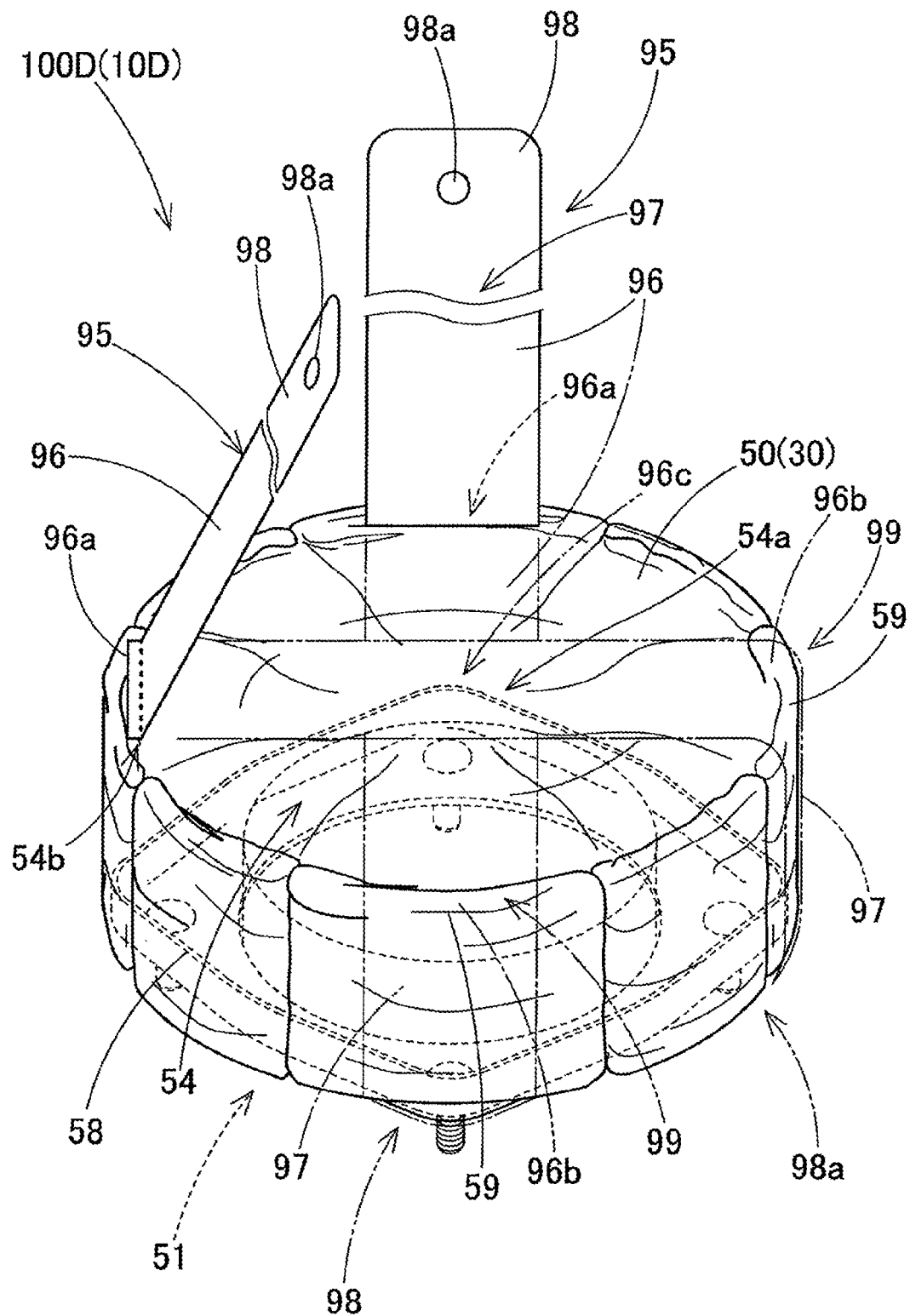
FIG. 30 is a perspective view illustrating a state where a shape maintaining member is provided on a folded body in an air bag device of a second embodiment.
Figure 31:
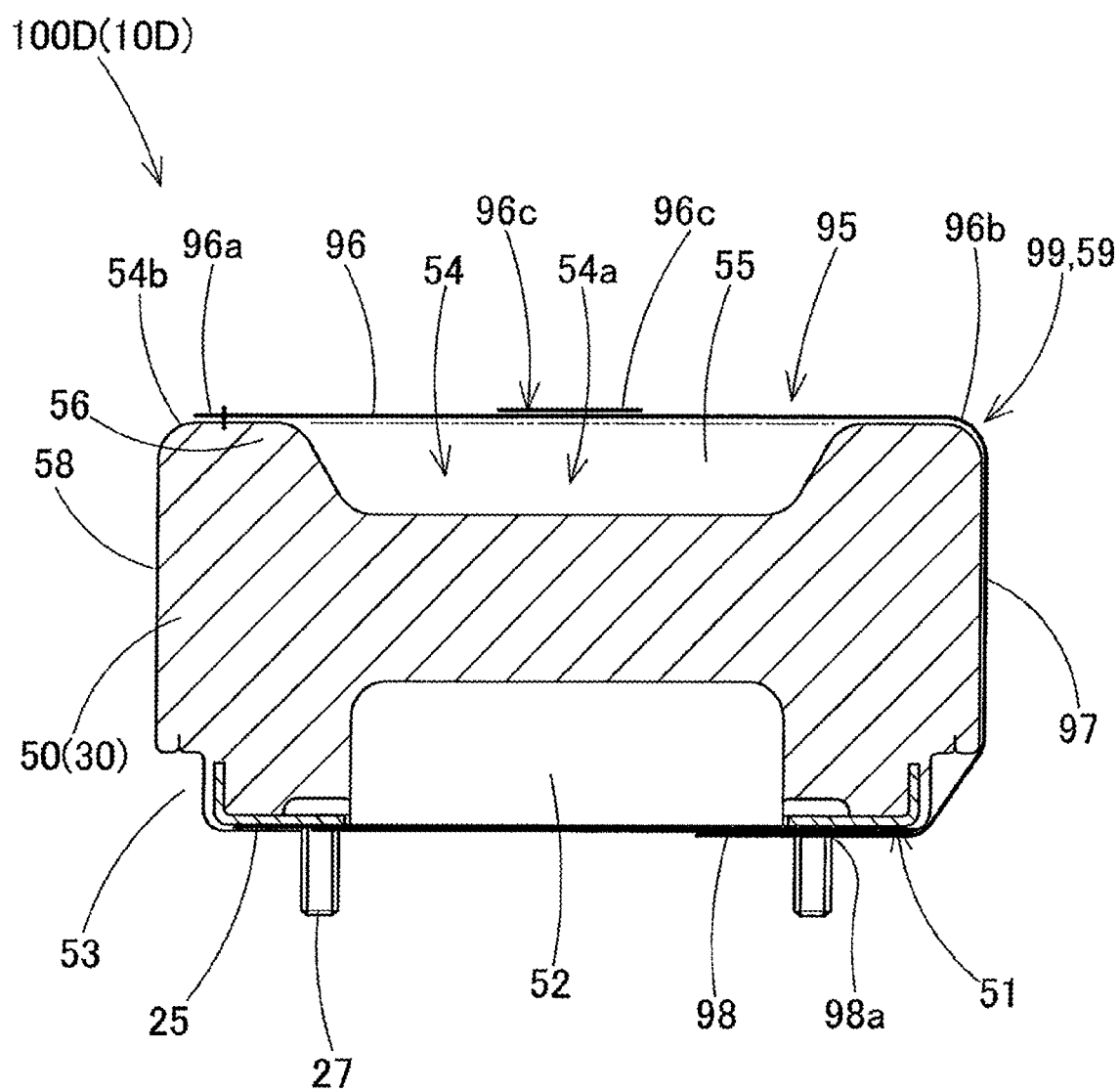
FIG. 31 is a schematic cross-sectional view illustrating a state where the folded body is covered with the shape maintaining member illustrated in FIG. 30.
Figure 32:
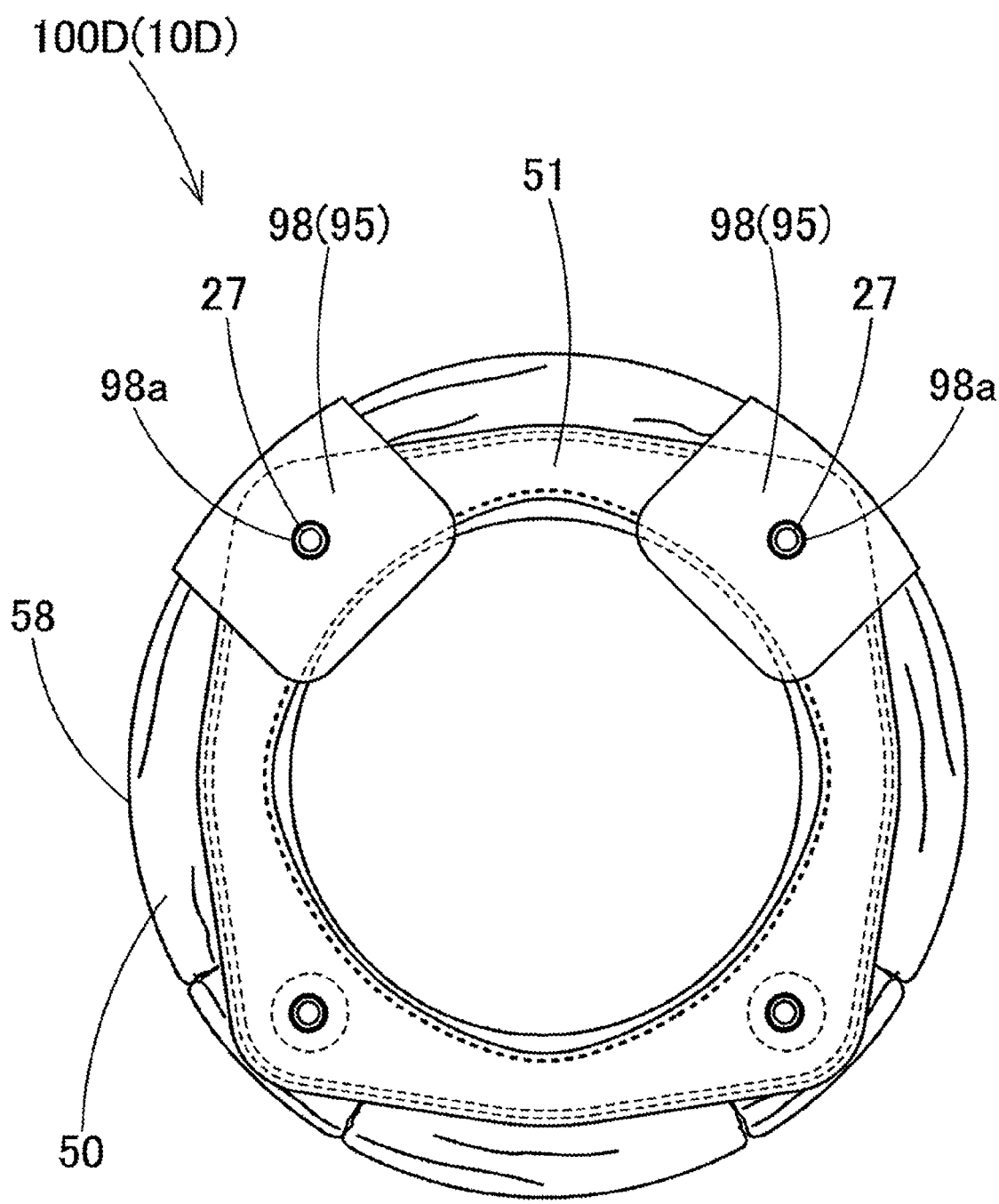
FIG. 32 is a schematic bottom view illustrating a state where the folded body is covered with the shape maintaining member illustrated in FIG. 30.

Next, as an airbag device 10D of a second embodiment, a bag assembly 100D illustrated in FIGS. 30 to 32 may be used.

As similar to that of the first embodiment, the bag assembly 100D is accommodated in an accommodation portion BS of the steering wheel W. The bag assembly 100D is constituted by including the airbag 30 which is inflated from a state of the folded body 50 similar to that of the first embodiment by receiving an inflation gas and a shape maintaining member 95. The shape maintaining member 95 covers the folded body 50 so as to maintain the folded shape of the folded body 50 against the restoring force trying to eliminate folding of the folded body 50 and has flexibility.

The folded body 50 is similar to that of the first embodiment and has a columnar three-dimensional shape including the bottom surface portion 51, the ceiling portion 54 disposed so as to face the bottom surface portion 51, and the side surface portion 58 between the bottom surface portion 51 and the ceiling portion 54. In the folded body 50, the bolt 27 as a fastener for locking the bottom surface cover portion 98 on an end portion side of the shape maintaining member 95 protrudes from a vicinity of an outer peripheral edge of the bottom surface portion 51. As similar to the first embodiment, the bolt 27 protrudes outside the airbag 30 from the retainer 25 accommodated in the airbag 30.

As similar to the airbag 30, the shape maintaining member 95 is formed of a sheet material having flexibility which is made of a base fabric for a bag or the like made of a synthetic fiber such as polyamide or polyester. The shape maintaining member 95 is constituted by including a ceiling cover portion 96 which covers the ceiling portion 54 of the folded body 50, a side surface cover portion 97 which extends from an end portion 96b of the ceiling cover portion 96 and covers the side surface portion 58, and a bottom surface cover portion 98 which extends from the side surface cover portion 97, covers the bottom surface portion 51, and has a locking hole 98a for being locked to the bolt 27 as a fastener. The ceiling cover portion 96 is provided with a center portion 96c covering a vicinity of the center 54a of the ceiling portion 54 and is constituted to linearly extend from the center portion 96c to both sides of the ceiling portion 54 so as to traverse the ceiling portion 54. Further, in the ceiling cover portion 96, one end side of both sides thereof is fixed as a terminal 96a to an edge 54b side of the ceiling portion 54 by sewing or the like and the other end side is connected to the side surface cover portion 97.

When the shape maintaining member 95 is flatly spread, the shape maintaining member 95 is configured to linearly arrange the bottom surface cover portion 98 and the side surface cover portion 97 which extend from the locking hole 98a to a fixed portion (terminal) 96a of the ceiling cover portion 96 which is the portion fixed to the edge 54b side of the ceiling portion 54 and the ceiling cover portion 96.

The length from the terminal 96a to the locking hole 98a in the shape maintaining member 95 is set to a length dimension where the shape maintaining member 95 can strongly press and wrap the folded body 50 when the locking hole 98a is locked to the bolt 27 as a fastener.

In the bag assembly 100D of the airbag device 10D of the second embodiment, in the shape maintaining member 95 of a sheet shape having the flexibility, the end portion 96b side of the ceiling cover portion 96 which extends to an opposite side with respect to the center portion 96c is connected to the side surface cover portion 97 covering the side surface portion 58 of the folded body 50 and is connected to the bottom surface cover portion 98 which covers the bottom surface portion 51 of the folded body 50 from the side surface cover portion 97 and is locked to the bolt 27 as a fastener, in a state where the terminal 96a of the ceiling cover portion 96 which extends over the vicinity of the center 54a of the ceiling portion 54 of the folded body 50 and extends from the center portion 96c is fixed to the edge 54b side of the ceiling portion 54. Therefore, the ceiling cover portion 96 which is linearly extended from the bottom surface cover portion 98 in a spread state effectively presses a vicinity (in the example in the drawing, the ceiling surfaces 56a of the raised portions 56 on both sides with the vicinity of the center 54a interposed therebetween) of the center 54a of the ceiling portion 54 of the folded body 50 toward the bottom surface portion 51 side, so that the height of the ceiling portion 54 of the folded body 50 is prevented from being increased. In addition, an intersection portion 99 between the ceiling cover portion 96 and the side surface cover portion 97 is pressed toward the bottom surface cover portion 98 side, so that an increase in the height of a portion (an intersection portion between the ceiling portion 54 and the side surface portion 58) 59 of the folded body 50 which is the portion in the vicinity of the intersection portion 99 between the ceiling cover portion 96 and the side surface cover portion 97 can be suppressed. As a result, it is possible to maintain a compact folded shape of the folded body 50. Particularly, in the ceiling cover portion 96 of the shape maintaining member 95, the ceiling cover portion 96 extending over the vicinity of the center 54a of the ceiling portion 54 of the folded body 50, the terminal 96a side is fixed to the edge 54b side of the ceiling portion 54 without being provided with a portion extending to the side surface portion 58 side of the folded body 50. Therefore, although, in a connection side between the ceiling cover portion 96 and the side surface cover portion 97, the ceiling cover portion 96 presses the intersection portion 59 between the ceiling portion 54 and the side surface portion 58 of the folded body 50 toward the bottom surface portion 51 side, the intersection portion 59, on the terminal 96a side, between the ceiling portion 54 and the side surface portion 58 of the folded body 50 is not pressed toward a central side of the bottom surface portion 51 so as to make the intersection portion 59 hang down. As a result, it becomes in a pressed state where the height of the center 54a of the ceiling portion 54 is prevented from being increased, and thus the shape maintaining member 95 can make the folded body 50 maintain the compact folded shape.

By the way, when, as illustrated by the two-dot chain line in FIG. 20B, it is configured such that both parts of the ceiling cover portion 96 extending over the vicinity of the center 54a of the ceiling portion 54 of the folded body 500 which are the parts on both sides of the center portion 96c are connected to the side surface cover portions 97 and 97 covering the side surface portion 58 of the folded body 50 and the bottom surface cover portions 98 connected to the respective side surface cover portions 97 and 97 are locked to the bolts 27 as the fasteners, it has the configuration similar to that of the wrapping material 800 of FIG. 20B. Therefore, as illustrated in the two-dot chain line in FIG. 20B, it causes a state where parts of the ceiling cover portion 96 which are the parts on both sides of the center portion 96c and both side surface cover portions 97 and 97 diagonally press both intersection portions 59 relative to the side surface portion 58 in both edge sides of the ceiling portion 54 of the folded body 500 toward a center of the bottom surface portion 51, and thus both intersection portions 59 hang down and the center 54a of the ceiling portion 54 is pushed up. As a result, it causes a situation where the height dimension of the folded body 500 is increased from H0 to H1.

Further, when a plurality of bolts 27 as the fasteners are provided in the vicinity of the outer peripheral edge of the bottom surface portion 51 of the folded body 50 so as to be disposed with a radial arrangement with reference to the center of the bottom surface portion 51, a plurality (two in the case of the example in the drawing) of shape maintaining members 95 may be disposed so as to intersect the mutual ceiling cover portions 96 and 96 and lock the bottom surface cover portions 98 to the bolts 27 in different positions as illustrated in FIGS. 30 to 32.

In such a configuration, in a state where, in the folded body 50, the intersection portion 59 between the ceiling portion 54 and the side surface portion 58 is prevented from being pressed toward a center side of the bottom surface portion 51, an increase in the height of the center 54a of the folded body 50 is securely prevented by the ceiling cover portions 96 of the plurality of shape maintaining members 95 and an increase in the height of intersection portions 99 between a plurality of ceiling cover portions 96 and the side surface cover portions 97 is also securely prevented. As a result, the shape maintaining member 95 can further maintain the compact folded shape of the folded body 50.

Needless to say, only one shape maintain member 95 with, for example, a widened width may be used as long as the shape maintaining member 95 can maintain the compact folded shape of the folded body 50.

As the shape maintaining member 95, the ceiling cover portion 96 may be directly fixed to the outer peripheral edge 54b of the ceiling portion 54 of the folded body 50, as illustrated in FIG. 30. Alternatively, when a surface side over the ceiling portion 54, the side surface portion 58, and the bottom surface portion 51 of the folded body 50 is covered by a wrapping material 80E provided to be locked to the bolt 27 as the fastener, as shown in a bag assembly 100E of an airbag device 10E illustrated in FIGS. 33 to 35, the ceiling cover portion 96 of the shape maintaining member 96E may be fixed to a part of the wrapping material 80E covering the ceiling portion 54 of the folded body 50 and may be fixed to the edge 54b side of the ceiling portion 54 of the folded body 50 by sewing or the like in a state where the wrapping material 80E covering the ceiling portion 54 is interposed therebetween.

Figure 33:
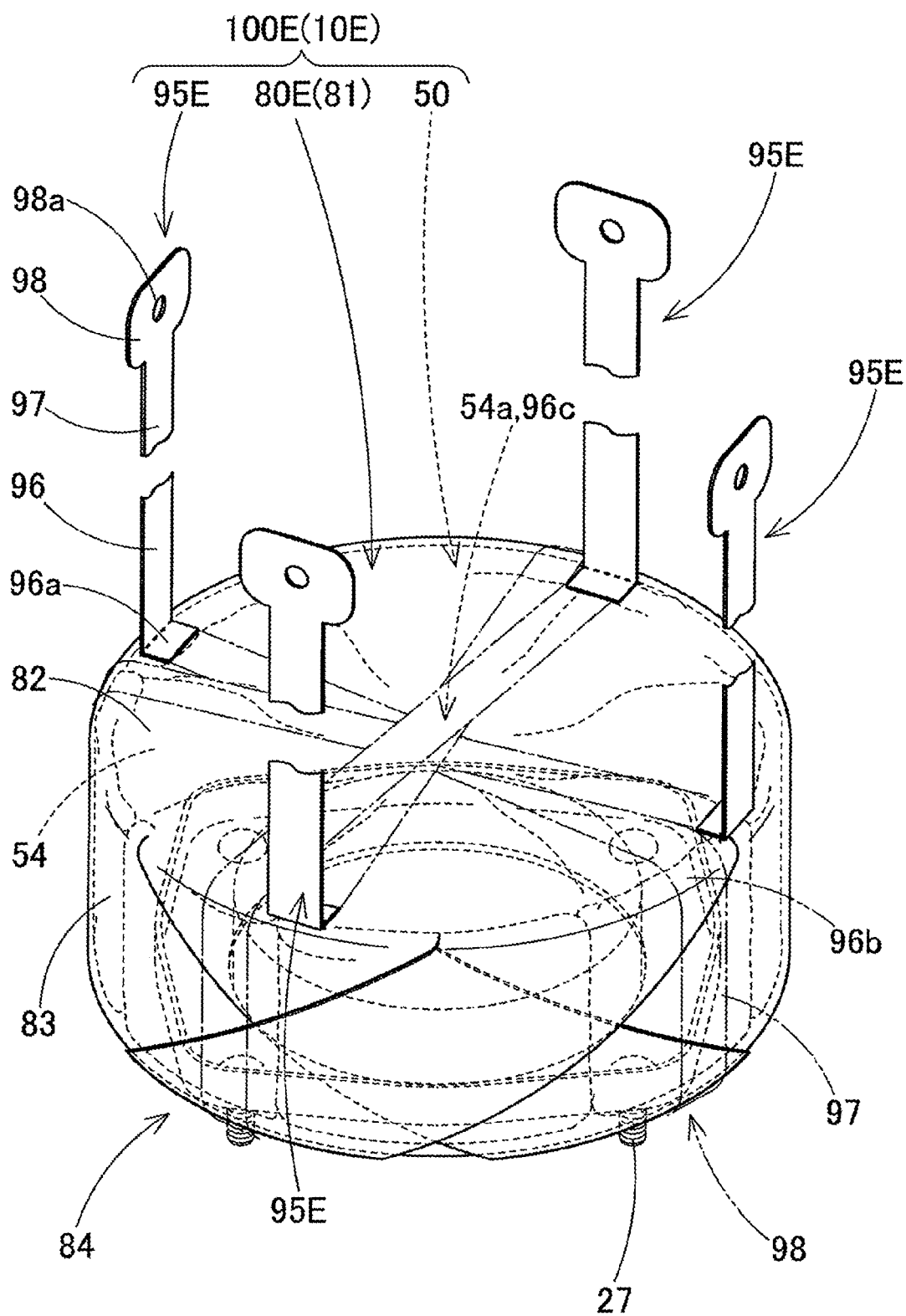
FIG. 33 is a perspective view illustrating a state where a shape maintaining member of a modification example is provided on the wrapping material wrapping the folded body.
Figure 34:
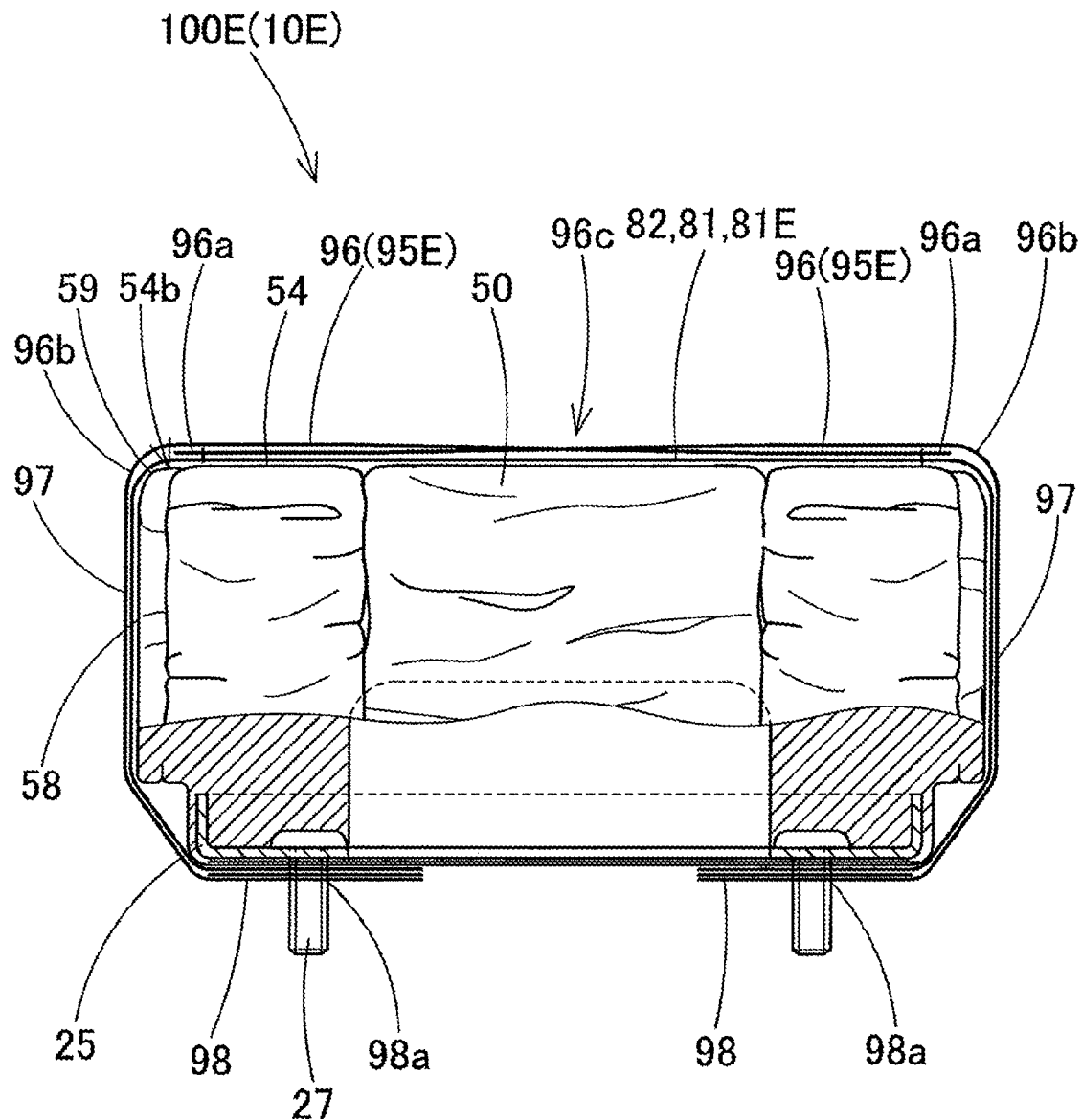
FIG. 34 is a schematic cross-sectional view illustrating a state where the folded body wrapped in the wrapping material is covered with the shape maintaining member illustrated in FIG. 33.
Figure 35:
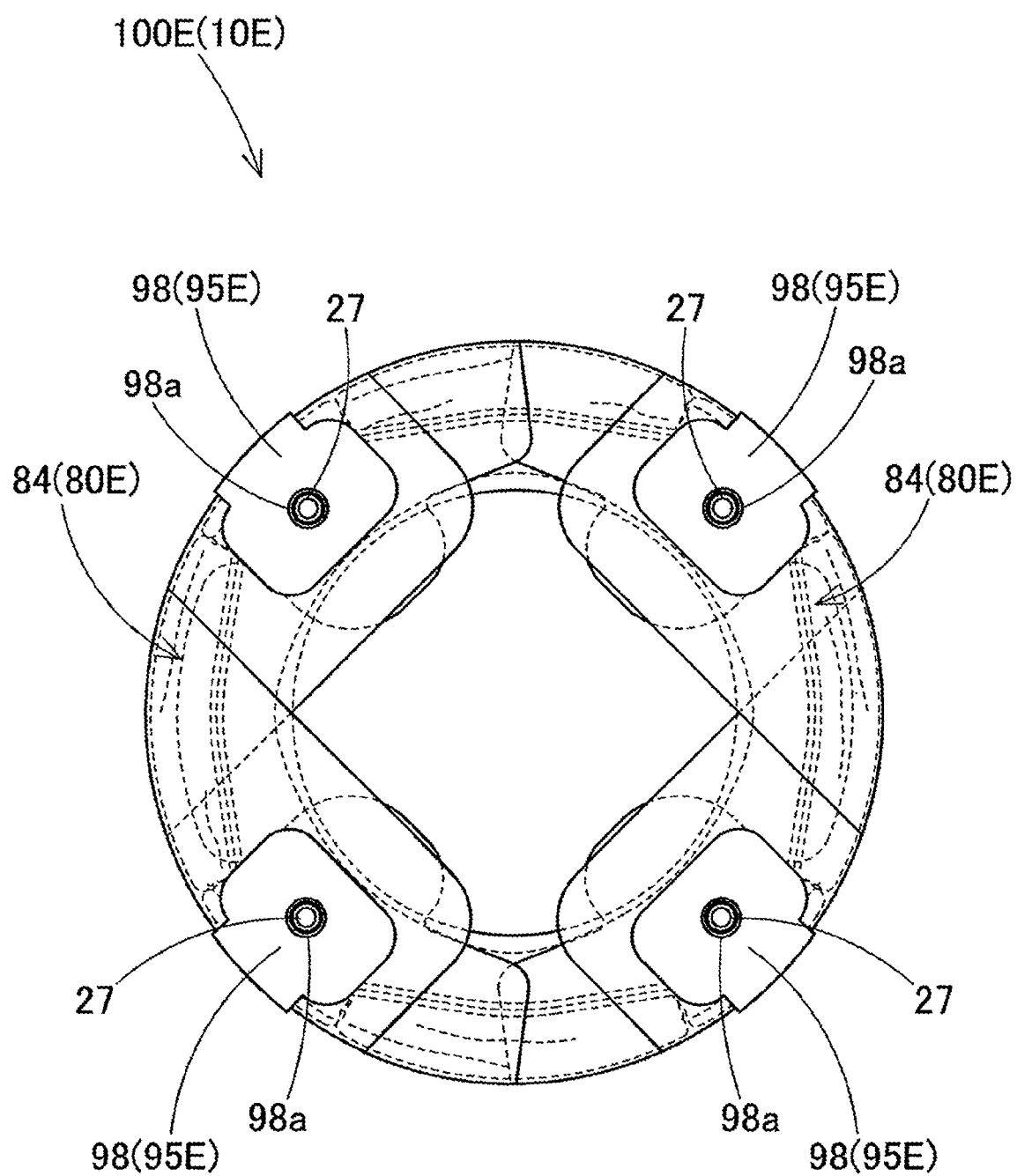
FIG. 35 is a schematic bottom view illustrating a state where the folded body wrapped in the wrapping material is covered with the shape maintaining member illustrated in FIG. 33.

In a bag assembly 100E illustrated in FIGS. 33 to 35, the wrapping material 80E wrapping the folded body 50 is constituted of the cover member 81 without the elongation regulating member 86 in the first embodiment. Needless to say, as the wrapping material 80E, the cover member having the elongation regulating member 86 may be provided.

Although the shape maintaining member 95E allows the wrapping material 80E to be interposed, it is configured such that, in a state where the terminal 96a of the ceiling cover portion 96 which extends from the center portion 96c over the vicinity of the center 54a of the ceiling portion 54 of the folded body 50 is fixed to the edge 54b side of the ceiling portion 54 in the wrapping material 80E, the end portion 96b side of the ceiling cover portion 96 which is the end portion side extends to an opposite side with respect to the center portion 96c is connected to the side surface cover portion 97 covering the side surface portion 58 of the folded body 50 and is connected to the bottom surface cover portion 98 which covers the bottom surface portion 51 of the folded body 50 from the side surface cover portion 97 and is locked to the bolt 27 as a fastener.

In the bag assembly 100E, four shape maintaining members 95E are arranged corresponding to four bolts 27 which are provided in the vicinity of the outer peripheral edge of the bottom surface portion 51 of the folded body 50 so as to be disposed with a radial arrangement with reference to the center of the bottom surface portion 51. Further, the shape maintaining members 95E are disposed so as to intersect the mutual ceiling cover portions 96, 96, 96, and 96 and lock the bottom surface cover portions 98 to the bolts 27 in different positions. Needless to say, a plurality of shape maintaining members 95E provided in the wrapping material 80E may be used or one shape maintenance member 95E may be provided as long as the compact folded shape of the folded body 50 can be maintained.

In the bag assembly 100D or 100E, it is configured such that the fixation strength of the terminal 96a of the ceiling cover portion 96 is adjusted so as to release the fixation so that the state of covering the folded body 50 can be released when the airbag 30 is inflated or it is configured such that a predetermined portion from the ceiling cover portion 96 to the bottom surface cover portion 98 is broken.

Further, in the bag assembly 100D, fixing the terminal 98a to the shape maintaining member 95 may be performed as follows. Before the airbag 30 is folded, the terminal 96a is fixed in advance to a part where the terminal 96a will be located at the edge 54b of the ceiling portion 54 after folding is completed. Then, when the folding is performed, the folded body 50 is folded such that the terminal 96a is located at a predetermined position while holding the shape maintaining member 95 or the terminal 96a is fixed to the edge 54b after the folded body 50 is formed.

In each embodiment, the folded body 50 is exemplified to have a substantially cylindrical shape. However, the folded body 50 may be folded into a polygonal columnar shape such as a quadrangular columnar shape.

In each embodiment, the airbag devices 10, 10D, or 10E for a driver's seat which is mounted on the boss portion B of the steering wheel W is exemplified. However, as long as it is an airbag device wrapping a folded body with a wrapping material or a shape maintaining member, the invention may be applied to an airbag device for a passenger seat or the like.

In each embodiment, a case of using the bolt 27 of the retainer 25 disposed in the airbag 30 as the fastener for locking the wrapping material or the shape maintaining member is described. However, a protrusion provided on the bag holder 11 as an accommodation portion for holding and accommodating the airbag 30, a case, or the like may be used as a fastener.

What is claimed is:

1. An airbag device comprising:
   an airbag which inflates from a state of a folded body by receiving an inflation gas; and
   a wrapping material having flexibility which wraps the folded body to maintain a folded shape of the folded body and to resist a spring back force following folding that forms the folded body, wherein:
   the folded body has a three-dimensional shape including a bottom surface portion, a ceiling portion disposed to face the bottom surface portion, and a side surface portion between the bottom surface portion and the ceiling portion;
   the wrapping material is disposed to cover a surface side over the ceiling portion, the side surface portion, and the bottom surface portion of the folded body;
   the airbag device is locked to a fastener disposed on a bottom surface portion side of the folded body; and
   the wrapping material includes:
     a cover member having flexibility and a sheet shape which includes a ceiling cover portion covering the ceiling portion of the folded body, a side surface cover portion covering the side surface portion, and a bottom surface cover portion which covers the bottom surface portion and has a locking hole to be locked to the fastener; and
     an elongation regulating member which is provided on at least a part of the cover member so as to suppress elongation of the cover member in opposition to an acting direction of the spring back force that acts to unfold the folded body,
   wherein the elongation regulating member is constituted by an elongation regulating sewn portion formed by sewing a sewing thread at a position where elongation of the cover member is suppressed.

2. The airbag device according to claim 1, wherein
   the elongation regulating member is further constituted by an elongation regulating coating agent applied to the cover member.

3. The airbag device according to claim 1, wherein:
   a plurality of fasteners including the fastener are provided, the plurality of fasteners are disposed at a plurality of positions on an outer peripheral edge side of the bottom surface portion; and
   the elongation regulating sewn portion includes:
     a lateral-surface-side sewn portion which is disposed so as to extend from an edge of the side surface cover portion in a vicinity of each fastener of the plurality of fasteners which is the edge on a bottom surface cover portion side in the vicinity of the fastener to the ceiling cover portion; and
     a ceiling-side sewn portion disposed so as to extend from an end portion on the ceiling cover portion side in the lateral-surface-side sewn portion to a center side of the ceiling cover portion and have at least a part which extends along an outer peripheral edge of the ceiling cover portion in a vicinity of the outer peripheral edge of the ceiling cover portion.

4. The airbag device according to claim 1, wherein
   in a peripheral edge of a locking hole to which the fastener is locked, the elongation regulating sewn portion includes at least a locking-hole-side sewn portion disposed on an edge side in a direction opposite to the acting direction of the spring back force that acts to unfold the folded body.

5. The airbag device according to claim 1, wherein:
   the folded body is formed by being compressed in a direction in which the ceiling portion and the bottom surface portion approach each other; and
   the ceiling portion of the folded body is provided with a recess portion which is recessed further downward than an outer peripheral edge side in a portion in a vicinity of a center, and a raised portion which includes a ceiling surface substantially parallel to the bottom surface portion on the outer peripheral edge side and is raised from the recess portion so as to surround the recess portion.

6. An airbag device comprising:
   an airbag which inflates from a state of a folded body by receiving an inflation gas; and
   a shape maintaining member having flexibility which covers the folded body to maintain a folded shape of the folded body and to resist a spring back force following folding that forms the folded body, wherein:
   the folded body has a three-dimensional shape including a bottom surface portion, a ceiling portion disposed to face the bottom surface portion, and a side surface portion between the bottom surface portion and the ceiling portion;
   a fastener for locking an end portion of the shape maintaining member protrudes from a vicinity of an outer peripheral edge of the bottom surface portion;
   the shape maintaining member is formed of a flexible sheet material including a ceiling cover portion which covers the ceiling portion of the folded body, a side surface cover portion which extends from an end portion of the ceiling cover portion and covers the side surface portion, and a bottom surface cover portion which extends from the side surface cover portion to cover the bottom surface portion and has a locking hole to be locked to the fastener;
   the ceiling cover portion is provided with a center portion covering a vicinity of a center of the ceiling portion and constituted to linearly extend from the center portion to both sides of the ceiling portion so as to traverse the ceiling portion and one end side of both sides of the ceiling cover portion is fixed as a terminal to an edge side of the ceiling portion and the other end side is connected to the side surface cover portion; and
   the shape maintaining member in a state of being flatly spread is configured to linearly arrange the bottom surface cover portion and the side surface cover portion which extend from the locking hole to a fixed portion of the ceiling cover portion which is the portion fixed to the edge side of the ceiling portion and the ceiling cover portion.

7. The airbag device according to claim 6, wherein:
   a plurality of the fasteners are provided in a vicinity of an outer peripheral edge of the bottom surface portion of the folded body so as to be disposed with a radial arrangement around a center of the bottom surface portion; and a plurality of the shape maintaining members are disposed so as to intersect mutual ceiling cover portions and lock the bottom surface cover portions to the fasteners in different positions.

8. The airbag device according to claim 6, wherein the ceiling cover portion of the shape maintaining member is directly fixed to an outer peripheral edge of the ceiling portion of the folded body.

9. The airbag device according to claim 6, wherein:
a wrapping material which covers a surface side over the ceiling portion, the side surface portion, and the bottom surface portion of the folded body and is disposed to be locked to the fastener is provided;
the shape maintaining member is provided on an outer surface side of the wrapping material; and
the ceiling cover portion of the shape maintaining member is fixed to a part of the wrapping material covering the ceiling portion and is fixed to an edge side of the ceiling portion of the folded body in a state where the wrapping material covering the ceiling portion is interposed.

10. The airbag device according to claim 6, wherein:
the folded body is formed by being compressed in a direction in which the ceiling portion and the bottom surface portion approach each other; and
the ceiling portion of the folded body is provided with a recess portion which is recessed further downward than an outer peripheral edge side in a portion in a vicinity of a center, and a raised portion which includes a ceiling surface substantially parallel to the bottom surface portion on the outer peripheral edge side and is raised from the recess portion so as to surround the recess portion.

11. A folding method of an airbag which inflates from a folded state by receiving a gas, the airbag including: an vehicle-body-side wall portion provided with an inflow opening to inflow the gas; and a driver-side wall portion which is arranged so as to oppose the vehicle-body-side wall portion in a state where an outer peripheral edge of the driver-side wall portion is continuous with an outer peripheral edge of the vehicle-body-side wall portion, the folding method comprising:
providing a bag folding machine including: a bottom-side base plate; and a ceiling-side base plate disposed oppositely to the bottom-side base plate, the ceiling-side base plate including a projection portion being provided in a vicinity of the inflow opening and protruding to a side of the bottom-side base plate;
spreading the airbag at a portion between the bottom-side base plate and the ceiling-side base plate so that the vehicle-body-side wall portion faces the bottom-side base plate in a state where the vehicle-body-side wall portion opposes the driver-side wall portion; and
gathering an outer peripheral edge of the airbag above the inflow opening to fold the airbag so that the airbag is disposed around the projection portion and is interposed between the ceiling-side base plate and the bottom-side base plate,
wherein:
a width of the projection portion is reduced gradually toward the bottom-side base plate;
when the outer peripheral edge of the airbag is gathered above the inflow opening to fold the airbag, a recess portion is formed on a surface of the airbag opposing an inflow opening side surface of the airbag; and
an opening width of the recess portion is reduced gradually toward the inflow opening side surface.

* * * * *